United States Patent
Takahashi et al.

(10) Patent No.: US 9,625,692 B2
(45) Date of Patent: Apr. 18, 2017

(54) PROJECTION OPTICAL SYSTEM AND IMAGE PROJECTING APPARATUS

(75) Inventors: Tatsuya Takahashi, Kanagawa (JP); Kazuhiro Fujita, Tokyo (JP); Issei Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 13/595,026

(22) Filed: Aug. 27, 2012

(65) Prior Publication Data

US 2013/0070333 A1 Mar. 21, 2013

(30) Foreign Application Priority Data

Sep. 15, 2011 (JP) .................................. 2011-201690

(51) Int. Cl.
G02B 17/00 (2006.01)
G02B 17/08 (2006.01)

(52) U.S. Cl.
CPC ......... *G02B 17/0852* (2013.01); *G02B 17/08* (2013.01)

(58) Field of Classification Search
CPC .................................................. G02B 13/001
See application file for complete search history.

(56) References Cited

U.S. PATENT DOCUMENTS

| 2,510,080 | A | 6/1950 | Cuneo |
| 7,753,531 | B2 | 7/2010 | Fujita et al. |
| 7,857,458 | B2 | 12/2010 | Fujita et al. |
| 8,107,163 | B2 | 1/2012 | Nishikawa |
| 8,217,374 | B2 | 7/2012 | Nishikawa et al. |
| 2002/0141053 | A1 | 10/2002 | Colucci et al. |
| 2007/0184368 | A1* | 8/2007 | Nishikawa et al. ............ 430/30 |
| 2009/0213470 | A1 | 8/2009 | Abe et al. |
| 2010/0157421 | A1* | 6/2010 | Abe .................... G02B 17/0852 359/364 |
| 2010/0232039 | A1* | 9/2010 | Chen et al. ................... 359/728 |
| 2010/0238416 | A1 | 9/2010 | Kuwata et al. |
| 2012/0092628 | A1 | 4/2012 | Takahashi et al. |

FOREIGN PATENT DOCUMENTS

| JP | 2007-011248 | 1/2007 |
| JP | 2007-079524 | 3/2007 |
| JP | 2008-116688 | 5/2008 |
| JP | 2008-165187 | 7/2008 |
| JP | 2010-244017 | 10/2010 |
| WO | WO 98/08141 A1 | 2/1998 |
| WO | WO 2011/089042 A1 | 7/2011 |

OTHER PUBLICATIONS

Extended European search report dated Dec. 12, 2012.
U.S. Appl. No. 13/411,717, filed Mar. 5, 2012, Takahashi et al.

\* cited by examiner

*Primary Examiner* — Scott J Sugarman
*Assistant Examiner* — Robert E Tallman
(74) *Attorney, Agent, or Firm* — IPUSA, PLLC

(57) ABSTRACT

Disclosed is a projection optical system including a first optical system configured to form a first image conjugate to an object and have an optical axis and a second optical system configured to project a second image conjugate to the first image onto a surface to be projected on, wherein the first image satisfies a condition of:

$$Im \times Tr \leq 1.70$$

wherein Im denotes a length of the first image in a direction of an optical axis of the first optical system, normalized by a focal length of the first optical system, and Tr denotes a throw ratio for the projection optical system.

8 Claims, 50 Drawing Sheets

PROJECTION OPTICAL SYSTEM AND IMAGE PROJECTING APPARATUS

BACKGROUND OF THE INVENTION

1. Field of the Invention

At least one aspect of the present invention relates to at least one of a projection optical system and an image projecting apparatus.

2. Description of the Related Art

A conventional technique related to at least one of a projection optical system and an image projecting apparatus is disclosed.

For example, Japanese Patent Application Publication No. 2007-079524 (patent document 1) discloses a projection optical system for conducting enlargement and projection from a primary image plane at a reduction side to a secondary image plane at an enlargement side, characterized in that the projection optical system includes a first optical system for imaging an intermediate image of the primary image plane and a second optical system having a concave reflection surface for forming the secondary image plane from the intermediate image, wherein a light ray traveling from a center of the primary image plane to a center of the secondary image plane intersects an optical axis of the first optical system, then is reflected from the concave reflection surface, again intersects the optical axis, and arrives at the secondary image plane.

For example, Japanese Patent Application No. 2008-116688 (patent document 2) discloses a projection optical system for conducting enlargement and projection from a primary image plane at a reduction side to a secondary image plane at an enlargement side, characterized in that the projection optical system includes a first optical system for imaging an intermediate image of the primary image plane, which is composed of a first group having a negative refractive power, a second group having a positive refractive power, an intervening stop, and a third group having a positive refractive power, from an intermediate image side of the stop, and a second optical system having one concave reflection surface formed at a secondary image side of the intermediate image, wherein each surface composing the first optical system and the second optical system is configured as a rotationally symmetric surface centered at a common optical axis, wherein a light ray traveling from a center of the primary image plane to a center of the secondary image plane intersects the optical axis, then is reflected from the concave reflection surface, again intersects the optical axis, and arrives at the secondary image plane, and wherein the following condition formulas:

$$0.5 < \phi_1/\phi_2 < 3 \quad (1)$$

$$1 < AST/ASS < 5 \quad (2)$$

$$|AST|/L12 < 1 \quad (3)$$

are satisfied and the following condition formula:

$$-3 < Krel \quad (4)$$

is satisfied for all of lenses composing the first optical system and having a positive refractive power (herein, $\phi_1$: a refractive power of the first optical system
$\phi_2$: a refractive power of the second optical system
|AST|: a position of intermediate imaging on a meridional plane of the first optical system
|ASS|: a position of intermediate imaging on a sagittal plane of the first optical system
L12: a distance on the optical axis between the first optical system and the second optical system
Krel: a temperature coefficient of a refractive index).

For example, Japanese Patent Application Publication No. 2008-165187 (patent document 3) discloses a projection optical system including a first optical system for forming a first image conjugate to an object and a second optical system for projecting a second image conjugate to the first image onto a surface to be projected on, wherein at least one of the first optical system and the second optical system includes at least one optical element movable with respect to the object, and wherein the projection optical system is characterized in that the at least one optical element with respect to the object is moved whereby an image distance for the projection optical system is changed and a size of the second image is changed.

However, it has not been easy for even a person skilled in the art related to a projection optical system or an image projecting apparatus to provide a more compact projection optical system capable of projecting a better image onto a surface to be projected on at a shorter distance or a more compact image projecting apparatus capable of projecting a better image onto a surface to be projected on at a shorter distance.

SUMMARY OF THE INVENTION

According to one aspect of the present invention, there is provided a projection optical system including a first optical system configured to form a first image conjugate to an object and have an optical axis and a second optical system configured to project a second image conjugate to the first image onto a surface to be projected on, wherein the first image satisfies a condition of:

$$Im \times Tr \le 1.70$$

wherein Im denotes a length of the first image in a direction of an optical axis of the first optical system, normalized by a focal length of the first optical system, and Tr denotes a throw ratio for the projection optical system.

According to another aspect of the present invention, there is provided an image projecting apparatus including an image forming part configured to form an image and a projection optical system configured to project the image onto a surface to be projected on, wherein the projection optical system is a projection optical system according to one aspect of the present invention.

DETAILED DESCRIPTION OF THE PREFERRED EMBODIMENTS

Figure 1:
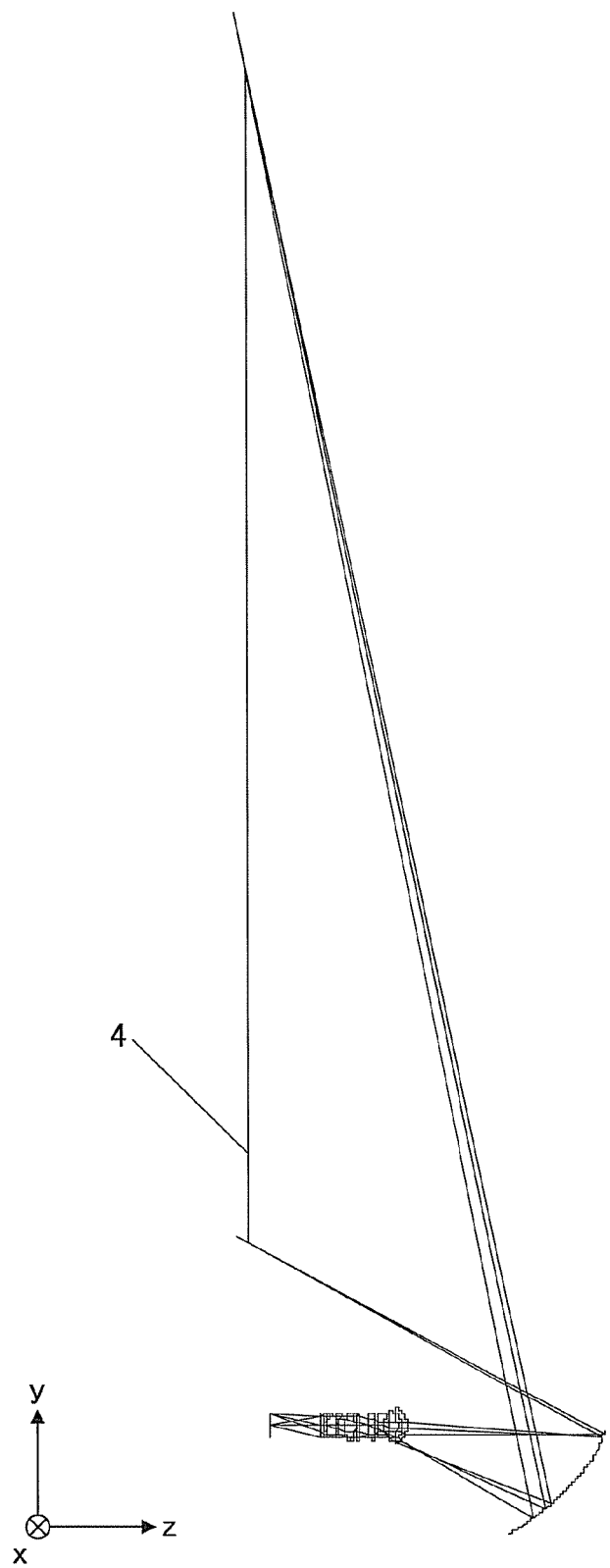
FIG. 1 is a diagram illustrating an example of a projection optical system according to an embodiment of the present invention and an example of an image projecting apparatus according to an embodiment of the present invention.

Next, a mode(s) for implementing the present invention (an embodiment(s) of the present invention) will be described with reference to the accompanying drawing(s).

A first embodiment of the present invention is a projection optical system including a first optical system which forms a first image conjugate to an object and has an optical axis and a second optical system which projects a second image conjugate to the first image onto a surface to be projected on, wherein the first image satisfies a condition of Im×Tr≤1.70, wherein Im denotes a length of the first image in a direction of an optical axis of the first optical system which is normalized by a focal length of the first optical system and Tr denotes a throw ratio for the projection optical system.

In a projection optical system according to the first embodiment of the present invention, a first image is conjugate to an object and a second image is conjugate to the first image. Thereby, the second image is conjugate to the object. The second image may be referred to as an image conjugate to an object, and in this case, a first image may be referred to as an intermediate image between the object and the image (second image). In a projection optical system according to the first embodiment of the present invention, each of a first image and a second image may include aberration or not include aberration.

In a projection optical system according to the first embodiment of the present invention, a surface to be projected on is a surface onto which a second image conjugate to a first image is projected. Herein, a surface to be projected on may be, for example, a flat surface or screen.

In a projection optical system according to the first embodiment of the present invention, to project includes to conduct enlargement and projection, to conduct projection at a same magnification, or to conduct reduction and projection, and preferably is to conduct enlargement and projection. When to project is to conduct enlargement and projection in a projection optical system according to the first embodiment of the present invention, it may be possible to provide a projection optical system capable of enlarging and projecting an image onto a surface to be projected on.

A projection optical system according to the first embodiment of the present invention includes a first optical system which forms a first image conjugate to an object and has an optical axis and a second optical axis which forms a second image conjugate to the first image onto a surface to be projected on. In an optical path for a projection optical system according to the first embodiment of the present invention, for example, an object, a first optical system, a first image, a second optical system, and a second image may be arranged in order.

In a projection optical system according to the first embodiment of the present invention, a first optical system is an optical system which forms a first image conjugate to an object and has an optical axis. Herein, a first optical system, for example, includes a refractive optical system which forms a first image conjugate to an object and has an optical axis. A refractive optical system is, for example, a lens system. The number of lenses included in a lens system is not particularly limited. A shape of a surface composing a lens included in a lens system is not particularly limited. A shape of a surface composing a lens may be a spherical surface or an aspheric surface. An aspheric surface may be a rotationally symmetric aspheric surface. A refractive optical system preferably has a positive power. When a refractive optical system has a positive power, a first image is a real image.

In a projection optical system according to the first embodiment of the present invention, a second optical system is an optical system which projects a second image conjugate to a first image onto a surface to be projected on. Herein, a second optical system, for example, includes a reflection optical system which projects and reflects a second image conjugate to a first image onto a surface to be projected on. A reflection optical system is, for example, a mirror system. The number of mirrors included in a mirror system is not particularly limited. A shape of a surface composing a mirror included in a mirror system is not particularly limited. A shape of a surface composing a mirror may be a spherical surface or an aspheric surface. An aspheric surface may be a rotationally symmetric aspheric surface or a free-form surface. A free-form surface may be a rotationally asymmetric aspheric surface. A reflection optical system preferably has a positive power. When a reflection optical system has a positive power, a second image is a real image.

In a projection optical system according to the first embodiment of the present invention, a first image satisfies a condition of Im×Tr≤1.70.

In a projection optical system according to the first embodiment of the present invention, Im denotes a length of a first image in a direction of an optical axis of a first optical system which is normalized by a focal length of the first optical system (a length of a first image in a direction of an optical axis of a first optical system/a focal length of the first optical system). A length of a first image in a direction of an optical axis of a first optical system is a distance between a position of an image point nearest the first optical system in a direction of the optical axis of the first optical system and a position of an image point nearest a second optical system in a direction of the optical axis of the first optical system among image points for the first image which are provided by a meridional light ray and a sagittal light ray from an object point for an object.

In a projection optical system according to the first embodiment of the present invention, Tr denotes a throw ratio for the projection optical system. A throw ratio is a ratio of a distance from a principal point of a second optical system at a surface-to-be-projected-on side to the surface to be projected on to a size of a second image projected on the surface to be projected on in a horizontal direction.

According to the first embodiment of the present invention, it may be possible to provide a more compact projection optical system capable of projecting a better image onto a surface to be projected on at a shorter distance, because a first image satisfies a condition of Im×Tr≤1.70, wherein Im denotes a length of the first image in a direction of an optical axis of a first optical system which is normalized by a focal length of the first optical system and Tr denotes a throw ratio of a projection optical system. For example, it may be possible to provide a projection optical system with a further reduced total length. A total length of a projection optical system is a distance from an object point for an object to a last end of a second optical system in a direction of an optical axis of a first optical system with respect to a principal light ray of a light beam nearest the optical axis of the first optical system included in the projection optical system.

In a projection optical system according to the first embodiment of the present invention, a first image preferably satisfies a condition of Im×Tr≤1.50.

When a first image satisfies a condition of Im×Tr≤1.50 in a projection optical system according to the first embodiment of the present invention, it may be possible to provide a more compact projection optical system.

In a projection optical system according to the first embodiment of the present invention, a first image preferably satisfies a condition of 0.50≤Im×Tr.

When a first image satisfies a condition of 0.50≤Im×Tr in a projection optical system according to the first embodiment of the present invention, it may be possible to provide a projection optical system capable of projecting a better image onto a surface to be projected on.

In a projection optical system according to the first embodiment of the present invention, the projection optical system preferably satisfies a condition of Tr≤0.7.

When a projection optical system satisfies a condition of Tr≤0.7 in a projection optical system according to the first embodiment of the present invention, it may be possible to provide a projection optical system capable of projecting an image onto a surface to be projected on at a shorter distance.

In a projection optical system according to the first embodiment of the present invention, a first optical system preferably includes an aspheric surface.

When a first optical system includes an aspheric surface in a projection optical system according to the first embodiment of the present invention, it may be possible to provide a projection optical system capable of projecting a better image onto a surface to be projected on.

In a projection optical system according to the first embodiment of the present invention, a Petzval sum for a first optical system is preferably less than or equal to −0.010 $mm^{-1}$.

When a Petzval sum for a first optical system is less than or equal to −0.010 $mm^{-1}$ in a projection optical system according to the first embodiment of the present invention, it may be possible to provide a projection optical system capable of projecting a better image onto a surface to be projected on. A Petzval sum for a first optical system is more preferably less than or equal to −0.012 $mm^{-1}$. When a Petzval sum for a first optical system is less than or equal to −0.012 $mm^{-1}$, it may be possible to provide a projection optical system capable of projecting a better image onto a surface to be projected on. A Petzval sum for a first optical system is preferably greater than or equal to −0.037 $mm^{-1}$. When a Petzval sum for a first optical system is greater than or equal to −0.037 $mm^{-1}$, it may be possible to provide a projection optical system capable of projecting a better image onto a surface to be projected on.

In a projection optical system according to the first embodiment of the present invention, a second optical system preferably includes a reflection surface with a free-form surface shape. When a second optical system includes a reflection surface with a free-form surface shape in a projection optical system according to the first embodiment of the present invention, it may be possible to provide a projection optical system capable of projecting a better image onto a surface to be projected on.

A second embodiment of the present invention is an image projecting apparatus including an image forming part which forms an image and a projection optical system which projects an image onto a surface to be projected on, wherein the projection optical system is a projection optical system according to the first embodiment of the present invention.

In an image projecting apparatus according to the second embodiment of the present invention, an image forming part which forms an image is not particularly limited. Herein, an image forming part may be, for example, a displaying device (light valve) such as a transmission-type or reflection-type dot matrix liquid crystal or a digital micro-mirror device (DMD).

In an image projecting apparatus according to the second embodiment of the present invention, an image is not particularly limited. Herein, an image may be, for example, an image displayed on a displaying device as described above.

In an image projecting apparatus according to the second embodiment of the present invention, a surface to be projected on is not particularly limited. Herein, a surface to be projected on may be, for example, a flat surface or screen.

In an image projecting apparatus according to the second embodiment of the present invention, to project includes to conduct enlargement and projection, to conduct projection at a same magnification, or to conduct reduction and projection, and preferably is to conduct enlargement and projection. When to project is to conduct enlargement and projection in an image projecting apparatus according to the second embodiment of the present invention, it may be possible to provide an image projecting apparatus capable of enlarging and projecting an image onto a surface to be projected on.

According to the second embodiment of the present invention, it may be possible to provide a more compact image projecting apparatus capable of projecting a better image onto a surface to be projected on at a shorter distance, because a projection optical system is a projection optical system according to the first embodiment of the present invention.

Figure 2:
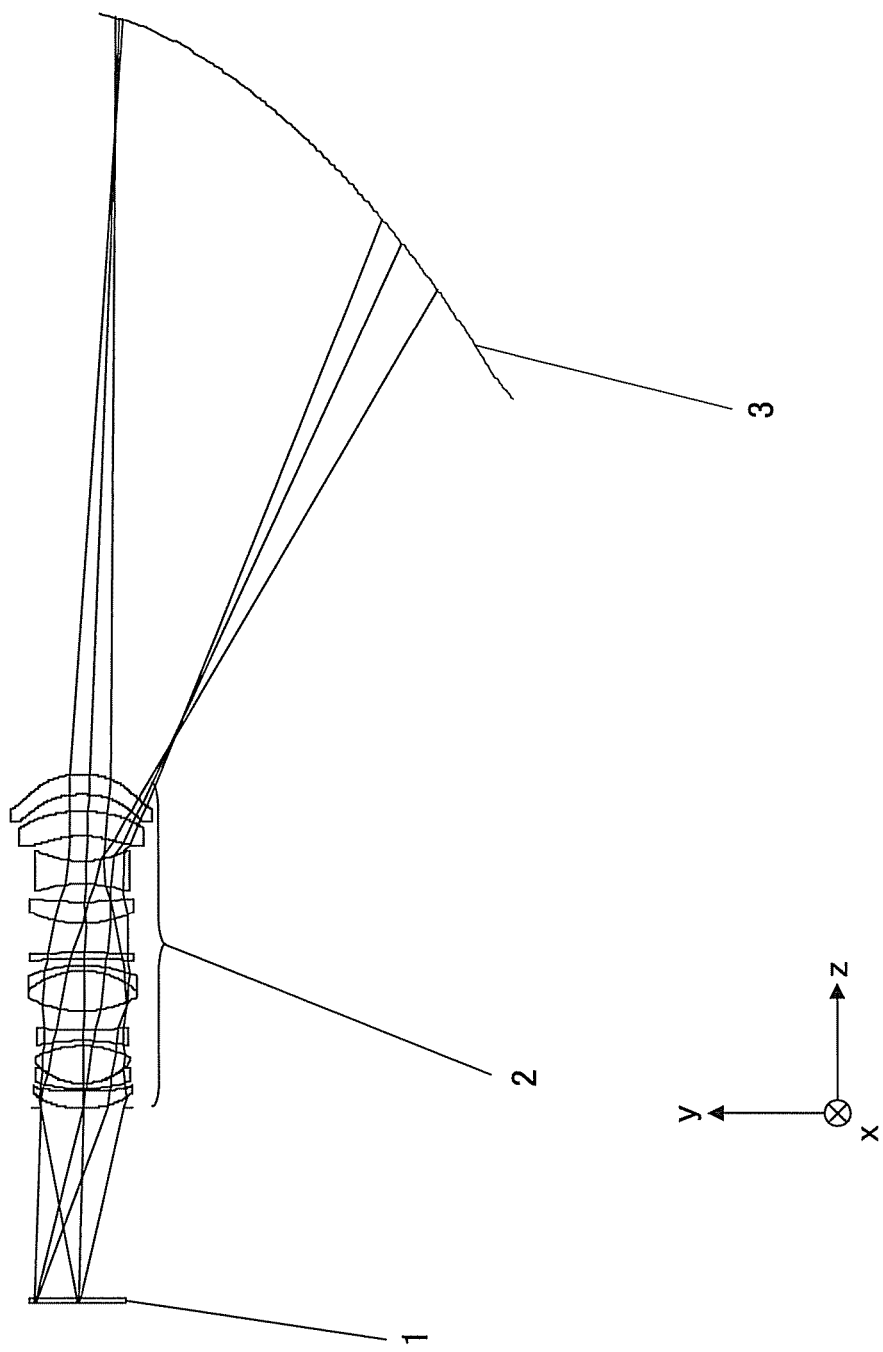
FIG. 2 is a diagram illustrating a first optical system and a second optical system for an example of a projection optical system according to an embodiment of the present invention.

FIG. 1 is a diagram illustrating an example of a projection optical system according to an embodiment of the present invention and an example of an image projecting apparatus according to an embodiment of the present invention. FIG. 2 is a diagram illustrating a first optical system and a second optical system for an example of a projection optical system according to an embodiment of the present invention.

A projector as an image projecting apparatus illustrated in FIG. 1 has a projection optical system illustrated in FIG. 1 and FIG. 2. In a projector illustrated in FIG. 1, an image forming part 1 for forming an image depending on a modulation signal is irradiated with illumination light from a light source to form an image on the image forming part 1.

The projection optical system illustrated in FIG. 1 and FIG. 2 is a projection optical system for projecting an image formed on the image forming part 1 onto a screen 4. The projection optical system illustrated in FIG. 1 and FIG. 2 has a first optical system 2 and a second optical system 3 from a side of the image forming part 1. The first optical system 2 is a coaxial optical system having a positive power and having a refractive optical system. The second optical system 3 is an optical system including a reflection surface having a positive power. Plural light beams from an image formed on the image forming part 1 are generally focused to form an intermediate image between the first optical system 2 and the second optical system 3. An image formed on the image forming part 1 is imaged as an intermediate image on an optical path between the first optical system 2 and the second optical system 3, and an image to be obtained by enlarging the intermediate image is projected and imaged onto the screen 4. The projection optical system totally enlarges and projects onto the screen 4 an image formed on the image forming part 1 (an image for a large screen). It may be possible for a configuration of a projection optical system illustrated in FIG. 1 and FIG. 2 to reduce a projection distance of a projection optical system (a distance from a principal point of the second optical system 3 at a side of screen 4 to screen 4). As a result, it may be possible to use a projector even in a comparatively small conference room, etc.

Additionally, X, Y, and Z for a coordinate system in FIG. 1 and FIG. 2 are a direction of a longitudinal axis of the screen 4, a direction of a transverse axis of the screen 4, and a direction of a normal line of the screen 4 or a direction of an optical axis of the first optical system 2, respectively.

If a projection distance of a projection optical system increases, an image to be projected may be blocked by a presenter standing between a projector and the screen 4 for presentation, etc., or a shade of a presenter standing between a projector and the screen 4 for presentation, etc., may be projected onto the screen 4.

A throw ratio is used as a parameter for indicting a projection distance of a projection optical system and an enlargement factor of a projection optical system in a projector. A throw ratio is a ratio of a size of an image projected on a screen in a horizontal direction (a width of an image projected on a screen) to a projection distance of a projection optical system. In the projection optical system illustrated in FIG. 1 and FIG. 2, a throw ratio Tr is a ratio of a distance from a principal point of the second optical system 3 at a side of screen 4 to the screen 4 to a size of an image projected on the screen 4 in an X-direction.

Figure 3:
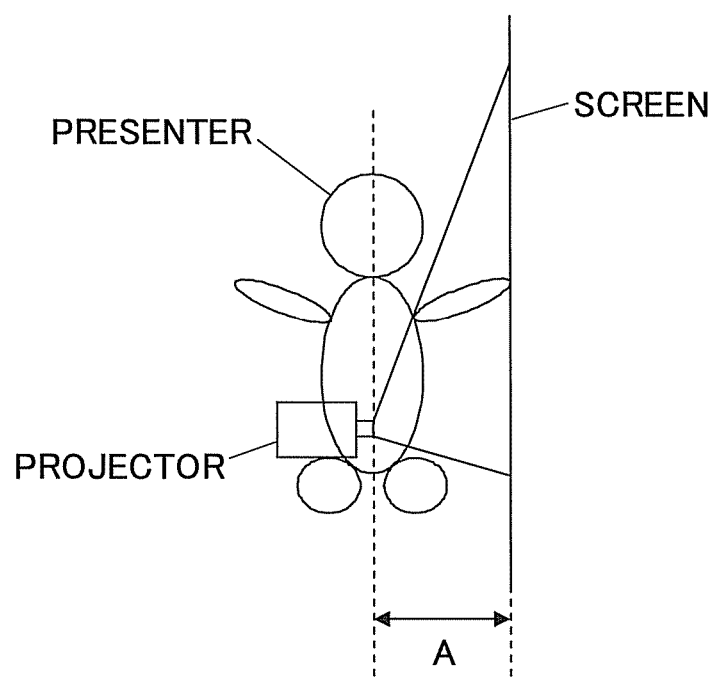
FIG. 3 is a diagram illustrating a throw ratio for an example of a projection optical system according to an embodiment of the present invention.

FIG. 3 is a diagram illustrating a throw ratio for an example of a projection optical system according to an embodiment of the present invention.

As illustrated in FIG. 3, if a projection distance of a projection optical system included in a projector is large, a presenter standing between a projector and a screen for presentation, etc., may block light to be projected or a shade of a presenter standing between a projector and a screen for presentation, etc., may be projected onto the screen. A projection distance of a projection optical system included in a projector is reduced to reduce a problem of blocking of light to be projected by a presenter.

As illustrated in FIG. 3, when a projection distance of a projection optical system included in a projector is smaller than a distance A from a body center of a presenter to a fingertip of the presenter, it may be possible to reduce a problem of blocking of light to be projected by a presenter. For example, when a distance A from a body center of a presenter to a fingertip of the presenter is 900 mm and a 60-inch image with an aspect ratio of 16:10 is projected by a projection optical system, a throw ratio for the projection optical system is 900 mm/(60 inches×25.4 mm/inch×16/$(16^2+10^2)$)~0.7. Hence, a throw ratio for a projection optical system included in a projector is preferably less than or equal to 0.7 to reduce a problem of blocking of light to be projected by a presenter.

In the projection optical system illustrated in FIG. 1 and FIG. 2, a value Im of a length of an intermediate image in a Z-direction divided by a focal length of the first optical system 2 is defined. A length of an intermediate image in a Z-direction is a distance between a position of an image point nearest the first optical system 2 in a Z-direction and a position of an image point nearest the second optical system 3 in the Z-direction, among image points for intermediate images of a meridional light ray and a sagittal light ray of each light beam from an image formed on the image forming part 1.

A value Im of a length of an intermediate image in a Z-direction divided by a focal length of the first optical system 2 tends to increase when a throw ratio for a projection optical system included in a projector is reduced.

Figure 4:
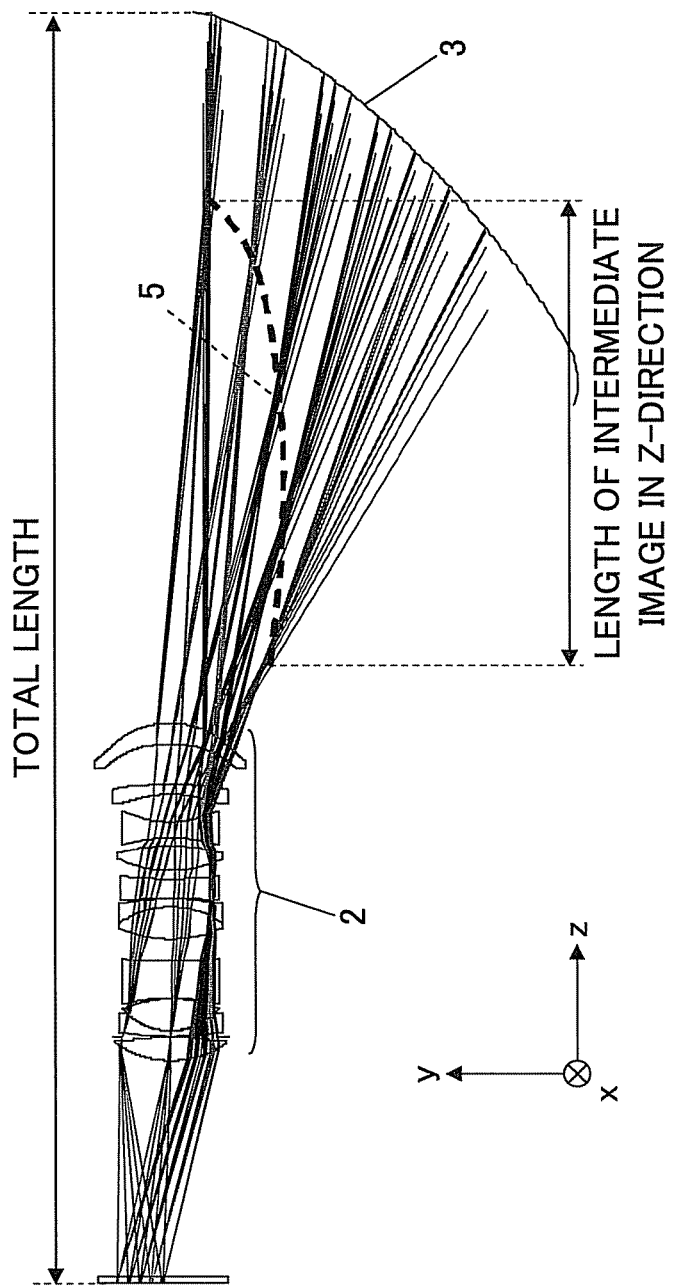
FIG. 4 is a diagram illustrating a total length of an optical system and a length of an intermediate image for an example of a projection optical system according to an embodiment of the present invention.

FIG. 4 is a diagram illustrating a total length of an optical system and a length of an intermediate image for an example of a projection optical system according to an embodiment of the present invention. In a projection optical system illustrated in FIG. 4, an intermediate image 5 with a cross-section in a YZ-plane indicated by a dashed line in FIG. 4 is formed. In the projection optical system illustrated in FIG. 4, a total length of the projection optical system is a distance from an object point for an object to a last end of the second optical system 3 in a direction of an optical axis of the first optical system 2 with respect to a principal light ray of a light beam nearest the optical axis of the first optical system 2 included in the projection optical system.

As illustrated in FIG. 4, a distance from a last end of the first optical system 2 to a last end of the second optical system 3 tends to increase when a value Im of a length of an intermediate image in a Z-direction divided by a focal length of the first optical system 2 increases, and hence, a total length of a projection optical system and a size of a projector also tend to increase.

In the projection optical system illustrated in FIG. 1 and FIG. 2, an intermediate image satisfies a condition of Im×Tr≤1.70. When an intermediate image satisfies a condition of Im×Tr≤1.70, a balance between a length Im of an intermediate image in a Z-direction divided by a focal length of the first optical system 2 and a throw ratio for a projection optical system is better, and hence, it may be possible to provide a more compact projection optical system capable of projecting an image onto the screen 4 at a shorter distance or a more compact image projecting apparatus capable of projecting an image onto the screen 4 at a shorter distance. Furthermore, it may be possible to project an image onto the screen 4 at a shorter distance, and hence, it may be possible to provide a more compact projection optical system with a reduced problem of blocking of light to be projected by a presenter or a more compact image projecting apparatus with a reduced problem of blocking of light to be projected by a presenter.

When a throw ratio Tr for a projection optical system included in a projector is reduced, an angle of incidence of a light ray to be projected onto the screen 4 tends to increase. When an angle of incidence of a light ray to be projected onto the screen 4 increases, an astigmatic aberration for a projection optical system tends to increase. When a distance from an optical axis of the first optical system 2 in a direction of a transverse axis of the screen 4 increases (increases in a +Y-direction), an angle of incidence of a light ray incident on the screen 4 tends to increase. For example, when a projection distance of a projection optical system included in a projector is reduced, an angle of incidence of a light ray incident on the screen tends to increase, and when a distance from an optical axis of the first optical system 2 increases in a +Y-direction, an increase in an angle of incidence of a light ray incident on the screen 4 tends to be more significant and an astigmatic aberration for the projection optical system tends to increase.

Then, a value Im of a length of an intermediate image in a Z-direction divided by a focal length of the first optical system 2 is increased in a projection optical system illustrated in FIG. 1 and FIG. 2 and a throw ratio Tr for a projection optical system included in a projector is reduced while an aberration such as an astigmatic aberration for a projection optical system is reduced and a better image is projected onto the screen 4.

As illustrated in FIG. 1, FIG. 2, and FIG. 4, when a distance from an optical axis of the first optical system 2 in a direction of a transverse axis of the screen 4 increases (increases in a +Y-direction), an image point for an intermediate image which corresponds to a light beam to be projected onto the screen 4 tends to approach the first optical system 2. When an intermediate image is formed at a position nearer to the first optical system 2, a cross-section of a light beam which corresponds to an intermediate image in the second optical system 3 tends to increase. Hence, it may be possible to correct an aberration for a light beam corresponding to an intermediate image better by appropriately adjusting a shape of a reflection surface composing the second optical system 3, etc.

Thus, in the projection optical system illustrated in FIG. 1 and FIG. 2, it may be possible to project a better image onto the screen 4 while a value Im of a length of an intermediate image in a Z-direction divided by a focal length of the first optical system 2 is increased and a throw ratio Tr for the projection optical system included in a projector is reduced.

Hence, in a projection optical system including the first optical system 2 which forms an intermediate image conjugate to an image formed on the image forming part 1 and has an optical axis and the second optical system 3 which projects an image conjugate to the intermediate image onto the screen 4, the intermediate image satisfies a condition of Im×Tr≤1.70, whereby it may be possible to provide a more compact projection optical system capable of projecting a better image onto the screen 4 at a shorter distance or a more compact image projecting apparatus capable of projecting a better image onto the screen 4 at a shorter distance.

In the projection optical system illustrated in FIG. 1 and FIG. 2, an intermediate image further satisfies a condition of Im×Tr≤1.50. When an intermediate image satisfies a condition of Im×Tr≤1.50, it may be possible to further reduce a value Im of a length of an intermediate image in a Z-direction divided by a focal length of the first optical system 2, and hence, it may be possible to provide a more compact projection optical system or a more compact image projecting apparatus.

In the projection optical system illustrated in FIG. 1 and FIG. 2, an intermediate image further satisfies a condition of 0.50≤Im×Tr. When an intermediate image satisfies a condition of 0.50≤Im×Tr, it may be possible to further increase a value Im of a length of an intermediate image in a Z-direction divided by a focal length of the first optical system 2, and hence, it may be possible to correct an aberration for a light beam corresponding to an intermediate image better by adjusting a shape of a reflection surface composing the second optical system 3, etc. As a result, it may be possible to provide a projection optical system capable of projecting a better image onto the screen 4 or an image projecting apparatus capable of projecting a better image onto the screen 4.

In the projection optical system illustrated in FIG. 1 and FIG. 2, the first optical system 2 has a refractive optical system including an aspheric surface. When the first optical system 2 has a refractive optical system including an aspheric surface, it may be possible to increase a freedom of design of the first optical system 2 and it may be easier to conduct aberration correction for the projection optical system. As a result, it may be possible to provide a projection optical system capable of projecting a better image onto the screen 4 or an image projecting apparatus capable of projecting a better image onto the screen 4.

In the projection optical system illustrated in FIG. 1 and FIG. 2, the second optical system 3 includes a reflection surface having a free-form surface shape. Because the second optical system 3 includes a reflection surface having a free-form surface shape, it may be possible to adjust a surface shape of a reflection surface for each light beam corresponding to an image point for an intermediate image and it may be possible to conduct aberration correction for each light beam corresponding to an image point for an intermediate image. As a result, it may be possible to provide a projection optical system capable of projecting a better image onto the screen 4 or an image projecting apparatus capable of projecting a better image onto the screen 4.

In the projection optical system illustrated in FIG. 1 and FIG. 2, a Petzval sum for the first optical system 2 is less than or equal to −0.010 mm$^{-1}$. When a Petzval sum for the first optical system 2 is less than or equal to −0.010 mm$^{-1}$, it may be possible to curve toward a side of the first optical system 2 an image plane of an intermediate image to be imaged by the first optical system 2 and increase a field curvature of an intermediate image to be imaged by the first optical system 2. As a result, it may be possible to increase a cross-section of a light beam corresponding to an image point for an intermediate image in the second optical system 3. Thereby, it may be possible to correct an aberration for a light beam corresponding to an image point for an intermediate image more effectively due to the second optical system 3. As a result, it may be possible to provide a projection optical system capable of projecting a better image onto the screen 4. Hence, it may be possible to provide an image projecting apparatus capable of projecting a better image onto the screen 4.

PRACTICAL EXAMPLES

In each practical example according to an embodiment of the present invention, a size, aspect ratio, and enlargement factor of an image to be projected onto a screen are 0.64 inches, 16:10, and 94, respectively. Herein, an enlargement factor is an approximate ratio of a size of an image projected on a screen to a size of an image formed on an image forming part. Furthermore, practical examples 1-7, 10, and 11 are examples of a projection optical system with F2.5 while practical examples 8 and 9 are examples of a projection optical system with F4.

Practical Example 1

Table 1 illustrates the data of a projection optical system in practical example 1.

In Table 1, a shift indicates an amount of shift decentering in a y-direction and a tilt indicates an amount of tilt decentering about an x-axis as an axis of rotation. In Table 1, the units of a radius of curvature, a surface distance, and an amount of shift decentering are "mm" and the unit of an amount of tilt decentering is "degrees". Furthermore, with respect to signs for a shift and a tilt in Table 1, a shift in a positive direction in a direction of a Y-axis has a + sign and a tilt in a counterclockwise rotation about an X-axis has a + sign. The definitions and units of a shift and a tilt and the units of a radius of curvature, a surface distance, and an amount of shift decentering in any of practical examples 2-11 are similar to those in practical example 1.

Aspheric surfaces used for a third surface, a fourth surface, and twentieth to twenty-third surfaces of a projection optical system in practical example 1 are rotationally symmetric aspheric surfaces. A rotationally asymmetric aspheric surface may be used instead of a rotationally symmetric aspheric surface.

A rotationally symmetric aspheric surface is an aspheric surface represented by a formula of:

$$Z = c \cdot r^2 / [1 + \sqrt{\{1 - (1+k)c^2 r^2\}}] + A r^4 + B r^6 + C r^8 + \ldots$$

Z denotes a depth of a rotationally symmetric aspheric surface in a direction of an optical axis thereof. c denotes a paraxial radius of curvature of a rotationally symmetric aspheric surface. r denotes a distance from an optical axis in a direction orthogonal to the optical axis. k denotes a cone coefficient or constant of a rotationally symmetric aspheric surface. A, B, C, ..., etc., denote higher-order aspheric surface coefficients of a rotationally symmetric aspheric surface. A shape of a rotationally symmetric aspheric surface is specified by determining values of c, k, A, B, C, ..., etc. The

TABLE 1

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |
| 3 | ASPHERIC SURFACE | 20.55 | 4.27 | 1.51 | 63.90 | −1.33 | |
| 4 | ASPHERIC SURFACE | −41.49 | 0.10 | | | | |
| STOP | SPHERE | ∞ | 0.10 | | | | |
| 6 | SPHERE | 72.85 | 1.00 | 1.84 | 40.06 | | |
| 7 | SPHERE | 12.34 | 7.48 | 1.49 | 70.44 | | |
| 8 | SPHERE | −18.76 | 0.10 | | | | |
| 9 | SPHERE | −21.86 | 3.52 | 1.77 | 35.62 | | |
| 10 | SPHERE | −115.34 | 0.10 | | | | |
| 11 | SPHERE | 30.65 | 6.00 | 1.58 | 41.19 | | |
| 12 | SPHERE | −13.07 | 1.30 | 1.83 | 43.06 | | |
| 13 | SPHERE | −28.60 | 0.10 | | | | |
| 14 | SPHERE | 295.75 | 5.79 | 1.61 | 60.99 | | |
| 15 | SPHERE | 32.44 | 8.41 | | | | |
| 16 | SPHERE | 17.34 | 5.13 | 1.70 | 29.10 | | |
| 17 | SPHERE | −46.19 | 2.00 | | | | |
| 18 | SPHERE | −28.23 | 4.25 | 1.84 | 27.35 | | |
| 19 | SPHERE | 15.76 | 4.70 | | | | |
| 20 | ASPHERIC SURFACE | −16.05 | 1.35 | 1.53 | 55.80 | | |
| 21 | ASPHERIC SURFACE | −228.23 | 6.10 | | | | |
| 22 | ASPHERIC SURFACE | −41.02 | 5.20 | 1.53 | 55.80 | | |
| 23 | ASPHERIC SURFACE | −17.59 | 0.10 | | | | |
| 24 | SPHERE | ∞ | 90.00 | | | | |
| 25 | xy-POLYNOMIAL SURFACE | −92.08 | −170.11 | REFLECTION | | −70.15 | −56.16 |
| 26 | SPHERE | ∞ | 0.00 | | | | | definition of a rotationally symmetric aspheric surface in any of practical examples 2-11 is also similar to that of practical example 1. When an aspheric surface lens is used for a first optical system, a freedom of design of a first optical system may be higher, and hence, a quality of an image projected on a screen may be improved.

Table 2 illustrates coefficients of an aspheric surface for a projection optical system in practical example 1.

TABLE 2

| | SURFACE NUMBER | | | | | |
|---|---|---|---|---|---|---|
| | 3 | 4 | 20 | 21 | 22 | 23 |
| 4th ORDER COEFFICIENT (A) | 3.67E−05 | 4.19E−05 | 1.30E−04 | −8.27E−06 | −1.15E−04 | −3.64E−05 |
| 6th ORDER COEFFICIENT (B) | 3.18E−09 | −1.38E−08 | 3.81E−06 | 1.19E−06 | −5.72E−07 | −6.30E−07 |
| 8th ORDER COEFFICIENT (C) | 5.57E−10 | −1.22E−10 | −1.16E−07 | −1.35E−08 | 6.91E−09 | 1.08E−08 |
| 10th ORDER COEFFICIENT (D) | −1.25E−12 | 2.75E−11 | 2.45E−09 | 1.86E−10 | 2.88E−13 | −1.40E−10 |
| 12th ORDER COEFFICIENT (E) | 2.90E−14 | −6.12E−13 | −2.76E−11 | −1.14E−12 | −7.37E−14 | 1.11E−12 |
| 14th ORDER COEFFICIENT (F) | −1.05E−15 | 5.38E−15 | 1.53E−13 | −5.19E−16 | −6.28E−16 | −4.49E−15 |
| 16th ORDER COEFFICIENT (G) | 1.11E−17 | −1.33E−17 | −3.20E−16 | 1.96E−17 | 3.92E−18 | 7.14E−18 |

A reflection surface in practical example 1 is an anamorphic polynomial free-form surface. When a reflection surface having a positive power in a second optical system is an anamorphic polynomial free-form surface, is may be possible to adjust a shape of a reflection for each light, beam corresponding to an image point of an intermediate image, and hence, it may be possible to improve a performance of aberration correction for a projection optical system. An anamorphic polynomial free-form surface is a surface represented by a formula of:

$$Z = X2 \cdot x^2 + Y2 \cdot y^2 + X2Y \cdot x^2 y + Y3 \cdot y^3 + X4 \cdot x^4 + X2Y2 \cdot x^2 y^2 + Y4 \cdot y^4 + X4Y \cdot x^4 y + X2Y3 \cdot x^2 y^3 + Y5 \cdot y^5 + X6 \cdot x^6 + X4Y2 \cdot x^4 y^2 + X2Y4 \cdot x^2 y^4 + Y6 \cdot y^6 + \ldots \quad (1)$$

While an image projected on a screen is a reference, a top or bottom direction, a left or right direction, and a direction of a depth of surface are a Y-direction, an X-direction, and a Z-direction, respectively, and X2, Y2, X2Y, Y3, X2Y2, . . . , etc., are coefficients of a polynomial free-form surface.

Table 3 illustrates coefficients of a polynomial free-form surface of a projection optical system in practical example 1. The definition of an anamorphic polynomial free-form surface in any of practical examples 2-11 is also similar to that of practical example 1.

TABLE 3

| COEFFICIENT | VALUE |
|---|---|
| X2 | −4.20E−04 |
| Y2 | 3.13E−03 |
| X2Y | −3.00E−05 |
| Y3 | −2.53E−07 |
| X4 | −1.22E−07 |
| X2Y2 | −2.04E−08 |
| Y4 | 4.35E−07 |

TABLE 3-continued

| COEFFICIENT | VALUE |
|---|---|
| X4Y | −2.32E−09 |
| X2Y3 | −2.08E−09 |
| Y5 | −1.03E−08 |
| X6 | 1.57E−10 |

TABLE 3-continued

| COEFFICIENT | VALUE |
|---|---|
| X4Y2 | 4.50E−11 |
| X2Y4 | −6.07E−10 |
| Y6 | −5.01E−10 |
| X6Y | 1.88E−12 |
| X4Y3 | −2.31E−13 |
| X2Y5 | 2.94E−11 |
| Y7 | 4.35E−11 |
| X8 | −9.63E−14 |
| X6Y2 | −1.03E−13 |
| X4Y4 | 3.23E−13 |
| X2Y6 | −3.55E−13 |
| Y8 | −1.27E−12 |
| X8Y | −1.34E−15 |
| X6Y3 | −1.05E−15 |
| X4Y5 | −1.83E−14 |
| X2Y7 | −9.39E−15 |
| Y9 | 1.88E−14 |
| X10 | 2.99E−17 |
| X8Y2 | 5.25E−17 |
| X6Y4 | −2.20E−17 |
| X4Y6 | 3.39E−16 |
| X2Y8 | 3.08E−16 |
| Y10 | −1.43E−16 |
| X10Y | 2.57E−19 |
| X8Y3 | 3.59E−19 |
| X6Y5 | 2.43E−18 |
| X4Y7 | −2.20E−18 |
| X2Y9 | −3.08E−18 |
| Y11 | 4.65E−19 |
| X12 | −3.72E−21 |
| X10Y2 | −8.83E−21 |
| X8Y4 | −1.14E−20 |
| X6Y6 | −2.84E−20 |
| X4Y8 | 1.29E−21 |
| X2Y10 | 1.02E−20 |
| Y12 | −2.28E−22 |

TABLE 3-continued

| COEFFICIENT | VALUE |
| --- | --- |

TABLE 4

| POSITION OF LIGHT RAY | xfo | yfo |
| --- | --- | --- |
| f1 | 127.9 | 125.5 |
| f2 | 99.8 | 63.3 |
| f3 | 63.5 | 8.1 |
| f4 | 93.6 | 115.2 |
| f5 | 91.9 | 47.8 |
| f6 | 59.4 | 3.7 |
| f7 | 41.7 | 88.1 |
| f8 | 17.9 | 71.0 |
| f9 | 50.9 | −5.3 |

A value of Im×Tr for a projection optical system in practical example 1 will be obtained.

Figure 5:
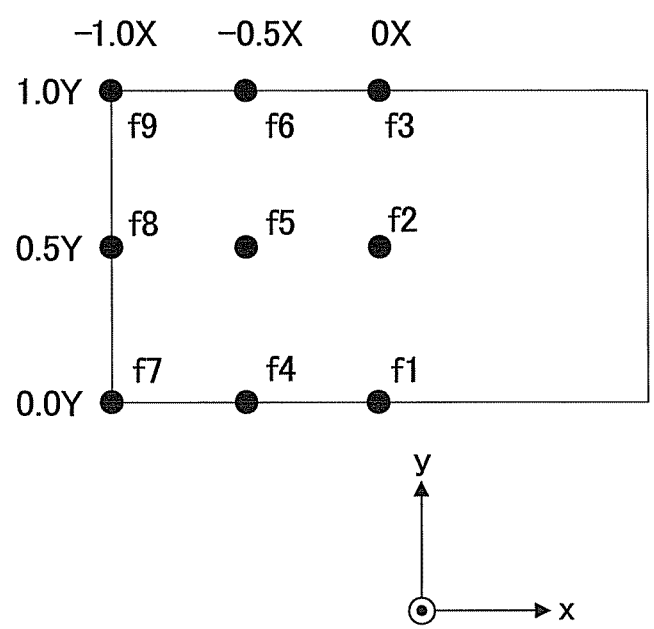
FIG. 5 is a diagram illustrating examples of a position of an object point in an image forming part for an image projecting apparatus in practical example 1 according to an embodiment of the present invention.

FIG. 5 is a diagram illustrating examples of a position of an object point in an image forming part for an image projecting apparatus in practical example 1 according to an embodiment of the present invention. FIG. 5 illustrates nine lattice points (object points) f1 to f9 obtained by equally dividing an area of X≤0 of an image plane present on an XY plane into three parts in an X-direction and equally dividing it into three parts in a Y-direction. Table 4 illustrates positions of image points of intermediate images of a sagittal light ray and a meridional light ray from each of nine lattice points in FIG. 5 in a Z-direction (which are denoted by xfo and yfo, respectively). Herein, an origin of xfo and yfo is present at a position of a last end of a first optical system on an optical axis of the first optical system. In practical example 1, an image point nearest a second optical system is xfo of f1 and an image point nearest a first optical system is yfo of f9. A length of an intermediate image in a direction of an optical axis of a first optical system for a projection optical system in practical example 1 is |xfo of f1−yfo of f9|=127.9 mm−(−5.3 mm)=133.2 mm. Furthermore, a focal length of a first optical system included in a projection optical system in practical example 1 is 26.57 mm. Hence, a normalized length Im of an intermediate image in a direction of an optical axis of a first optical system for a projection optical system in practical example 1 is 133.2 mm/26.57 mm=5.01.

In practical example 1, a projection distance of a projection optical system is a distance in a Z-direction from a reflection point on a reflection surface of a second optical system to a screen with respect to a principal light ray of a light beam nearest an optical axis of a first optical system among light beams from an image forming part. In practical example 1, a projection distance of a projection optical system is 226.5 mm. A projection optical system in practical example 1 is to project a 60-inch image. Hence, a throw ratio Tr for a projection optical system in practical example 1 is 0.18.

Accordingly, a value of Im×Tr for a projection optical system in practical example 1 is 5.01×0.18=0.90.

Figure 6:
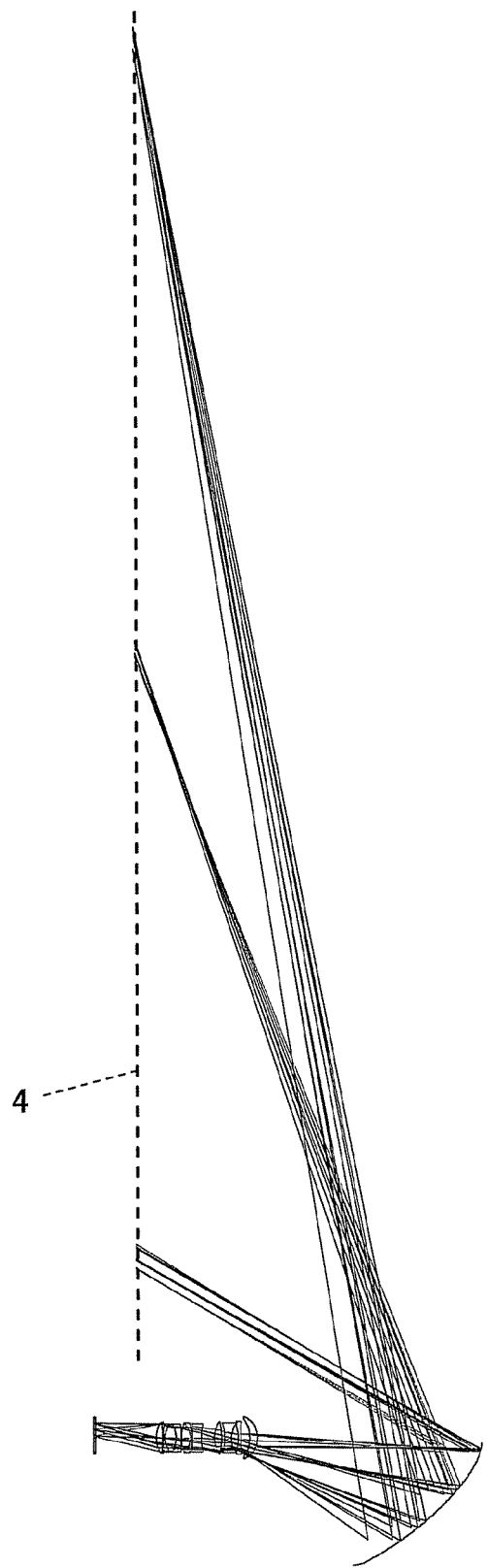
FIG. 6 is a diagram illustrating a projection optical system and an image projecting apparatus in practical example 1 according to an embodiment of the present invention.
Figure 7:
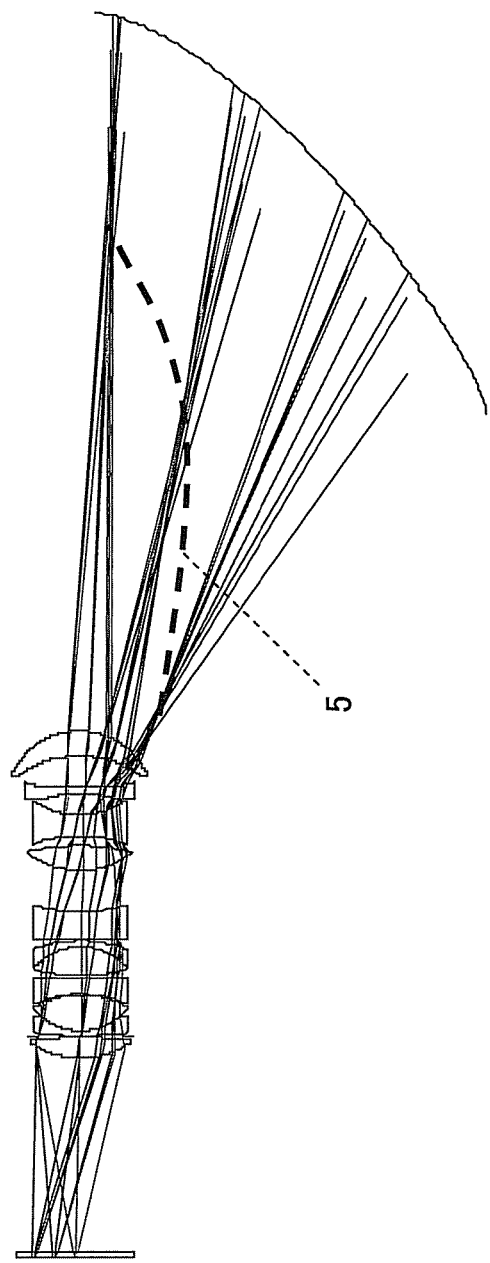
FIG. 7 is a diagram illustrating a first optical system and a second optical system for a projection optical system in practical example 1 according to an embodiment of the present invention.

FIG. 6 is a diagram illustrating a projection optical system and an image projecting apparatus in practical example 1 according to an embodiment of the present invention. FIG. 6 illustrates an optical path for a projection optical system in practical example 1. FIG. 7 is a diagram illustrating a first optical system and a second optical system for a projection optical system in practical example 1 according to an embodiment of the present invention. FIG. 7 is an enlarged view of a first optical system and a second optical system.

As illustrated in FIG. 7, an intermediate image 5 with a cross-section in a YZ-plane indicated by a dashed line in FIG. 7 is formed in a projection optical system in practical example 1. A light beam for forming the intermediate image 5 is not necessarily focused into one point and may have an aberration. An aberration remaining on the intermediate image 5 may be corrected by a second optical system. Additionally, innumerable light beams are emitted from an image forming part in an image projecting apparatus illustrated in FIG. 6 and FIG. 7 but not all of such light beams are illustrated in any of FIG. 6 and FIG. 7. A dashed line in FIG. 7 indicates a curve obtained by connecting image points of an intermediate image of a light beam illustrated in FIG. 7.

In any of practical examples 1-7, a first optical system included in a projection optical system is composed of eleven lenses and a stop but the number of lenses composing a lens element in a first optical system included in a projection optical system is not necessarily needed to be eleven. Also, a position of a stop in a first optical system included in a projection optical system is not necessarily needed to be a position illustrated in FIG. 7.

Figure 8:
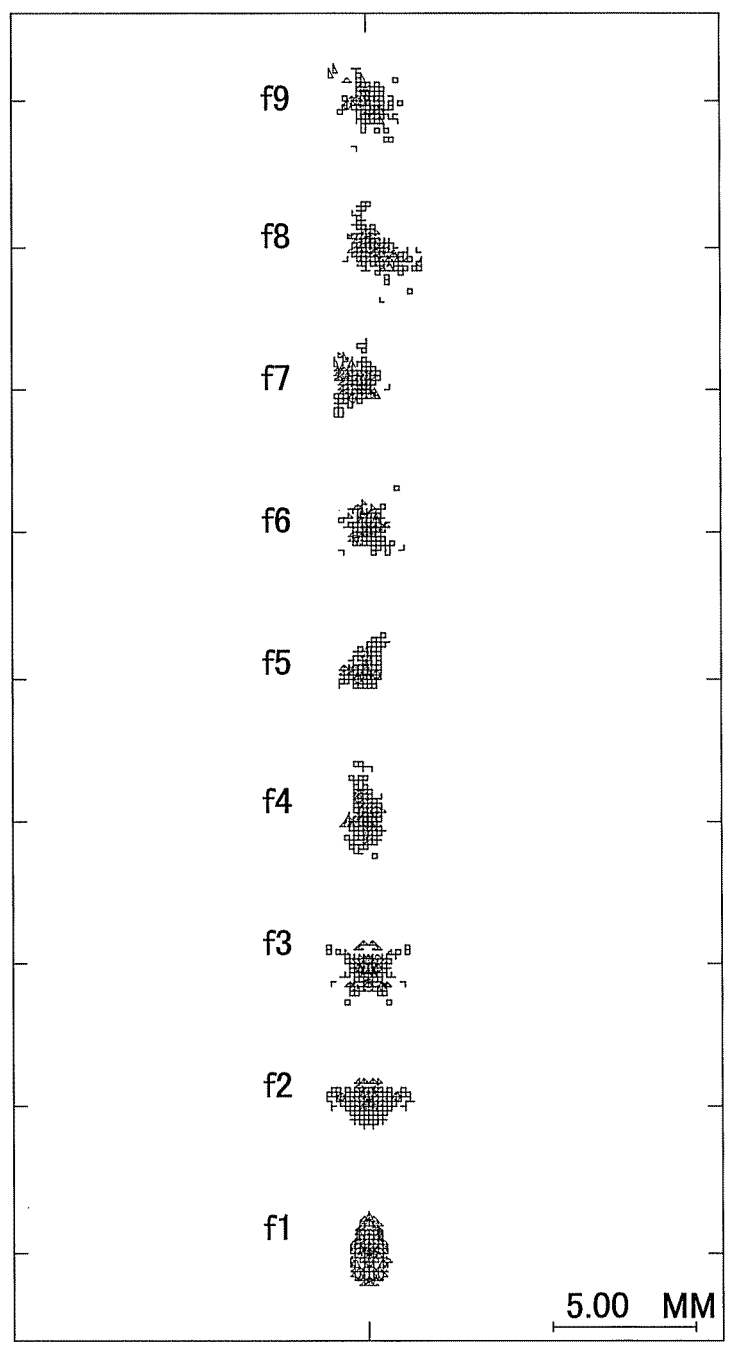
FIG. 8 is a diagram illustrating a spot on a surface to be projected on for a projection optical system in practical example 1 according to an embodiment of the present invention.

FIG. 8 is a diagram illustrating a spot on a surface to be projected on for a projection optical system in practical example 1 according to an embodiment of the present invention. FIG. 8 illustrates a spot diagram corresponding to lattice points f1-f9 on an image forming part included in an image projecting apparatus in practical example 1. In practical example 1, a screen (or image plane) is present on an XY-plane. A characteristic of a spot on a screen in practical example 1 indicates a symmetric spot characteristic in ±X-directions while a Y-axis is a reference, and hence, only a potion of a spot in a −X-direction is illustrated in FIG. 8. As illustrated in FIG. 8, a spot on a screen in practical example 1 is focused well. In practical example 1, A WXGA class of resolution is obtained. A value of a white Modulation Transfer Function (MTF) with respect to a frequency in a WXGA resolution is greater than or equal to 50% over an entire area of an image projected on a screen.

Figure 9:
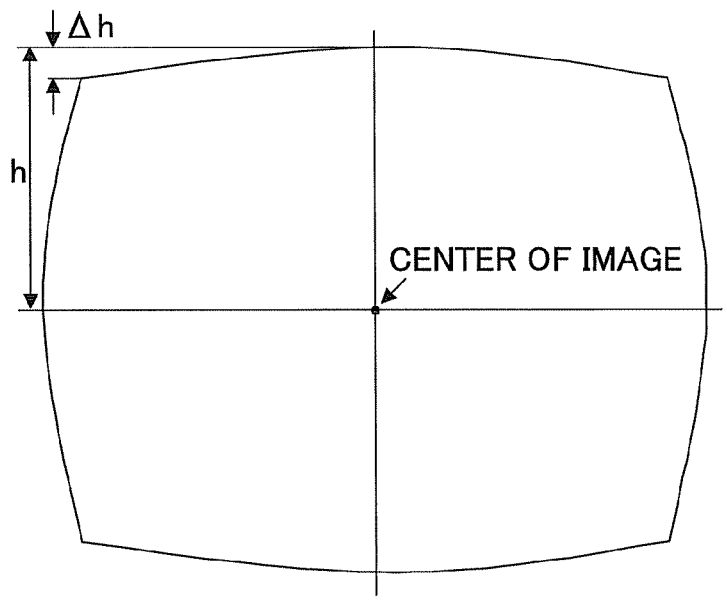
FIG. 9 is a diagram illustrating a TV distortion for an example of a projection optical system according to an embodiment of the present invention.

FIG. 9 is a diagram illustrating a TV distortion for an example of a projection optical system according to an embodiment of the present invention. As illustrated in FIG. 9, a TV distortion for a projection optical system according to an embodiment of the present invention is a numerical value for representing a distortion in a longitudinal direction for an image (or second image) projected on a surface to be projected on, and is defined as Dh=(Δh/2h)×100. Dh denotes a TV distortion. h denotes a length from a center of an image to an edge of an image in a transverse direction of the image. Δh denotes a distance between a straight line extending in a longitudinal direction of an image through an apex of the image and a straight line extending in a longitudinal direction of the image through an edge of the image in a transverse direction of the image.

Figure 10:
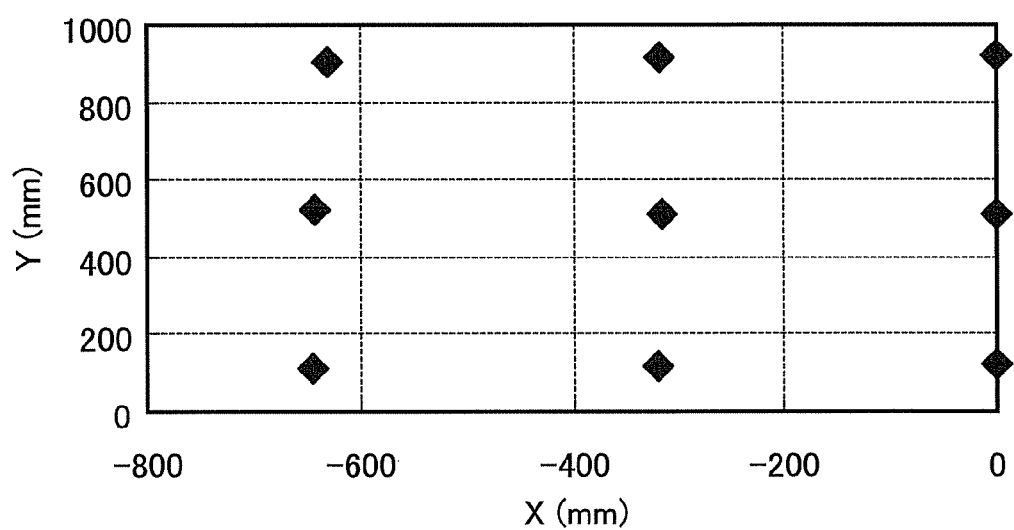
FIG. 10 is a diagram illustrating a TV distortion characteristic for a projection optical system in practical example 1 according to an embodiment of the present invention.

FIG. 10 is a diagram illustrating a TV distortion characteristic for a projection optical system in practical example 1 according to an embodiment of the present invention. A TV distortion for a projection optical system in practical example 1 is less than or equal to 2%. A distortion for a projection optical system in practical example 1 is corrected well.

Practical Example 2

Table 5 illustrates the data of a projection optical system in practical example 2. In practical example 2, a projection distance of a projection optical system and a size of an image projected on a screen are 295 mm and 60 inches, respectively, and hence, a throw ratio for a projection optical system in practical example 2 is 0.23.

TABLE 5

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |
| 3 | ASPHERIC SURFACE | 18.83 | 4.28 | 1.51 | 63.90 | −1.57 | |
| 4 | ASPHERIC SURFACE | −47.71 | 0.10 | | | | |
| STOP | SPHERE | ∞ | 0.10 | | | | |
| 6 | SPHERE | 54.82 | 1.00 | 1.84 | 42.36 | | |
| 7 | SPHERE | 11.67 | 5.89 | 1.49 | 70.38 | | |
| 8 | SPHERE | −22.39 | 0.10 | | | | |
| 9 | SPHERE | −38.57 | 7.00 | 1.75 | 35.13 | | |
| 10 | SPHERE | 212.66 | 3.98 | | | | |
| 11 | SPHERE | 23.16 | 6.00 | 1.58 | 40.77 | | |
| 12 | SPHERE | −16.53 | 1.51 | 1.83 | 43.00 | | |
| 13 | SPHERE | −48.44 | 0.10 | | | | |
| 14 | SPHERE | −84.87 | 3.60 | 1.55 | 45.37 | | |
| 15 | SPHERE | 85.22 | 1.58 | | | | |
| 16 | SPHERE | 22.24 | 4.46 | 1.69 | 29.62 | | |
| 17 | SPHERE | −38.35 | 1.59 | | | | |
| 18 | SPHERE | −30.70 | 2.98 | 1.84 | 29.69 | | |
| 19 | SPHERE | 18.82 | 5.17 | | | | |
| 20 | ASPHERIC SURFACE | −18.35 | 1.80 | 1.53 | 55.80 | | |
| 21 | ASPHERIC SURFACE | −66.43 | 7.48 | | | | |
| 22 | ASPHERIC SURFACE | −27.22 | 3.86 | 1.53 | 55.80 | | |
| 23 | ASPHERIC SURFACE | −17.94 | 0.10 | | | | |
| 24 | SPHERE | ∞ | 90.00 | | | | |
| 25 | xy-POLYNOMIAL SURFACE | −91.82 | −254.12 | REFLECTION | | −51.93 | −59.29 |
| 26 | SPHERE | ∞ | 0.00 | | | | |

Table 6 illustrates coefficients of an aspheric surface for a projection optical system in practical example 2.

TABLE 6

| | SURFACE NUMBER | | | | | |
|---|---|---|---|---|---|---|
| | 3 | 4 | 20 | 21 | 22 | 23 |
| 4th ORDER COEFFICIENT (A) | 2.48E−05 | 4.12E−05 | 5.34E−05 | 1.57E−08 | −9.05E−05 | −4.06E−05 |
| 6th ORDER COEFFICIENT (B) | −1.24E−08 | −1.55E−08 | 3.30E−06 | 6.62E−07 | −6.39E−07 | −6.27E−07 |
| 8th ORDER COEFFICIENT (C) | 6.45E−10 | 7.35E−12 | −1.20E−07 | −1.55E−08 | 6.71E−09 | 1.10E−08 |
| 10th ORDER COEFFICIENT (D) | −7.68E−13 | 2.71E−11 | 2.45E−09 | 1.82E−10 | 3.24E−12 | −1.35E−10 |
| 12th ORDER COEFFICIENT (E) | 2.12E−14 | −6.21E−13 | −2.74E−11 | −1.11E−12 | −3.90E−14 | 1.13E−12 |
| 14th ORDER COEFFICIENT (F) | −1.10E−15 | 5.32E−15 | 1.54E−13 | −6.55E−16 | −5.81E−16 | −4.51E−15 |
| 16th ORDER COEFFICIENT (G) | 1.03E−17 | −1.37E−17 | −3.34E−16 | 1.76E−17 | 8.32E−19 | 6.86E−18 |

Table 7 illustrates coefficients of a polynomial free-form surface for a projection optical system in practical example 2.

TABLE 7

| COEFFICIENT | VALUE |
|---|---|
| X2 | −1.16E−03 |
| Y2 | 2.93E−03 |
| X2Y | −4.21E−05 |
| Y3 | −9.02E−06 |
| X4 | −1.15E−07 |
| X2Y2 | −3.60E−07 |
| Y4 | 5.38E−07 |
| X4Y | −2.67E−09 |
| X2Y3 | 1.03E−09 |
| Y5 | −1.18E−08 |
| X6 | 1.31E−10 |
| X4Y2 | −7.72E−12 |
| X2Y4 | −6.83E−10 |
| Y6 | −5.15E−10 |
| X6Y | 1.17E−12 |
| X4Y3 | −1.26E−12 |
| X2Y5 | 2.60E−11 |
| Y7 | 4.32E−11 |
| X8 | −9.76E−14 |
| X6Y2 | −7.45E−14 |
| X4Y4 | 1.73E−13 |
| X2Y6 | −3.79E−13 |
| Y8 | −1.27E−12 |
| X8Y | −1.94E−15 |
| X6Y3 | −1.86E−15 |
| X4Y5 | −1.36E−14 |
| X2Y7 | −7.82E−15 |
| Y9 | 1.89E−14 |
| X10 | 3.48E−17 |
| X8Y2 | 8.29E−17 |
| X6Y4 | 6.21E−17 |
| X4Y6 | 3.62E−16 |
| X2Y8 | 2.65E−16 |
| Y10 | −1.42E−16 |
| X10Y | 6.40E−19 |
| X8Y3 | 3.01E−19 |
| X6Y5 | −2.12E−19 |
| X4Y7 | −2.82E−18 |
| X2Y9 | −2.10E−18 |
| Y11 | 4.60E−19 |
| X12 | −5.11E−21 |
| X10Y2 | −2.59E−20 |
| X8Y4 | −8.01E−21 |
| X6Y6 | −1.95E−20 |
| X4Y8 | −4.66E−21 |
| X2Y10 | −1.31E−22 |
| Y12 | −5.67E−22 |

A value of Im×Tr for a projection optical system in practical example 2 will be obtained.

Table 8 illustrates xfo and yfo for a projection optical system in practical example 2.

TABLE 8

| POSITION OF LIGHT RAY | xfo | yfo |
|---|---|---|
| f1 | 112.0 | 110.0 |
| f2 | 90.4 | 64.8 |

TABLE 8-continued

| POSITION OF LIGHT RAY | xfo | yfo |
|---|---|---|
| f3 | 61.8 | 17.4 |
| f4 | 88.8 | 103.2 |
| f5 | 84.4 | 53.6 |
| f6 | 58.3 | 12.6 |
| f7 | 50.6 | 82.4 |
| f8 | 28.6 | 68.6 |
| f9 | 50.3 | 2.0 |

In practical example 2, a projection distance for a projection optical system and a size of an image projected on a screen are 295 mm and 60 inches, respectively, and hence, a throw ratio Tr for a projection optical system in practical example 2 is 0.23. Furthermore, from Table 8, a length of an intermediate image in a direction of an optical axis of a first optical system for a projection optical system in practical example 2 is |xfo of f1−yfo of f9|=112.0 mm−2.0 mm=110.0 mm. A focal length of a first optical system included in a projection optical system in practical example 2 is 27.53 mm. A normalized length Im of an intermediate image in a direction of an optical axis of a first optical system for a projection optical system in practical example 2 is 110.0 mm/27.53 mm=4.00. A value of Im×Tr for a projection optical system in practical example 2 is 4.00×0.23=0.92.

Figure 11:
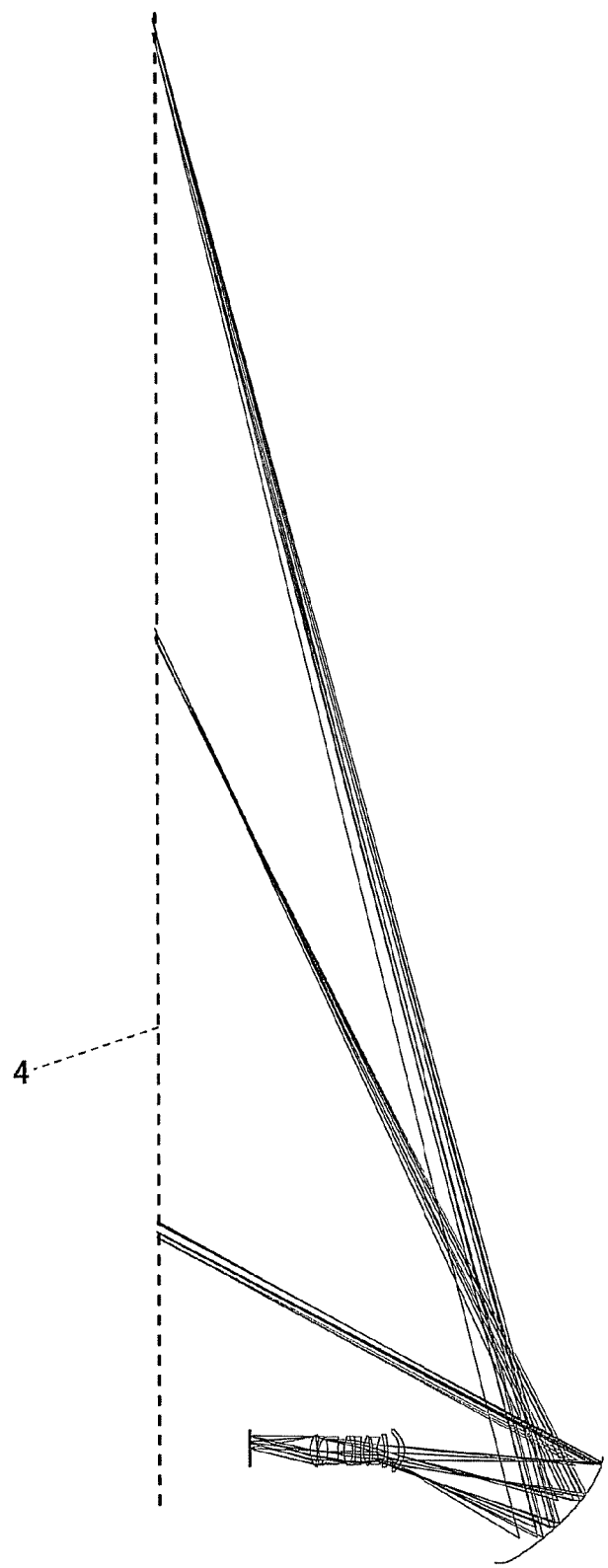
FIG. 11 is a diagram illustrating a projection optical system and an image projecting apparatus in practical example 2 according to an embodiment of the present invention.
Figure 12:
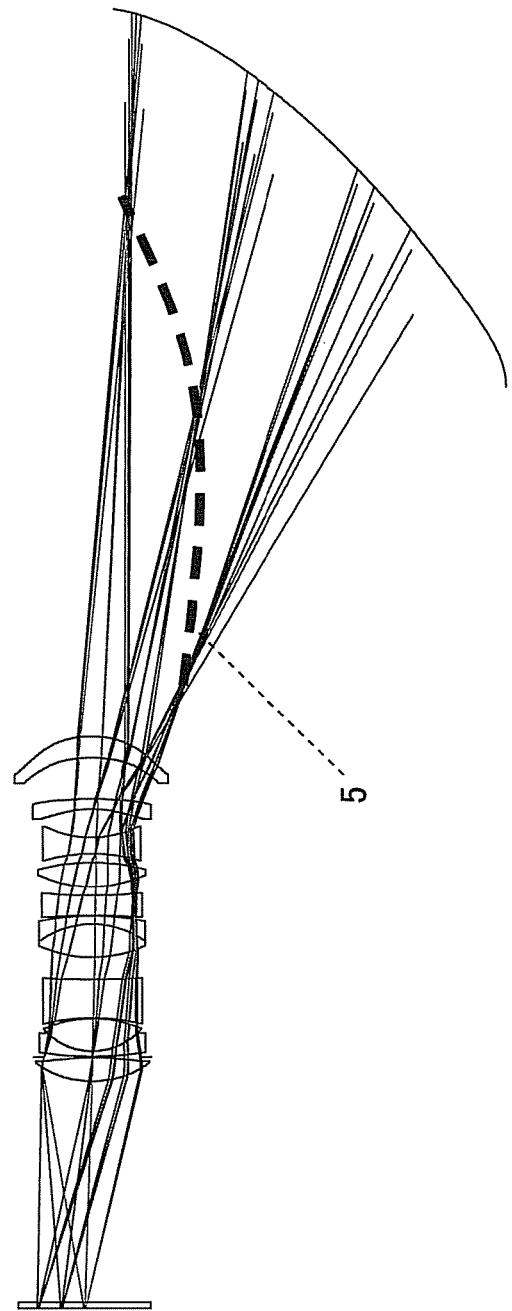
FIG. 12 is a diagram illustrating a first optical system and a second optical system for a projection optical system in practical example 2 according to an embodiment of the present invention.

FIG. 11 is a diagram illustrating a projection optical system and an image projecting apparatus in practical example 2 according to an embodiment of the present invention. FIG. 11 illustrates an optical path for a projection optical system in practical example 2. FIG. 12 is a diagram illustrating a first optical system and a second optical system for a projection optical system in practical example 2 according to an embodiment of the present invention. FIG. 12 is an enlarged view of a first optical system and a second optical system.

Figure 13:
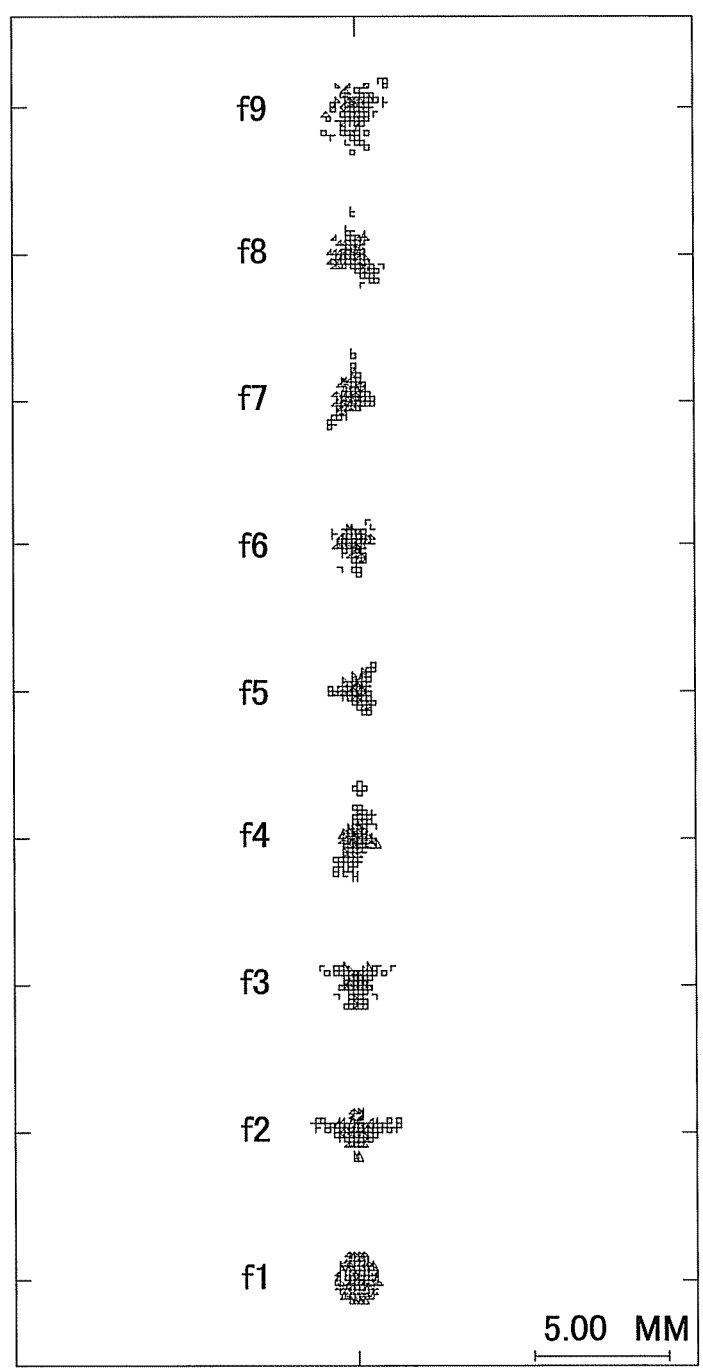
FIG. 13 is a diagram illustrating a spot on a surface to be projected on for a projection optical system in practical example 2 according to an embodiment of the present invention.

FIG. 13 is a diagram illustrating a spot on a surface to be projected on for a projection optical system in practical example 2 according to an embodiment of the present invention. FIG. 13 illustrates a spot diagram corresponding to lattice points f1-f9 on an image forming part included in an image projecting apparatus in practical example 2. As illustrated in FIG. 13, a spot on a screen in practical example 2 is focused well.

Figure 14:
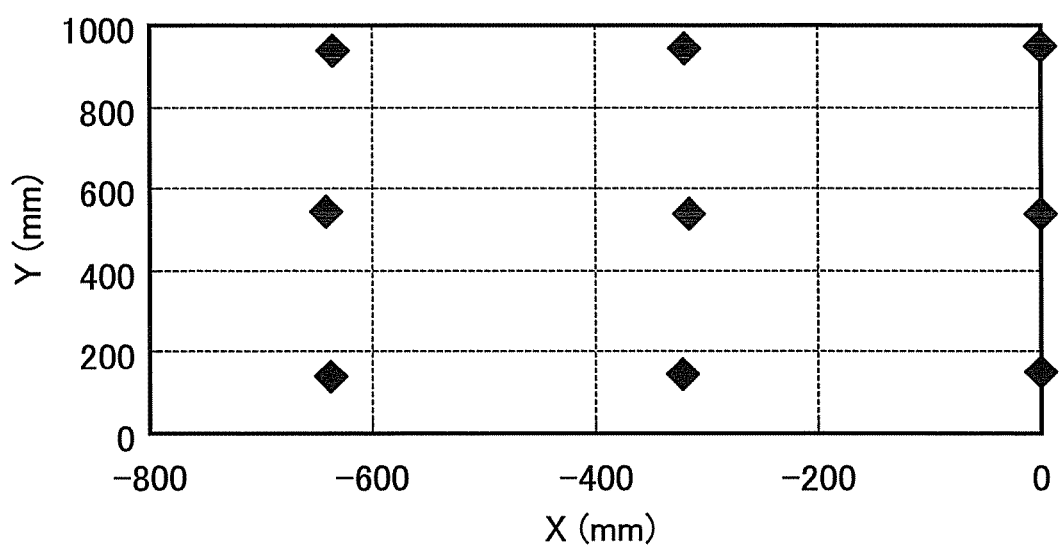
FIG. 14 is a diagram illustrating a TV distortion characteristic for a projection optical system in practical example 2 according to an embodiment of the present invention.

FIG. 14 is a diagram illustrating a TV distortion characteristic for a projection optical system in practical example 2 according to an embodiment of the present invention. A TV distortion for a projection optical system in practical example 2 is less than or equal to 2%. A distortion for a projection optical system in practical example 2 is corrected well.

Practical Example 3

Table 9 illustrates the data of a projection optical system in practical example 3. In practical example 3, a projection distance of a projection optical system and a size of an image projected on a screen are 388 mm and 60 inches, respectively, and hence, a throw ratio for a projection optical system in practical example 3 is 0.30.

TABLE 9

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |

TABLE 9-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 3 | ASPHERIC SURFACE | 22.53 | 4.06 | 1.51 | 63.90 | −1.43 | |
| 4 | ASPHERIC SURFACE | −41.04 | 0.10 | | | | |
| STOP | SPHERE | ∞ | 0.10 | | | | |
| 6 | SPHERE | 42.98 | 1.00 | 1.84 | 37.52 | | |
| 7 | SPHERE | 11.60 | 5.94 | 1.49 | 69.89 | | |
| 8 | SPHERE | −21.42 | 0.10 | | | | |
| 9 | SPHERE | −46.44 | 1.00 | 1.83 | 40.93 | | |
| 10 | SPHERE | 90.04 | 0.10 | | | | |
| 11 | SPHERE | 24.10 | 6.00 | 1.58 | 41.05 | | |
| 12 | SPHERE | −14.23 | 1.62 | 1.84 | 42.98 | | |
| 13 | SPHERE | −78.11 | 3.07 | | | | |
| 14 | SPHERE | −54.23 | 1.00 | 1.64 | 58.93 | | |
| 15 | SPHERE | 116.29 | 0.10 | | | | |
| 16 | SPHERE | 21.68 | 4.00 | 1.71 | 28.89 | | |
| 17 | SPHERE | −28.89 | 1.58 | | | | |
| 18 | SPHERE | −23.00 | 7.00 | 1.84 | 28.73 | | |
| 19 | SPHERE | 31.05 | 3.66 | | | | |
| 20 | ASPHERIC SURFACE | −21.17 | 2.77 | 1.53 | 55.80 | | |
| 21 | ASPHERIC SURFACE | −26.39 | 9.87 | | | | |
| 22 | ASPHERIC SURFACE | −56.37 | 2.46 | 1.53 | 55.80 | | |
| 23 | ASPHERIC SURFACE | −27.89 | 0.10 | | | | |
| 24 | SPHERE | ∞ | 90.00 | | | | |
| 25 | xy-POLYNOMIAL SURFACE | −79.58 | −375.60 | REFLECTION | | −29.12 | −38.41 |
| 26 | SPHERE | ∞ | 0.00 | | | | |

Table 10 illustrates coefficients of an aspheric surface for a projection optical system in practical example 3.

TABLE 10

| | SURFACE NUMBER | | | | | |
|---|---|---|---|---|---|---|
| | 3 | 4 | 20 | 21 | 22 | 23 |
| 4th ORDER COEFFICIENT (A) | 4.77E−05 | 4.88E−05 | 2.88E−05 | 8.18E−06 | −1.01E−04 | −7.57E−05 |
| 6th ORDER COEFFICIENT (B) | −3.05E−08 | −1.84E−08 | 3.05E−06 | 7.00E−07 | −3.71E−07 | −5.65E−07 |
| 8th ORDER COEFFICIENT (C) | 4.70E−10 | −1.20E−10 | −1.20E−07 | −1.76E−08 | 6.32E−09 | 1.22E−08 |
| 10th ORDER COEFFICIENT (D) | 5.49E−13 | 2.74E−11 | 2.38E−09 | 1.59E−10 | 1.79E−12 | −1.32E−10 |
| 12th ORDER COEFFICIENT (E) | 3.91E−14 | −6.03E−13 | −2.79E−11 | −1.20E−12 | −2.64E−14 | 1.13E−12 |
| 14th ORDER COEFFICIENT (F) | −1.08E−15 | 5.49E−15 | 1.54E−13 | 1.93E−16 | −4.70E−16 | −4.56E−15 |
| 16th ORDER COEFFICIENT (G) | 8.81E−18 | −1.62E−17 | −2.91E−16 | 2.20E−17 | 1.50E−18 | 6.62E−18 |

Table 11 illustrates coefficients of a polynomial free-form surface for a projection optical system in practical example 3.

TABLE 11

| COEFFICIENT | VALUE |
|---|---|
| X2 | −4.44E−03 |
| Y2 | 1.49E−03 |
| X2Y | −1.65E−04 |
| Y3 | −4.61E−05 |
| X4 | 8.73E−09 |
| X2Y2 | −3.07E−06 |
| Y4 | −3.86E−07 |
| X4Y | 1.59E−08 |
| X2Y3 | −7.19E−08 |
| Y5 | −2.00E−08 |
| X6 | −3.03E−11 |
| X4Y2 | 6.59E−10 |
| X2Y4 | −1.92E−09 |
| Y6 | −1.90E−09 |
| X6Y | −2.62E−11 |
| X4Y3 | 2.52E−11 |
| X2Y5 | −7.16E−11 |
| Y7 | −7.80E−12 |
| X8 | 1.89E−13 |
| X6Y2 | −5.76E−13 |
| X4Y4 | 1.72E−12 |
| X2Y6 | −2.02E−12 |
| Y8 | 5.36E−12 |
| X8Y | 2.33E−14 |
| X6Y3 | −4.55E−14 |
| X4Y5 | 1.29E−13 |
| X2Y7 | 1.07E−14 |
| Y9 | 3.95E−14 |
| X10 | −2.71E−16 |
| X8Y2 | 3.95E−16 |
| X6Y4 | −1.55E−15 |
| X4Y6 | 1.10E−15 |
| X2Y8 | 5.02E−15 |
| Y10 | −9.56E−15 |
| X10Y | −1.04E−17 |
| X8Y3 | 2.85E−17 |
| X6Y5 | −7.25E−17 |
| X4Y7 | −2.76E−17 |
| X2Y9 | −5.53E−18 |
| Y11 | −5.39E−17 |
| X12 | 1.15E−19 |
| X10Y2 | −2.36E−19 |
| X8Y4 | 3.95E−19 |
| X6Y6 | 7.48E−19 |
| X4Y8 | −3.52E−18 |
| X2Y10 | −2.35E−18 |
| Y12 | 5.91E−18 |

A value of Im×Tr for a projection optical system in practical example 3 will be obtained.

Table 12 illustrates xfo and yfo for a projection optical system in practical example 3.

TABLE 12

| POSITION OF LIGHT RAY | xfo | yfo |
|---|---|---|
| f1 | 86.6 | 85.9 |
| f2 | 74.8 | 61.5 |
| f3 | 55.9 | 26.2 |
| f4 | 75.0 | 81.9 |
| f5 | 70.9 | 54.2 |
| f6 | 53.3 | 21.2 |
| f7 | 51.4 | 69.3 |
| f8 | 35.6 | 60.6 |
| f9 | 46.5 | 8.6 |

In practical example 3, a projection distance for a projection optical system and a size of an image projected on a screen are 388 mm and 60 inches, respectively, and hence, a throw ratio Tr for a projection optical system in practical example 3 is 0.30. Furthermore, from Table 12, a length of an intermediate image in a direction of an optical axis of a first optical system for a. projection optical system in practical example 3 is |xfo of f1−yfo of f9|=86.6 mm−8.6 mm=78.0 mm. A focal length of a first optical system included in a projection optical system in practical example 3 is 31.34 mm. A normalized length Im of an intermediate image in a direction of an optical axis of a first optical system for a projection optical system in practical example 3 is 78.0 mm/31.34 mm=2.49. A value of Im×Tr for a projection optical system in practical example 3 is 2.49×0.30=0.75.

Figure 15:
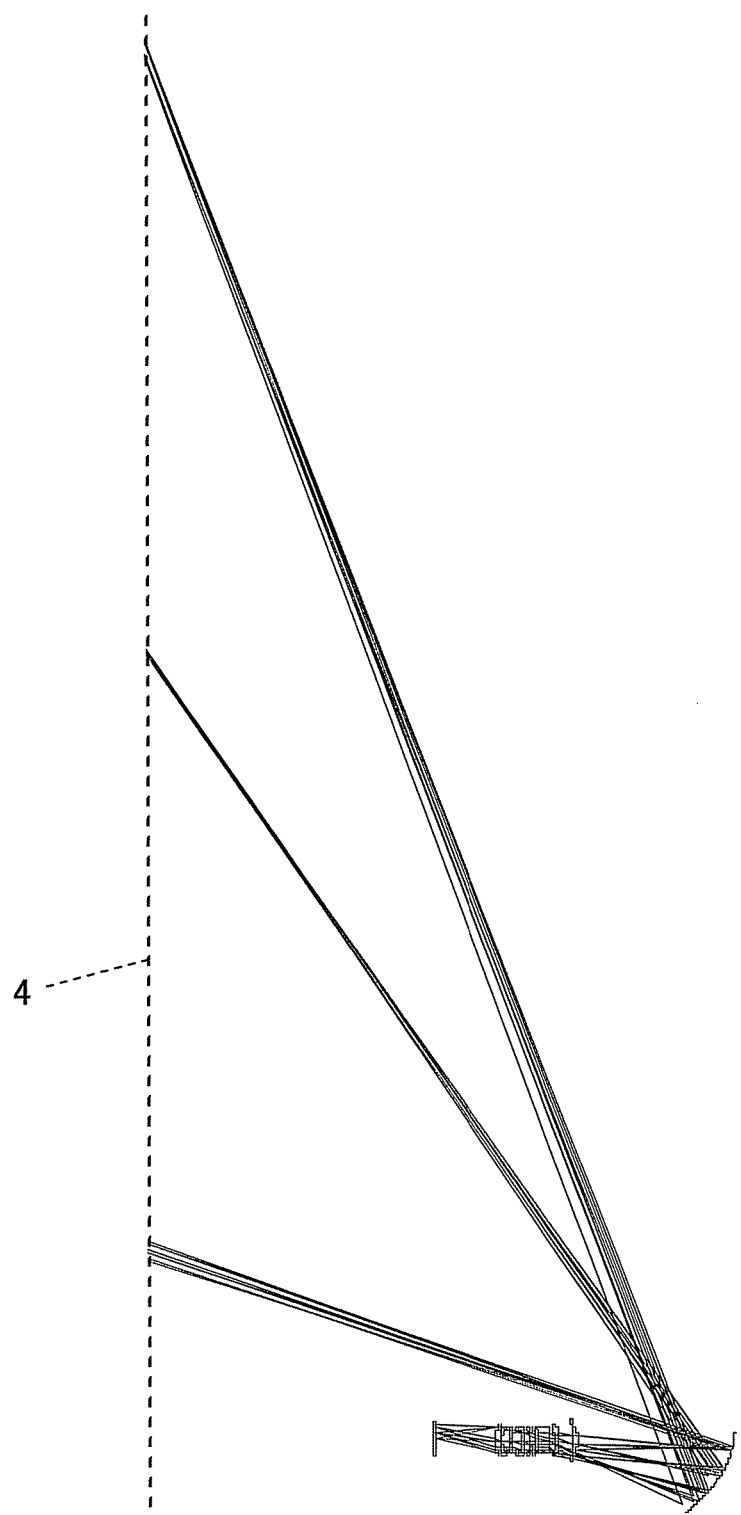
FIG. 15 is a diagram illustrating a projection optical system and an image projecting apparatus in practical example 3 according to an embodiment of the present invention.
Figure 16:
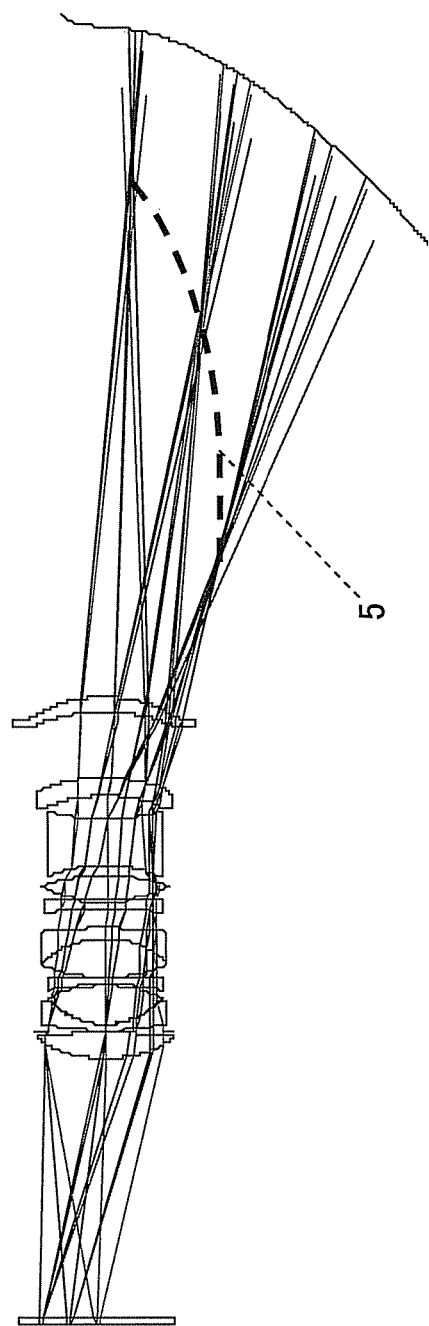
FIG. 16 is a diagram illustrating a first optical system and a second optical system for a projection optical system in practical example 3 according to an embodiment of the present invention.

FIG. 15 is a diagram illustrating a projection optical system and an image projecting apparatus in practical example 3 according to an embodiment of the present invention. FIG. 15 illustrates an optical path for a projection optical system in practical example 3. FIG. 16 is a diagram illustrating a first optical system and a second optical system for a projection optical system in practical example 3 according to an embodiment of the present invention. FIG. 16 is an enlarged view of a first optical system and a second optical system.

Figure 17:
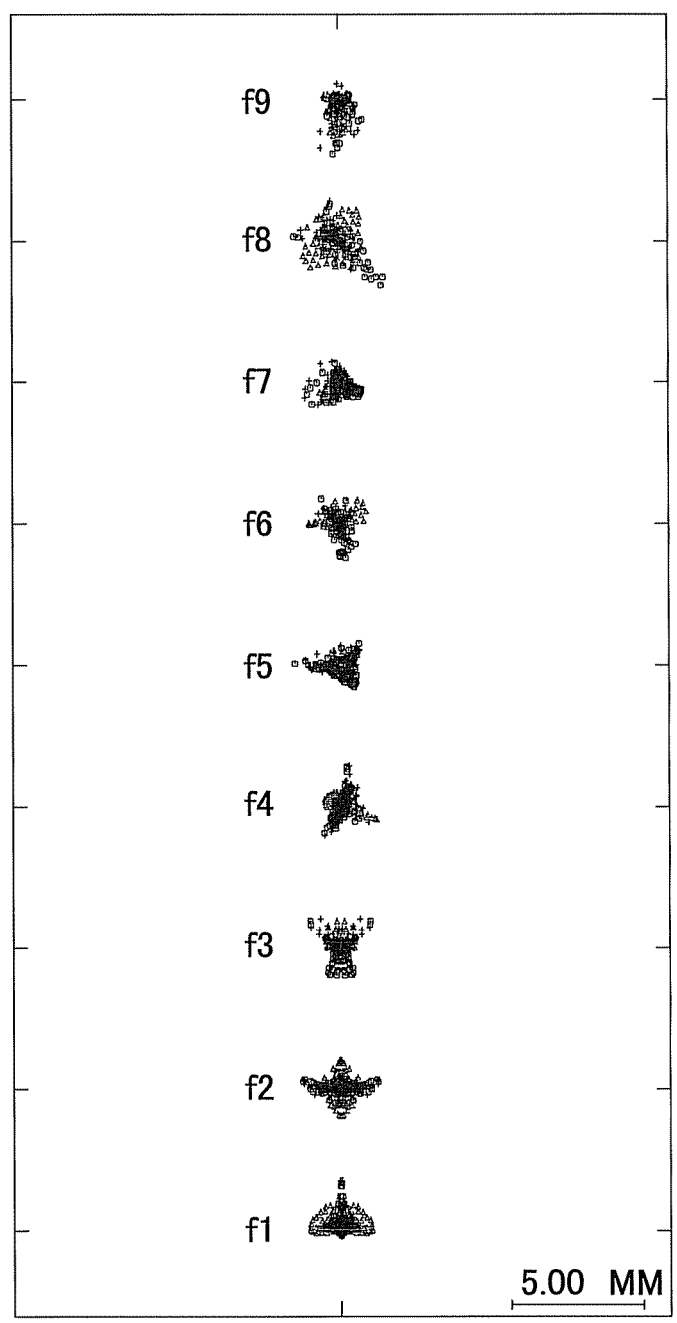
FIG. 17 is a diagram illustrating a spot on a surface to be projected on for a projection optical system in practical example 3 according to an embodiment of the present invention.

FIG. 17 is a diagram illustrating a spot on a surface to be projected on for a projection optical system in practical example 3 according to an embodiment of the present invention. FIG. 17 illustrates a spot diagram corresponding to lattice points f1-f9 on an image forming part included in an image projecting apparatus in practical example 3. As illustrated in FIG. 17, a spot on a screen in practical example 3 is focused well.

Figure 18:
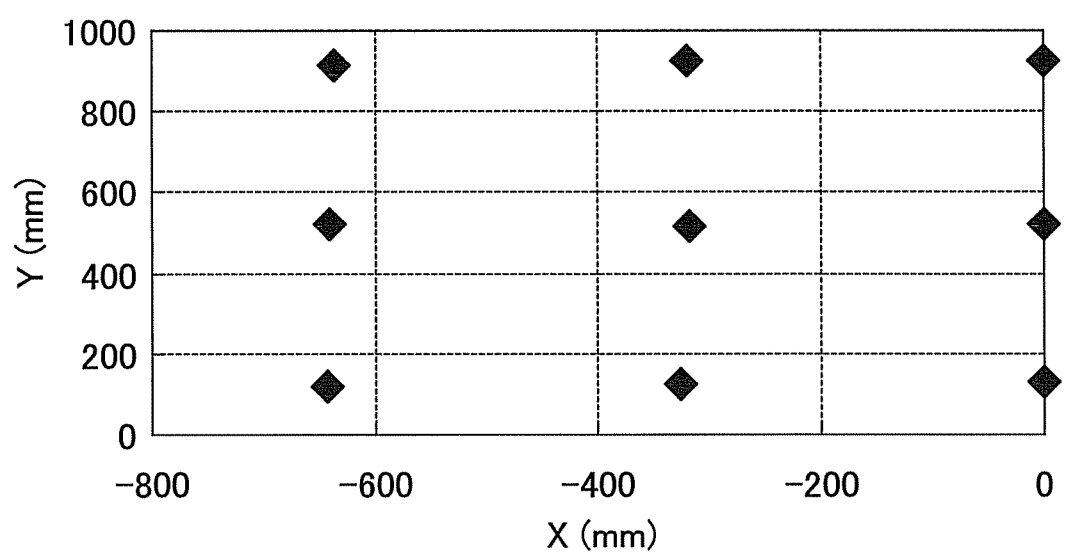
FIG. 18 is a diagram illustrating a TV distortion characteristic for a projection optical system in practical example 3 according to an embodiment of the present invention.

FIG. 18 is a diagram illustrating a TV distortion characteristic for a projection optical system in practical example 3 according to an embodiment of the present invention. A TV distortion for a projection optical system in practical example 3 is less than or equal to 2%. A distortion for a projection optical system in practical example 3 is corrected well.

Practical Example 4

Table 13 illustrates the data of a projection optical system in practical example 4. In practical example 4, a projection distance of a projection optical system and a size of an image projected on a screen are 517 mm and 60 inches, respectively, and hence, a throw ratio for a projection optical system in practical example 4 is 0.40.

TABLE 13

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |

TABLE 13-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 3 | ASPHERIC SURFACE | 19.48 | 4.24 | 1.51 | 63.90 | −1.57 | |
| 4 | ASPHERIC SURFACE | −45.02 | 0.10 | | | | |
| STOP | SPHERE | ∞ | 0.10 | | | | |
| 6 | SPHERE | 62.87 | 1.00 | 1.84 | 42.36 | | |
| 7 | SPHERE | 12.05 | 5.77 | 1.49 | 70.23 | | |
| 8 | SPHERE | −23.07 | 0.18 | | | | |
| 9 | SPHERE | −114.92 | 4.56 | 1.81 | 40.60 | | |
| 10 | SPHERE | 39.65 | 0.10 | | | | |
| 11 | SPHERE | 19.89 | 6.00 | 1.57 | 41.87 | | |
| 12 | SPHERE | −15.85 | 1.00 | 1.84 | 39.09 | | |
| 13 | SPHERE | −74.97 | 3.31 | | | | |
| 14 | SPHERE | −25.40 | 1.00 | 1.62 | 56.11 | | |
| 15 | SPHERE | −97.76 | 0.10 | | | | |
| 16 | SPHERE | 26.72 | 3.54 | 1.73 | 27.51 | | |
| 17 | SPHERE | −28.47 | 1.27 | | | | |
| 18 | SPHERE | −24.50 | 7.00 | 1.84 | 28.24 | | |
| 19 | SPHERE | 26.58 | 3.28 | | | | |
| 20 | ASPHERIC SURFACE | −26.58 | 6.39 | 1.53 | 55.80 | | |
| 21 | ASPHERIC SURFACE | −29.38 | 2.13 | | | | |
| 22 | ASPHERIC SURFACE | −175.02 | 3.22 | 1.53 | 55.80 | | |
| 23 | ASPHERIC SURFACE | −33.44 | 0.10 | | | | |
| 24 | SPHERE | ∞ | 90.00 | | | | |
| 25 | xy-POLYNOMIAL SURFACE | −76.48 | −496.82 | REFLECTION | | −40.89 | −42.62 |
| 26 | SPHERE | ∞ | 0.00 | | | | |

Table 14 illustrates coefficients of an aspheric surface for a projection optical system in practical example 4.

TABLE 14

| | SURFACE NUMBER | | | | | |
|---|---|---|---|---|---|---|
| | 3 | 4 | 20 | 21 | 22 | 23 |
| 4th ORDER COEFFICIENT (A) | 2.76E−05 | 4.40E−05 | 4.30E−05 | 8.27E−06 | −1.03E−04 | −7.45E−05 |
| 6th ORDER COEFFICIENT (B) | −6.90E−09 | −2.05E−08 | 2.77E−06 | 6.23E−07 | −5.08E−07 | −6.61E−07 |
| 8th ORDER COEFFICIENT (C) | 5.29E−10 | −1.15E−10 | −1.18E−07 | −1.49E−08 | 6.43E−09 | 1.14E−08 |
| 10th ORDER COEFFICIENT (D) | −7.03E−13 | 2.67E−11 | 2.42E−09 | 1.91E−10 | −5.55E−14 | −1.34E−10 |
| 12th ORDER COEFFICIENT (E) | 2.99E−14 | −6.12E−13 | −2.77E−11 | −1.08E−12 | −3.92E−14 | 1.11E−12 |
| 14th ORDER COEFFICIENT (F) | −1.09E−15 | 5.45E−15 | 1.55E−13 | −8.19E−16 | −6.57E−16 | −4.64E−15 |
| 16th ORDER COEFFICIENT (G) | 9.34E−18 | −1.53E−17 | −3.24E−16 | 1.38E−17 | −1.10E−18 | 6.47E−18 |

Table 15 illustrates coefficients of a polynomial free-form surface for a projection optical system in practical example 4.

TABLE 15

| COEFFICIENT | VALUE |
|---|---|
| X2 | −1.74E−03 |
| Y2 | 2.72E−03 |
| X2Y | −9.20E−05 |
| Y3 | −1.14E−05 |
| X4 | −8.68E−08 |
| X2Y2 | −1.02E−07 |
| Y4 | −2.02E−07 |
| X4Y | 7.12E−09 |
| X2Y3 | −4.63E−08 |
| Y5 | −1.10E−08 |
| X6 | 2.92E−10 |
| X4Y2 | −4.42E−10 |
| X2Y4 | −9.40E−10 |
| Y6 | −4.12E−10 |
| X6Y | −4.20E−12 |
| X4Y3 | 5.76E−12 |
| X2Y5 | 3.36E−11 |
| Y7 | 4.25E−11 |
| X8 | −1.23E−13 |
| X6Y2 | −6.92E−13 |
| X4Y4 | 1.63E−12 |
| X2Y6 | −4.27E−13 |
| Y8 | −1.32E−12 |
| X8Y | −1.63E−15 |
| X6Y3 | −1.84E−14 |
| X4Y5 | −2.34E−14 |
| X2Y7 | −1.22E−14 |
| Y9 | 1.81E−14 |
| X10 | −1.30E−16 |
| X8Y2 | 1.09E−15 |
| X6Y4 | 4.44E−16 |
| X4Y6 | −2.96E−16 |
| X2Y8 | 2.05E−16 |
| Y10 | −1.48E−16 |
| X10Y | −6.66E−19 |
| X8Y3 | 1.47E−17 |
| X6Y5 | −2.44E−17 |
| X4Y7 | −1.79E−18 |
| X2Y9 | −4.51E−19 |
| Y11 | 4.20E−19 |
| X12 | 1.02E−19 |
| X10Y2 | −4.14E−19 |
| X8Y4 | −4.68E−19 |
| X6Y6 | 5.21E−19 |
| X4Y8 | 1.36E−19 |
| X2Y10 | −2.11E−20 |
| Y12 | −9.56E−23 |

A value of Im×Tr for a projection optical system in practical example 4 will be obtained.

Table 16 illustrates xfo and yfo for a projection optical system in practical example 4.

TABLE 16

| POSITION OF LIGHT RAY | xfo | yfo |
|---|---|---|
| f1 | 91.5 | 90.9 |
| f2 | 82.1 | 72.2 |
| f3 | 66.5 | 44.3 |
| f4 | 83.3 | 88.0 |
| f5 | 79.0 | 66.6 |
| f6 | 64.3 | 39.8 |
| f7 | 64.9 | 78.1 |
| f8 | 52.4 | 70.7 |
| f9 | 58.4 | 27.6 |

In practical example 4, a projection distance for a projection optical system and a size of an image projected on a screen are 517 mm and 60 inches, respectively, and hence, a throw ratio Tr for a projection optical system in practical example 4 is 0.40. Furthermore, from Table 16, a length of an intermediate image in a direction of an optical axis of a first optical system for a projection optical system in practical example 4 is |xfo of f1−yfo of f9|=91.5 mm−27.6 mm=63.9 mm. A focal length of a first optical system included in a projection optical system in practical example 4 is 33.32 mm. A normalized length Im of an intermediate image in a direction of an optical axis of a first optical system for a projection optical system in practical example 4 is 63.9 mm/33.32 mm=1.92. A value of Im×Tr for a projection optical system in practical example 4 is 1.92×0.40=0.77.

Figure 19:
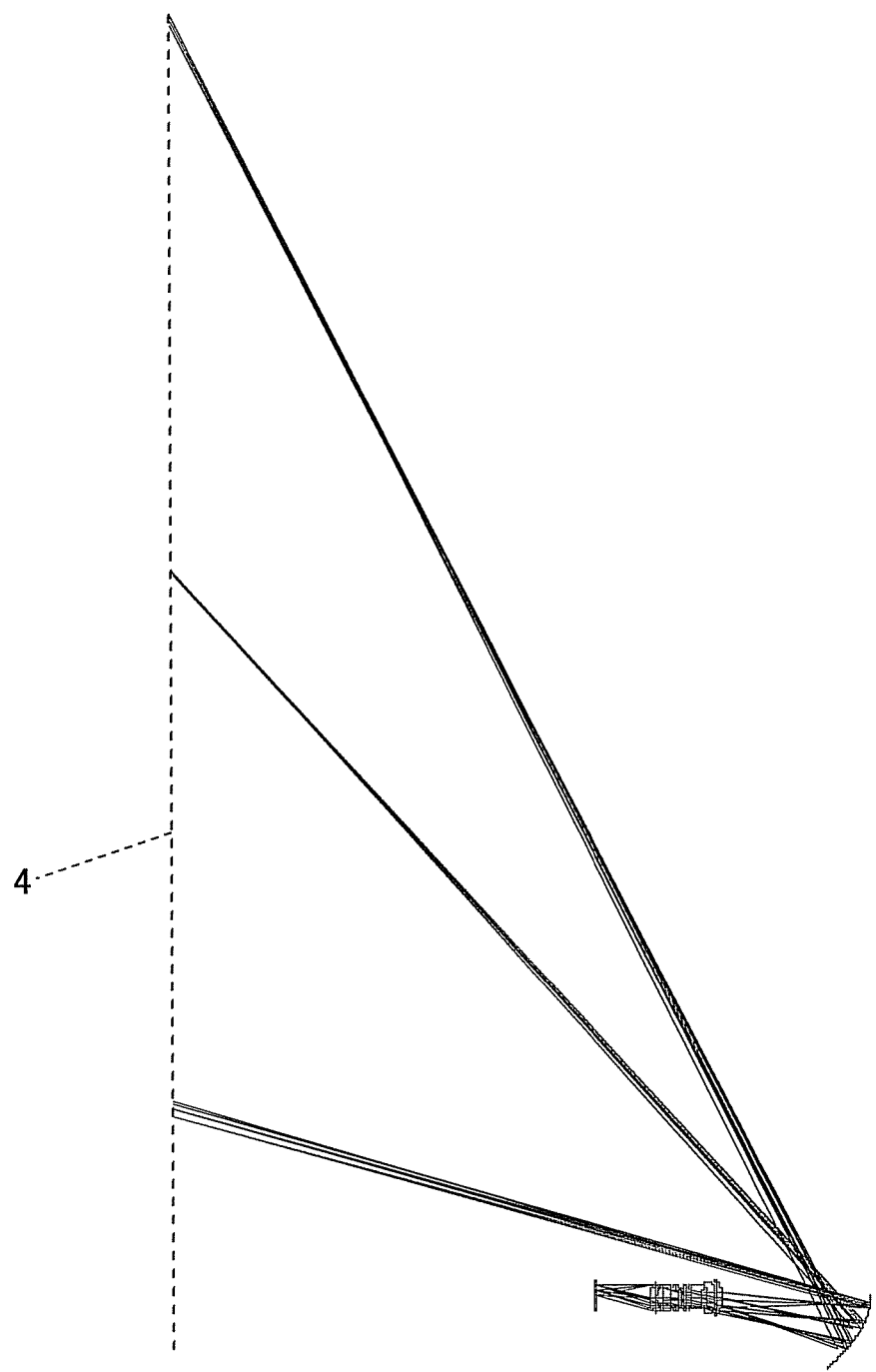
FIG. 19 is a diagram illustrating a projection optical system and an image projecting apparatus in practical example 4 according to an embodiment of the present invention.
Figure 20:
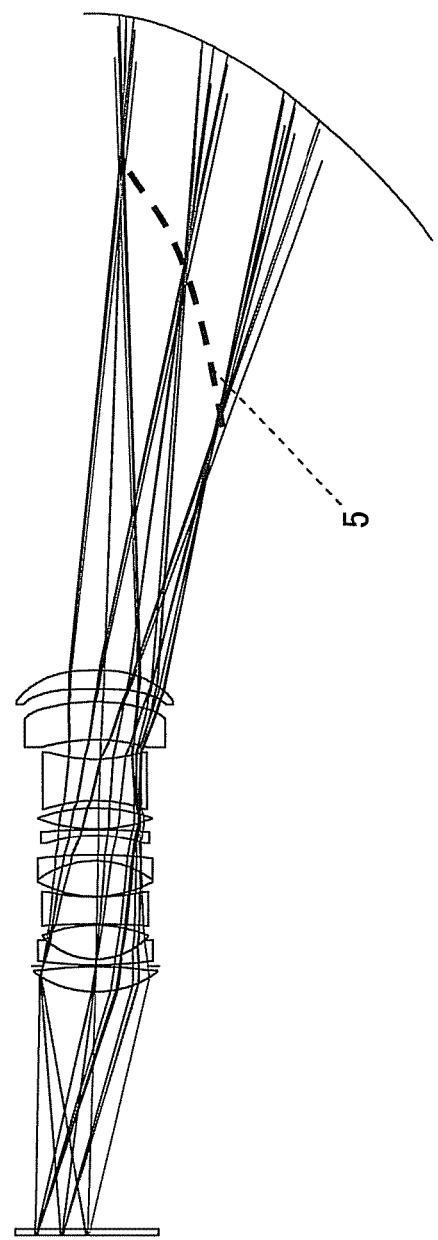
FIG. 20 is a diagram illustrating a first optical system and a second optical system for a projection optical system in practical example 4 according to an embodiment of the present invention.

FIG. 19 is a diagram illustrating a projection optical system and an image projecting apparatus in practical example 4 according to an embodiment of the present invention. FIG. 19 illustrates an optical path for a projection optical system in practical example 4. FIG. 20 is a diagram illustrating a first optical system and a second optical system for a projection optical system in practical example 4 according to an embodiment of the present invention. FIG. 20 is an enlarged view of a first optical system and a second optical system.

Figure 21:
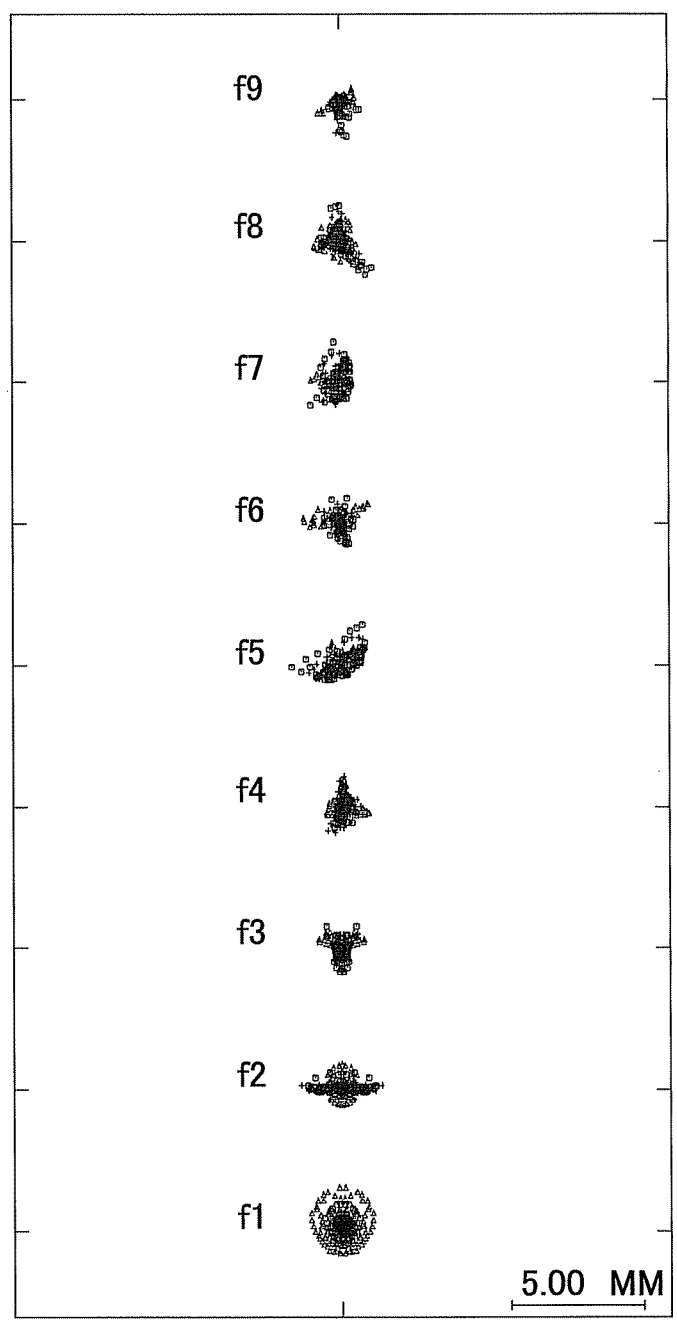
FIG. 21 is a diagram illustrating a spot on a surface to be projected on for a projection optical system in practical example 4 according to an embodiment of the present invention.
Figure 24:
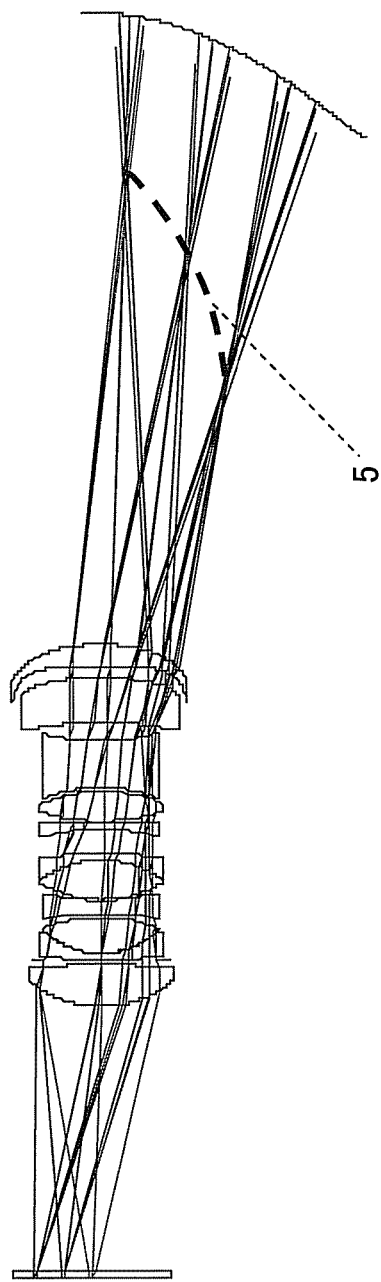
FIG. 24 is a diagram illustrating a first optical system and a second optical system for a projection optical system in practical example 5 according to an embodiment of the present invention.

FIG. 21 is a diagram illustrating a spot on a surface to be projected on for a projection optical system in practical example 4 according to an embodiment of the present invention. FIG. 21 illustrates a spot diagram corresponding to lattice points f1-f9 on an image forming part included in an image projecting apparatus in practical example 4. As illustrated in FIG. 24, a spot on a screen in practical example 4 is focused well.

Figure 22:
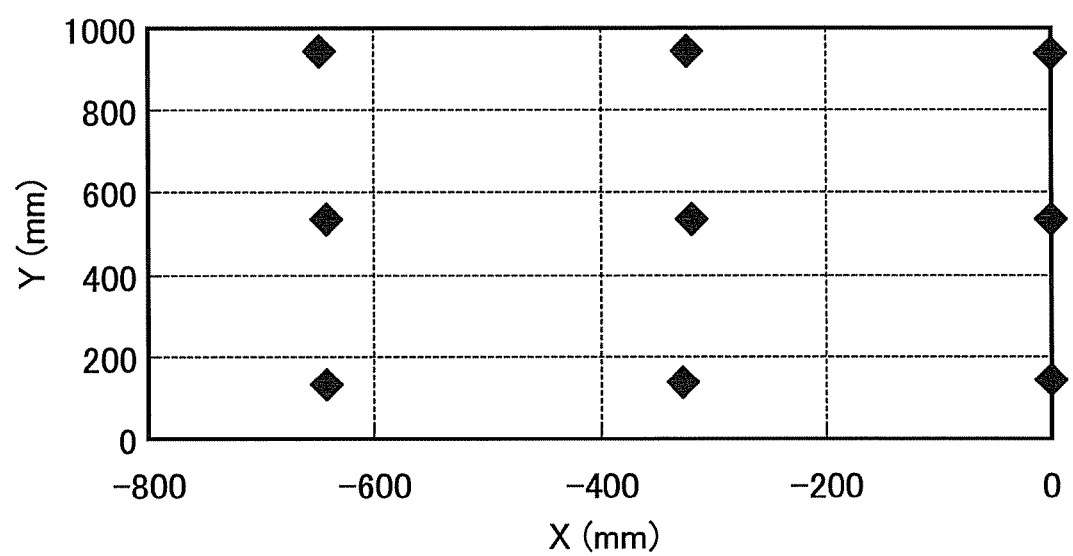
FIG. 22 is a diagram illustrating a TV distortion characteristic for a projection optical system in practical example 4 according to an embodiment of the present invention.

FIG. 22 is a diagram illustrating a TV distortion characteristic for a projection optical system in practical example 4 according to an embodiment of the present invention. A TV distortion for a projection optical system in practical example 4 is less than or equal to 2%. A distortion for a projection optical system in practical example 4 is corrected well.

Practical Example 5

Table 17 illustrates the data of a projection optical system in practical example 5. In practical example 5, a projection distance of a projection optical system and a size of an image projected on a screen are 672 mm and 60 inches, respectively, and hence, a throw ratio for a projection optical system in practical example 5 is 0.52.

TABLE 17

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |

TABLE 17-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 3 | ASPHERIC SURFACE | 18.87 | 6.38 | 1.51 | 63.90 | −1.65 | |
| 4 | ASPHERIC SURFACE | −50.60 | 0.47 | | | | |
| STOP | SPHERE | ∞ | 0.10 | | | | |
| 6 | SPHERE | 68.16 | 1.00 | 1.84 | 40.68 | | |
| 7 | SPHERE | 12.37 | 5.50 | 1.50 | 69.57 | | |
| 8 | SPHERE | −23.66 | 0.10 | | | | |
| 9 | SPHERE | −528.54 | 2.43 | 1.84 | 42.98 | | |
| 10 | SPHERE | 30.65 | 0.10 | | | | |
| 11 | SPHERE | 17.88 | 6.00 | 1.57 | 41.85 | | |
| 12 | SPHERE | −15.55 | 1.00 | 1.84 | 39.48 | | |
| 13 | SPHERE | −80.98 | 3.83 | | | | |
| 14 | SPHERE | −30.20 | 1.00 | 1.67 | 56.41 | | |
| 15 | SPHERE | −161.42 | 0.10 | | | | |
| 16 | SPHERE | 30.32 | 4.50 | 1.73 | 27.97 | | |
| 17 | SPHERE | −24.15 | 0.59 | | | | |
| 18 | SPHERE | −22.60 | 7.00 | 1.84 | 29.28 | | |
| 19 | SPHERE | 28.66 | 2.95 | | | | |
| 20 | ASPHERIC SURFACE | −40.72 | 6.75 | 1.53 | 55.80 | | |
| 21 | ASPHERIC SURFACE | −35.92 | 1.68 | | | | |
| 22 | ASPHERIC SURFACE | −3108.00 | 3.28 | 1.53 | 55.80 | | |
| 23 | ASPHERIC SURFACE | −38.32 | 0.10 | | | | |
| 24 | SPHERE | ∞ | 90.00 | | | | |
| 25 | xy-POLYNOMIAL SURFACE | −65.67 | −666.95 | REFLECTION | | −20.11 | −26.89 |
| 26 | SPHERE | ∞ | 0.00 | | | | |

Table 18 illustrates coefficients of an aspheric surface for a projection optical system in practical example 5.

TABLE 18

| | SURFACE NUMBER | | | | | |
|---|---|---|---|---|---|---|
| | 3 | 4 | 20 | 21 | 22 | 23 |
| 4th ORDER COEFFICIENT (A) | 2.26E−05 | 4.73E−05 | 2.86E−05 | −2.89E−06 | −1.06E−04 | −7.80E−05 |
| 6th ORDER COEFFICIENT (B) | 2.35E−08 | 8.14E−09 | 2.62E−06 | 5.41E−07 | −4.79E−07 | −6.18E−07 |
| 8th ORDER COEFFICIENT (C) | 5.19E−10 | 2.09E−10 | −1.16E−07 | −1.50E−08 | 6.54E−09 | 1.13E−08 |
| 10th ORDER COEFFICIENT (D) | −1.04E−13 | 2.89E−11 | 2.39E−09 | 1.96E−10 | −2.43E−12 | −1.34E−10 |
| 12th ORDER COEFFICIENT (E) | 5.67E−14 | −6.01E−13 | −2.76E−11 | −1.06E−12 | −4.64E−14 | 1.11E−12 |
| 14th ORDER COEFFICIENT (F) | −8.68E−16 | 5.57E−15 | 1.61E−13 | −8.72E−16 | −6.46E−16 | −4.68E−15 |
| 16th ORDER COEFFICIENT (G) | 6.80E−18 | −1.46E−17 | −3.74E−16 | 1.36E−17 | −1.23E−18 | 6.32E−18 |

Table 19 illustrates coefficients of a polynomial free-form surface for a projection optical system in practical example 5.

TABLE 19

| COEFFICIENT | VALUE |
|---|---|
| X2 | −3.59E−03 |
| Y2 | 6.17E−05 |
| X2Y | −1.60E−04 |
| Y3 | −8.37E−05 |
| X4 | 8.02E−07 |
| X2Y2 | −2.47E−06 |
| Y4 | −1.81E−06 |
| X4Y | 1.60E−08 |
| X2Y3 | −3.61E−08 |
| Y5 | −4.08E−08 |
| X6 | −1.43E−10 |
| X4Y2 | 2.50E−09 |
| X2Y4 | 1.79E−09 |
| Y6 | 4.01E−09 |
| X6Y | −8.35E−11 |
| X4Y3 | −1.82E−12 |
| X2Y5 | −1.33E−11 |
| Y7 | 5.83E−11 |
| X8 | 3.27E−13 |
| X6Y2 | −2.02E−12 |
| X4Y4 | −6.79E−13 |
| X2Y6 | −7.31E−12 |
| Y8 | −9.10E−12 |
| X8Y | 7.56E−14 |
| X6Y3 | 7.64E−14 |
| X4Y5 | 1.25E−13 |
| X2Y7 | 1.55E−13 |
| Y9 | −4.66E−14 |
| X10 | −1.16E−15 |
| X8Y2 | 2.68E−15 |
| X6Y4 | 2.20E−15 |
| X4Y6 | −4.68E−15 |
| X2Y8 | 4.00E−14 |
| Y10 | −8.45E−15 |
| X10Y | −1.97E−17 |
| X8Y3 | −1.22E−16 |
| X6Y5 | 1.05E−16 |
| X4Y7 | −4.67E−16 |
| X2Y9 | −9.33E−17 |
| Y11 | −1.30E−16 |
| X12 | 1.13E−18 |
| X10Y2 | −2.47E−18 |
| X8Y4 | 1.70E−19 |
| X6Y6 | −6.28E−18 |
| X4Y8 | 1.55E−17 |
| X2Y10 | −7.59E−17 |
| Y12 | 3.97E−17 |

A value of Im×Tr for a projection optical system in practical example 5 will be obtained.

Table 20 illustrates xfo and yfo for a projection optical system in practical example 5.

TABLE 20

| POSITION OF LIGHT RAY | xfo | yfo |
|---|---|---|
| f1 | 75.7 | 75.3 |
| f2 | 69.0 | 62.4 |
| f3 | 57.4 | 43.1 |
| f4 | 70.2 | 73.2 |
| f5 | 66.7 | 58.6 |
| f6 | 55.7 | 39.8 |
| f7 | 57.7 | 66.2 |
| f8 | 48.9 | 60.6 |
| f9 | 51.0 | 30.8 |

In practical example 5, a projection distance for a projection optical system and a size of an image projected on a screen are 672 mm and 60 inches, respectively, and hence, a throw ratio Tr for a projection optical system in practical example 5 is 0.52. Furthermore, from Table 20, a length of an intermediate image in a direction of an optical axis of a first optical system for a projection optical system in practical example 5 is |xfo of f1−yfo of f9|=75.7 mm−30.8 mm=44.9 mm. A focal length of a first optical system included in a projection optical system in practical example 5 is 33.91 mm. A normalized length Im of an intermediate image in a direction of an optical axis of a first optical system for a projection optical system in practical example 5 is 44.9 mm/33.91 mm=1.32. A value of Im×Tr for a projection optical system in practical example 5 is 1.32×0.52=0.69.

Figure 23:
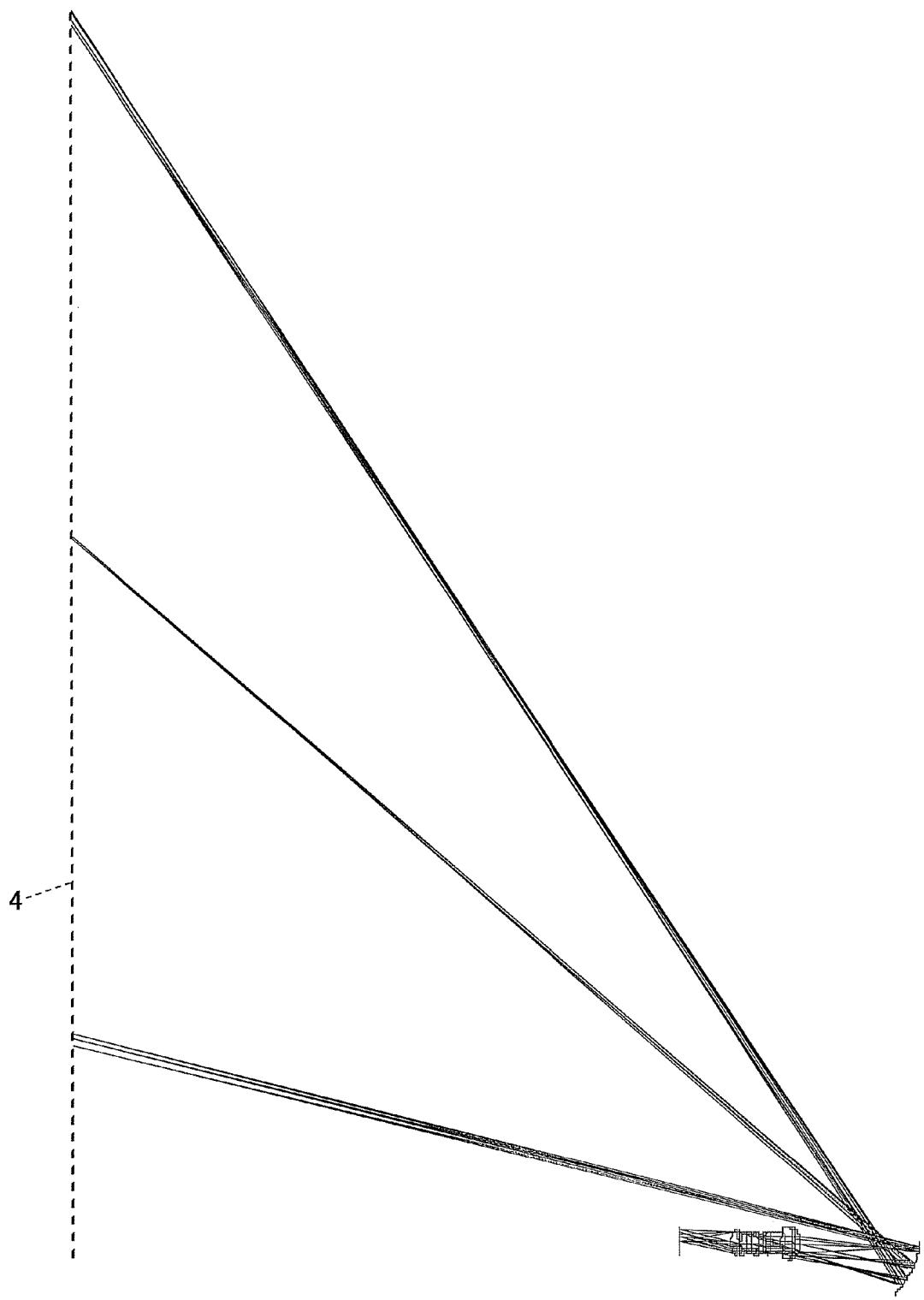
FIG. 23 is a diagram illustrating a projection optical system and an image projecting apparatus in practical example 5 according to an embodiment of the present invention.

FIG. 23 is a diagram illustrating a projection optical system and an image projecting apparatus in practical example 5 according to an embodiment of the present invention. FIG. 23 illustrates an optical path for a projection optical system in practical example 5. FIG. 24 is a diagram illustrating a first optical system and a second optical system for a projection optical system in practical example 5 according to an embodiment of the present invention. FIG. 24 is an enlarged view of a first optical system and a second optical system.

Figure 25:
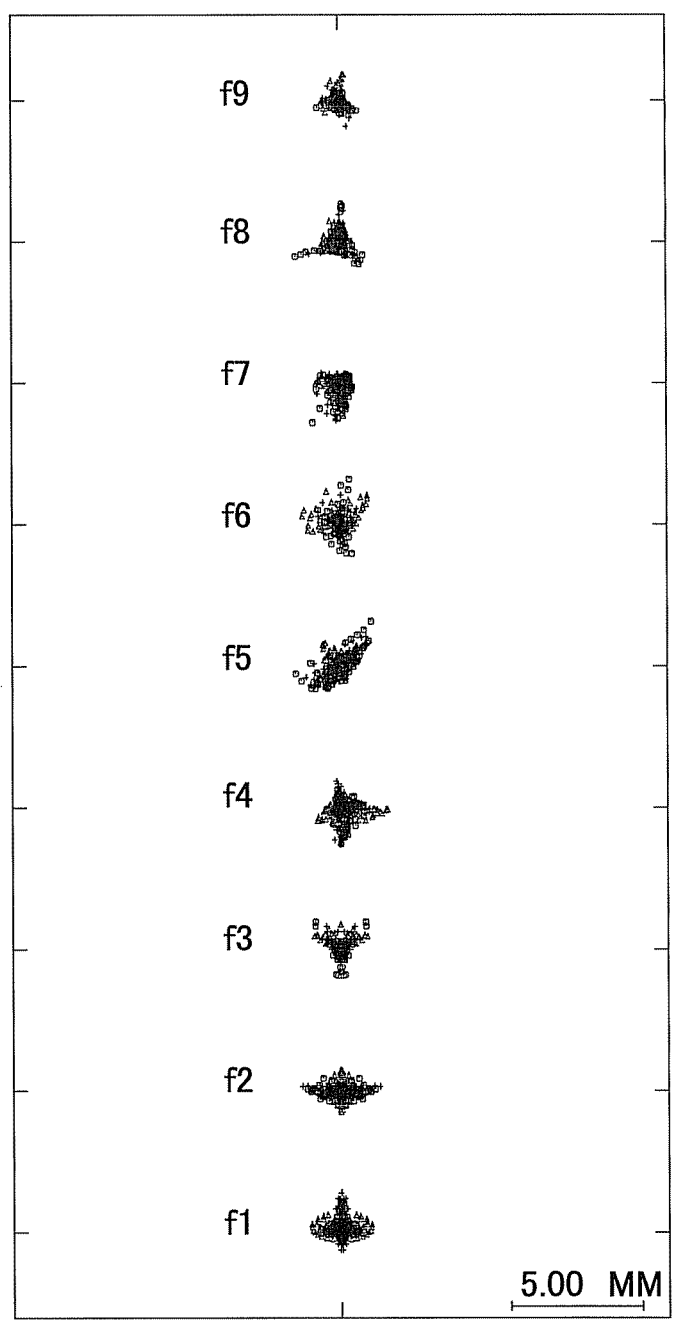
FIG. 25 is a diagram illustrating a spot on a surface to be projected on for a projection optical system in practical example 5 according to an embodiment of the present invention.

FIG. 25 is a diagram illustrating a spot on a surface to be projected on for a projection optical system in practical example 5 according to an embodiment of the present invention. FIG. 25 illustrates a spot diagram corresponding to lattice points f1-f9 on an image forming part included in an image projecting apparatus in practical example 5. As illustrated in FIG. 25, a spot on a screen in practical example 5 is focused well.

Figure 26:
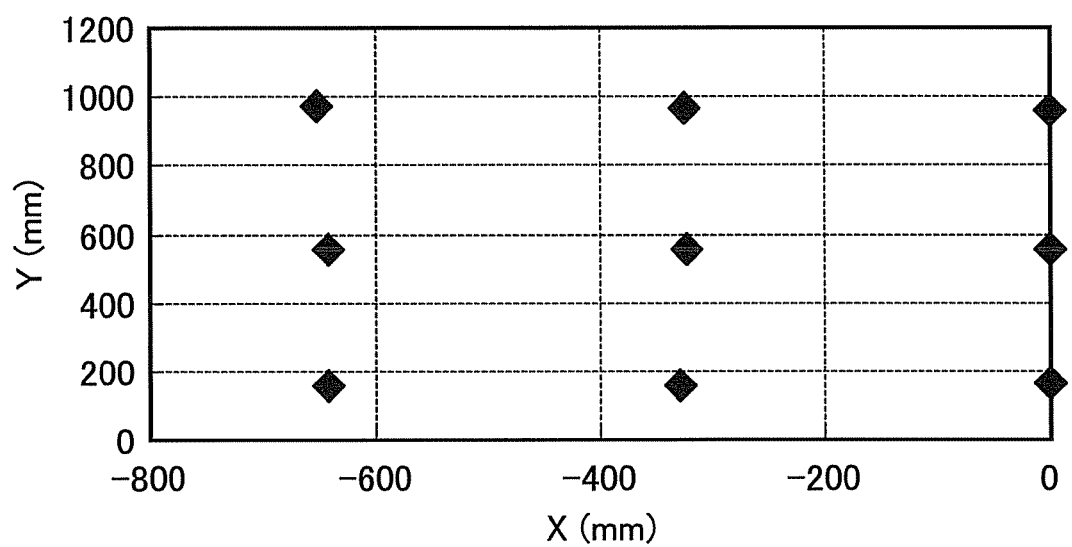
FIG. 26 is a diagram illustrating a TV distortion characteristic for a projection optical system in practical example 5 according to an embodiment of the present invention.

FIG. 26 is a diagram illustrating a TV distortion characteristic for a projection optical system in practical example 5 according to an embodiment of the present invention. A TV distortion for a projection optical system in practical example 5 is less than or equal to 2%. A distortion for a projection optical system in practical example 5 is corrected well.

Practical Example 6

Table 21 illustrates the data of a projection optical system in practical example 6. In practical example 6, a projection distance of a projection optical system and a size of an image projected on a screen are 775 mm and 60 inches, respectively, and hence, a throw ratio for a projection optical system in practical example 6 is 0.60.

TABLE 21

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |

TABLE 21-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 3 | ASPHERIC SURFACE | 18.63 | 8.73 | 1.51 | 63.90 | −1.75 | |
| 4 | ASPHERIC SURFACE | −56.15 | 1.01 | | | | |
| STOP | SPHERE | ∞ | 0.10 | | | | |
| 6 | SPHERE | 84.00 | 0.95 | 1.84 | 38.05 | | |
| 7 | SPHERE | 13.02 | 5.17 | 1.50 | 69.09 | | |
| 8 | SPHERE | −23.85 | 0.10 | | | | |
| 9 | SPHERE | 540.12 | 1.00 | 1.84 | 42.98 | | |
| 10 | SPHERE | 29.48 | 0.10 | | | | |
| 11 | SPHERE | 18.26 | 5.38 | 1.58 | 41.14 | | |
| 12 | SPHERE | −14.18 | 0.80 | 1.84 | 40.28 | | |
| 13 | SPHERE | −53.33 | 3.83 | | | | |
| 14 | SPHERE | −48.74 | 0.95 | 1.75 | 49.79 | | |
| 15 | SPHERE | 53.80 | 0.10 | | | | |
| 16 | SPHERE | 24.17 | 5.83 | 1.70 | 29.29 | | |
| 17 | SPHERE | −18.69 | 0.10 | | | | |
| 18 | SPHERE | −18.54 | 6.60 | 1.84 | 30.09 | | |
| 19 | SPHERE | 30.47 | 2.72 | | | | |
| 20 | ASPHERIC SURFACE | −36.43 | 7.11 | 1.53 | 55.80 | | |
| 21 | ASPHERIC SURFACE | −28.35 | 1.40 | | | | |
| 22 | ASPHERIC SURFACE | 710.28 | 3.61 | 1.53 | 55.80 | | |
| 23 | ASPHERIC SURFACE | −40.21 | 0.10 | | | | |
| 24 | SPHERE | ∞ | 90.00 | | | | |
| 25 | xy-POLYNOMIAL SURFACE | −62.88 | −772.78 | REFLECTION | | −13.70 | −19.51 |
| 26 | SPHERE | ∞ | 0.00 | | | | |

Table 22 illustrates coefficients of an aspheric surface for a projection optical system in practical example 6.

TABLE 22

| | SURFACE NUMBER | | | | | |
|---|---|---|---|---|---|---|
| | 3 | 4 | 20 | 21 | 22 | 23 |
| 4th ORDER COEFFICIENT (A) | 2.16E−05 | 5.17E−05 | 3.98E−05 | −4.80E−06 | −1.08E−04 | −7.83E−05 |
| 6th ORDER COEFFICIENT (B) | 2.78E−08 | 1.86E−08 | 2.55E−06 | 5.27E−07 | −4.79E−07 | −5.97E−07 |
| 8th ORDER COEFFICIENT (C) | 2.84E−10 | 1.69E−10 | −1.14E−07 | −1.47E−08 | 6.37E−09 | 1.12E−08 |
| 10th ORDER COEFFICIENT (D) | −1.00E−12 | 2.99E−11 | 2.37E−09 | 1.99E−10 | −3.01E−12 | −1.35E−10 |
| 12th ORDER COEFFICIENT (E) | 7.30E−14 | −5.85E−13 | −2.76E−11 | −1.06E−12 | −4.19E−14 | 1.10E−12 |
| 14th ORDER COEFFICIENT (F) | −7.31E−16 | 5.60E−15 | 1.64E−13 | −9.08E−16 | −6.05E−16 | −4.66E−15 |
| 16th ORDER COEFFICIENT (G) | 3.33E−18 | −1.78E−17 | −4.02E−16 | 1.27E−17 | −1.15E−18 | 6.65E−18 |

Table 23 illustrates coefficients of a polynomial free-form surface for a projection optical system in practical example 6.

TABLE 23

| COEFFICIENT | VALUE |
| --- | --- |
| X2 | −4.00E−03 |
| Y2 | −1.58E−03 |
| X2Y | −1.62E−04 |
| Y3 | −1.11E−04 |
| X4 | 1.79E−06 |
| X2Y2 | −9.77E−07 |
| Y4 | −4.54E−07 |
| X4Y | 1.06E−07 |
| X2Y3 | 6.69E−08 |
| Y5 | 3.57E−08 |
| X6 | −1.61E−09 |
| X4Y2 | 2.44E−09 |
| X2Y4 | 1.82E−09 |
| Y6 | −2.96E−09 |
| X6Y | −1.22E−10 |
| X4Y3 | −1.01E−10 |
| X2Y5 | −1.53E−10 |
| Y7 | −2.05E−10 |
| X8 | 2.69E−12 |
| X6Y2 | −1.04E−12 |
| X4Y4 | −6.41E−12 |
| X2Y6 | 1.01E−11 |
| Y8 | −5.71E−12 |
| X8Y | 1.25E−13 |
| X6Y3 | 5.60E−14 |
| X4Y5 | 3.14E−14 |
| X2Y7 | 1.09E−12 |
| Y9 | −5.70E−13 |
| X10 | −3.21E−15 |
| X8Y2 | −1.09E−15 |
| X6Y4 | 1.00E−14 |
| X4Y6 | 3.36E−15 |
| X2Y8 | −4.32E−14 |
| Y10 | 4.15E−14 |
| X10Y | −7.47E−17 |
| X8Y3 | 2.47E−17 |
| X6Y5 | 3.62E−16 |
| X4Y7 | 4.39E−17 |
| X2Y9 | −5.62E−15 |
| Y11 | 5.68E−15 |
| X12 | 1.83E−18 |
| X10Y2 | −5.79E−20 |
| X8Y4 | 3.09E−18 |
| X6Y6 | 4.36E−19 |
| X4Y8 | 6.25E−18 |
| X2Y10 | −1.27E−16 |
| Y12 | 1.37E−16 |

A value of Im×Tr for a projection optical system in practical example 6 will be obtained.

Table 24 illustrates xfo and yfo for a projection optical system in practical example 6.

TABLE 24

| POSITION OF LIGHT RAY | xfo | yfo |
| --- | --- | --- |
| f1 | 72.2 | 71.9 |
| f2 | 66.4 | 60.8 |
| f3 | 56.2 | 44.1 |
| f4 | 67.7 | 70.2 |
| f5 | 64.4 | 57.6 |
| f6 | 54.7 | 41.3 |
| f7 | 57.0 | 64.1 |

TABLE 24-continued

| POSITION OF LIGHT RAY | xfo | yfo |
| --- | --- | --- |
| f8 | 49.2 | 59.1 |
| f9 | 50.6 | 33.3 |

In practical example 6, a projection distance for a projection optical system and a size of an image projected on a screen are 775 mm and 60 inches, respectively, and hence, a throw ratio Tr for a projection optical system in practical example 6 is 0.60. Furthermore, from Table 24, a length of an intermediate image in a direction of an optical axis of a first optical system for a projection optical system in practical example 6 is |xfo of f1−yfo of f9|72.2 mm−33.3 mm=38.9 mm. A focal length of a first optical system included in a projection optical system in practical example 6 is 35.74 mm. A normalized length Im of an intermediate image in a direction of an optical axis of a first optical system for a projection optical system in practical example 6 is 38.9 mm/35.74 mm=1.09. A value of Im×Tr for a projection optical system in practical example 6 is 1.09× 0.60=0.65.

Figure 27:
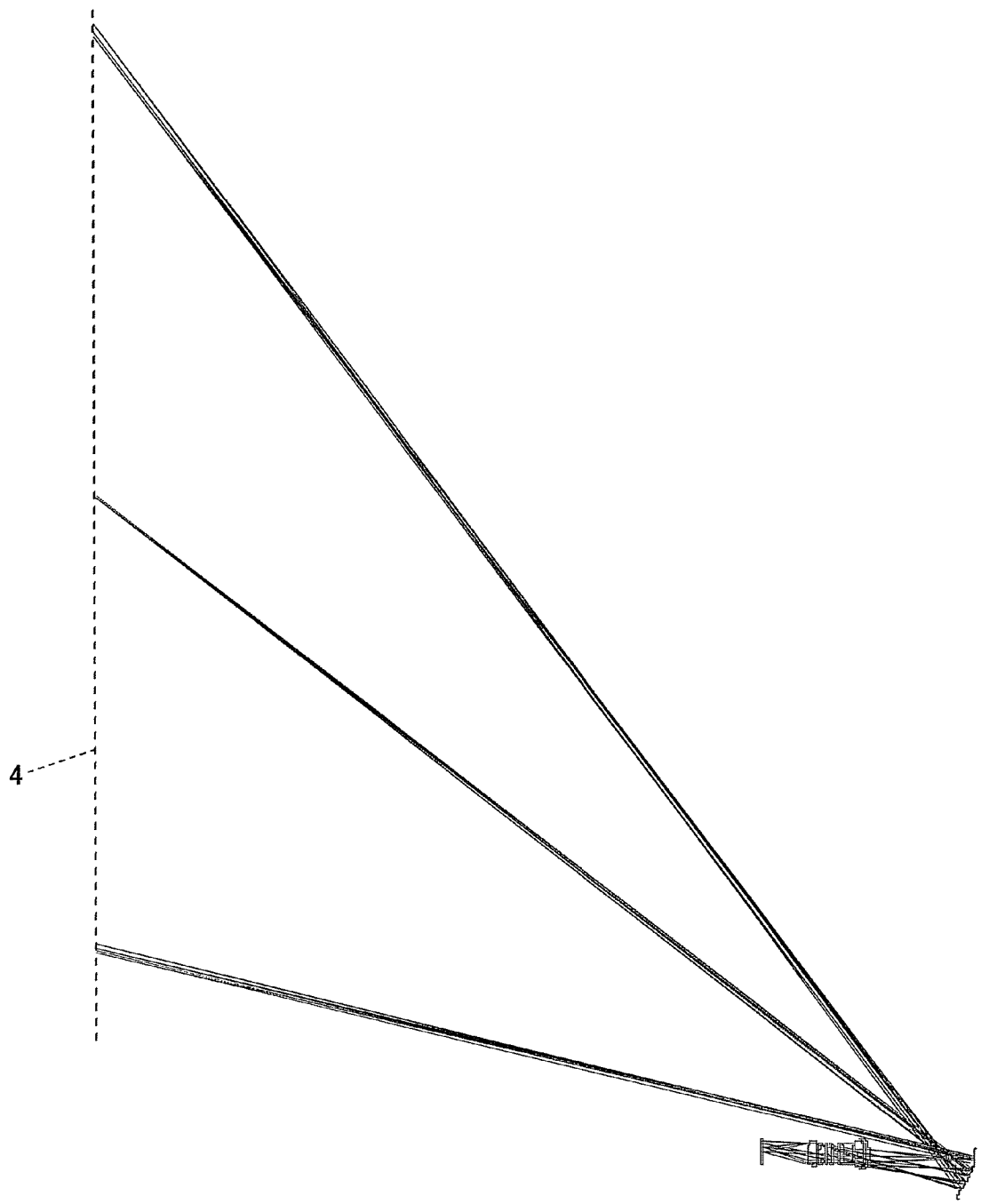
FIG. 27 is a diagram illustrating a projection optical system and an image projecting apparatus in practical example 6 according to an embodiment of the present invention.
Figure 28:
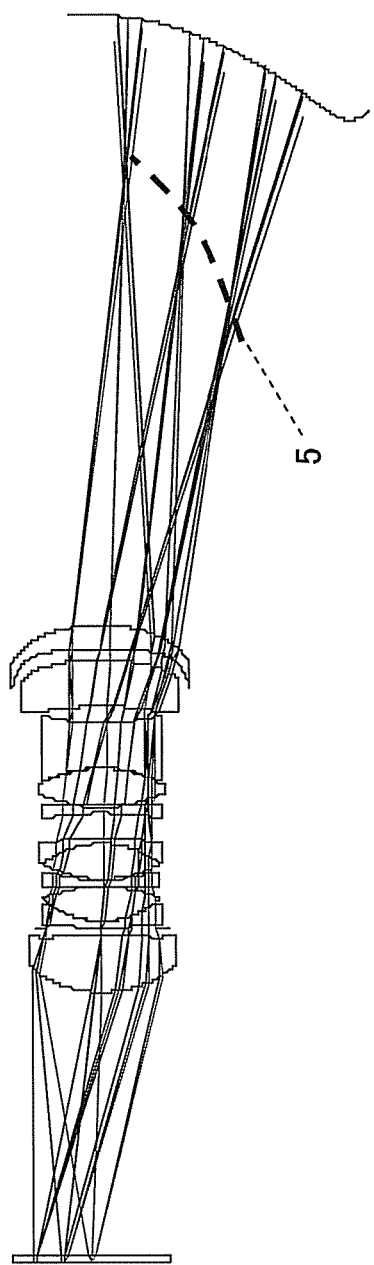
FIG. 28 is a diagram illustrating a first optical system and a second optical system for a projection optical system in practical example 6 according to an embodiment of the present invention.

FIG. 27 is a diagram illustrating a projection optical system and an image projecting apparatus in practical example 6 according to an embodiment of the present invention. FIG. 27 illustrates an optical path for a projection optical system in practical example 6. FIG. 28 is a diagram illustrating a first optical system and a second optical system for a projection optical system in practical example 6 according to an embodiment of the present invention. FIG. 28 is an enlarged view of a first optical system and a second optical system.

Figure 29:
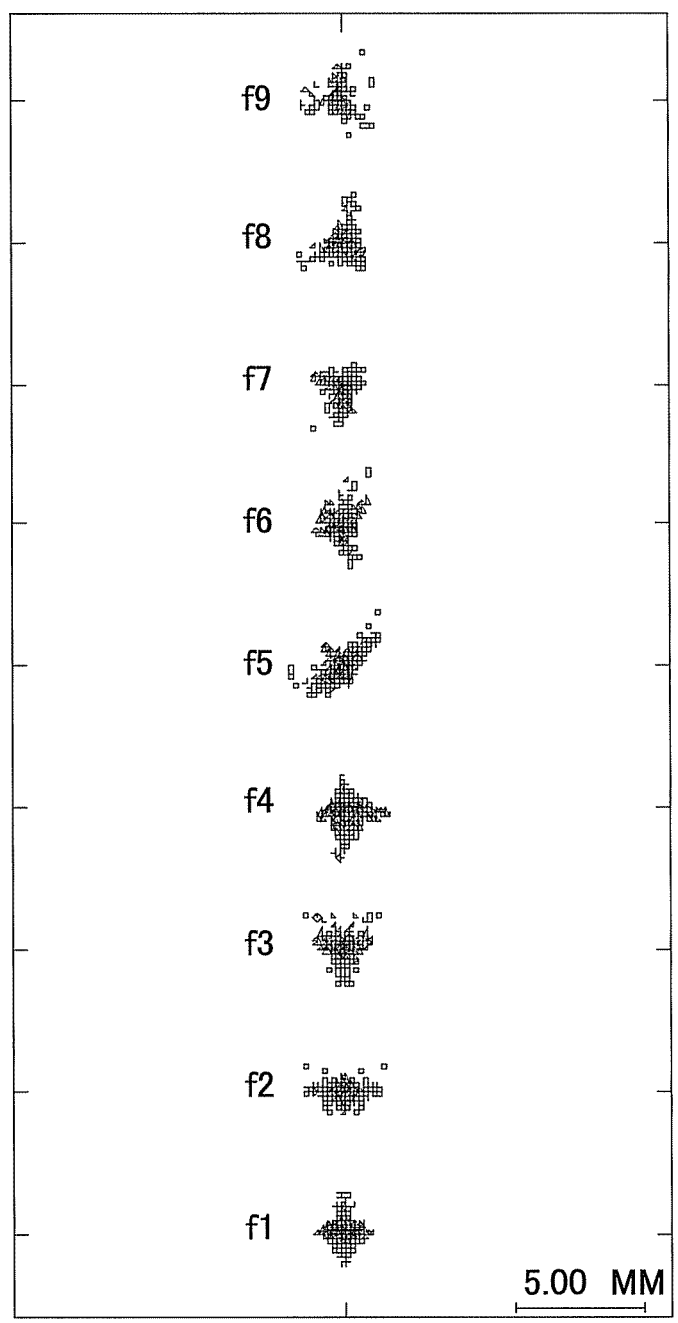
FIG. 29 is a diagram illustrating a spot on a surface to be projected on for a projection optical system in practical example 6 according to an embodiment of the present invention.

FIG. 29 is a diagram illustrating a spot on a surface to be projected on for a projection optical system in practical example 6 according to an embodiment of the present invention. FIG. 29 illustrates a spot diagram corresponding to lattice points f1-f9 on an image forming part included in an image projecting apparatus in practical example 6. As illustrated in FIG. 29, a spot on a screen in practical example 6 is focused well.

Figure 30:
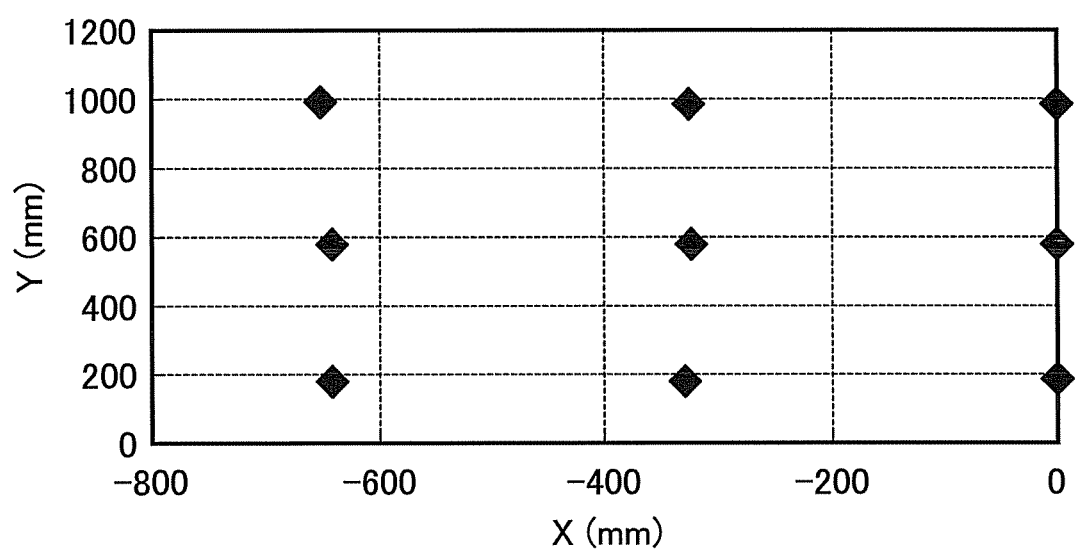
FIG. 30 is a diagram illustrating a TV distortion characteristic for a projection optical system in practical example 6 according to an embodiment of the present invention.

FIG. 30 is a diagram illustrating a TV distortion characteristic for a projection optical system in practical example 6 according to an embodiment of the present invention. A TV distortion for a projection optical system in practical example 6 is less than or equal to 2%. A distortion for a projection optical system in practical example 6 is corrected well.

Practical Example 7

Table 25 illustrates the data of a projection optical system in practical example 7. In practical example 7, a projection distance of a projection optical system and a size of an image projected on a screen are 795 mm and 60 inches, respectively, and hence, a throw ratio for a projection optical system in practical example 7 is 0.62.

TABLE 25

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 39.97 | | | | |
| 3 | ASPHERIC SURFACE | 17.72 | 6.10 | 1.51 | 63.90 | −1.63 | |
| 4 | ASPHERIC SURFACE | −60.50 | 0.31 | | | | |
| STOP | SPHERE | ∞ | 0.45 | | | | |
| 6 | SPHERE | 59.11 | 1.26 | 1.84 | 39.04 | | |
| 7 | SPHERE | 12.07 | 5.64 | 1.49 | 70.29 | | |
| 8 | SPHERE | −23.37 | 0.10 | | | | |
| 9 | SPHERE | −117.34 | 1.20 | 1.76 | 40.44 | | |
| 10 | SPHERE | 36.12 | 0.10 | | | | |
| 11 | SPHERE | 18.61 | 5.97 | 1.58 | 40.47 | | |
| 12 | SPHERE | −16.97 | 6.00 | 1.83 | 39.28 | | |
| 13 | SPHERE | −51.21 | 0.10 | | | | |
| 14 | SPHERE | −45.27 | 6.93 | 1.55 | 46.37 | | |
| 15 | SPHERE | −928.99 | 0.10 | | | | |
| 16 | SPHERE | 38.20 | 3.80 | 1.71 | 28.53 | | |
| 17 | SPHERE | −31.17 | 1.37 | | | | |
| 18 | SPHERE | −27.22 | 2.93 | 1.84 | 34.34 | | |
| 19 | SPHERE | 27.71 | 4.85 | | | | |
| 20 | ASPHERIC SURFACE | −14.54 | 3.35 | 1.53 | 55.80 | | |
| 21 | ASPHERIC SURFACE | −19.49 | 5.43 | | | | |
| 22 | ASPHERIC SURFACE | −21.69 | 2.41 | 1.53 | 55.80 | | |
| 23 | ASPHERIC SURFACE | −18.14 | 20.02 | | | | |
| 24 | SPHERE | ∞ | 90.00 | | | | |
| 25 | xy-POLYNOMIAL SURFACE | −91.51 | −768.39 | REFLECTION | | −62.29 | −40.52 |
| 26 | SPHERE | ∞ | 0 | | | | |

Table 26 illustrates coefficients of an aspheric surface for a projection optical system in practical example 7.

TABLE 26

| | SURFACE NUMBER | | | | | |
|---|---|---|---|---|---|---|
| | 3 | 4 | 20 | 21 | 22 | 23 |
| 4th ORDER COEFFICIENT (A) | 1.20E−05 | 4.38E−05 | 3.91E−05 | 1.66E−05 | −9.47E−05 | −5.66E−05 |
| 6th ORDER COEFFICIENT (B) | 1.71E−08 | 4.99E−09 | 3.34E−06 | 7.40E−07 | −5.27E−07 | −6.35E−07 |
| 8th ORDER COEFFICIENT (C) | 6.61E−10 | 2.26E−10 | −1.20E−07 | −1.51E−08 | 6.53E−09 | 1.17E−08 |
| 10th ORDER COEFFICIENT (D) | −2.54E−13 | 2.94E−11 | 2.42E−09 | 1.83E−10 | 2.71E−12 | −1.33E−10 |
| 12th ORDER COEFFICIENT (E) | 4.38E−14 | −6.05E−13 | −2.76E−11 | −1.13E−12 | −2.97E−14 | 1.12E−12 |
| 14th ORDER COEFFICIENT (F) | −9.23E−16 | 5.42E−15 | 1.55E−13 | −7.01E−16 | −5.90E−16 | −4.60E−15 |
| 16th ORDER COEFFICIENT (G) | 8.13E−18 | −1.32E−17 | −3.12E−16 | 1.90E−17 | −3.96E−19 | 6.41E−18 |

Table 27 illustrates coefficients of a polynomial free-form surface for a projection optical system in practical example 7.

TABLE 27

| COEFFICIENT | VALUE |
|---|---|
| X2 | 2.48E−04 |
| Y2 | 2.44E−03 |
| X2Y | −2.87E−05 |
| Y3 | −1.65E−05 |
| X4 | 4.62E−08 |
| X2Y2 | 1.58E−07 |
| Y4 | 5.31E−07 |
| X4Y | 6.85E−10 |
| X2Y3 | 5.71E−10 |
| Y5 | −1.28E−08 |
| X6 | 9.70E−11 |
| X4Y2 | −8.13E−11 |
| X2Y4 | −7.49E−10 |
| Y6 | −5.24E−10 |
| X6Y | 4.64E−13 |
| X4Y3 | 4.21E−12 |
| X2Y5 | 3.06E−11 |
| Y7 | 4.35E−11 |
| X8 | −8.12E−14 |
| X6Y2 | −5.16E−14 |
| X4Y4 | 2.02E−13 |
| X2Y6 | −2.84E−13 |
| Y8 | −1.26E−12 |
| X8Y | −4.10E−16 |
| X6Y3 | −1.79E−15 |
| X4Y5 | −1.62E−14 |
| X2Y7 | −9.16E−15 |
| Y9 | 1.90E−14 |
| X10 | 3.83E−17 |
| X8Y2 | 5.33E−17 |
| X6Y4 | 1.21E−16 |
| X4Y6 | 3.81E−16 |
| X2Y8 | 2.36E−16 |
| Y10 | −1.45E−16 |
| X10Y | −1.04E−20 |
| X8Y3 | −1.17E−18 |
| X6Y5 | −2.11E−18 |
| X4Y7 | −3.54E−18 |
| X2Y9 | −1.78E−18 |
| Y11 | 1.99E−19 |
| X12 | −7.01E−21 |
| X10Y2 | −2.29E−21 |
| X8Y4 | 9.93E−21 |
| X6Y6 | 1.13E−20 |
| X4Y8 | 1.03E−20 |
| X2Y10 | 3.42E−21 |
| Y12 | 5.20E−22 |

A value of Im×Tr for a projection optical system in practical example 7 will be obtained.

Table 28 illustrates xfo and yfo for a projection optical system in practical example 7.

TABLE 28

| POSITION OF LIGHT RAY | xfo | yfo |
|---|---|---|
| f1 | 100.0 | 100.2 |
| f2 | 90.2 | 81.7 |
| f3 | 72.6 | 51.0 |
| f4 | 92.8 | 96.7 |
| f5 | 86.8 | 76.0 |
| f6 | 70.1 | 46.1 |
| f7 | 74.5 | 85.9 |
| f8 | 60.4 | 77.5 |
| f9 | 63.1 | 32.4 |

In practical example 7, a projection distance for a projection optical system and a size of an image projected on a screen are 795 mm and 60 inches, respectively, and hence, a throw ratio Tr for a projection optical system in practical example 7 is 0.62. Furthermore, from Table 28, a length of an intermediate image in a direction of an optical axis of a first optical system for a projection optical system in practical example 7 is |xfo of f1−yfo of f9|=100.2 mm−32.4 mm=67.8 mm. A focal length of a first optical system included in a projection optical system in practical example 7 is 28.56 mm. A normalized length Im of an intermediate image in a direction of an optical axis of a first optical system for a projection optical system in practical example 7 is 67.8 mm/28.56 mm=2.37. A value of Im×Tr for a projection optical system in practical example 7 is 2.37×0.62=1.47.

Figure 31:
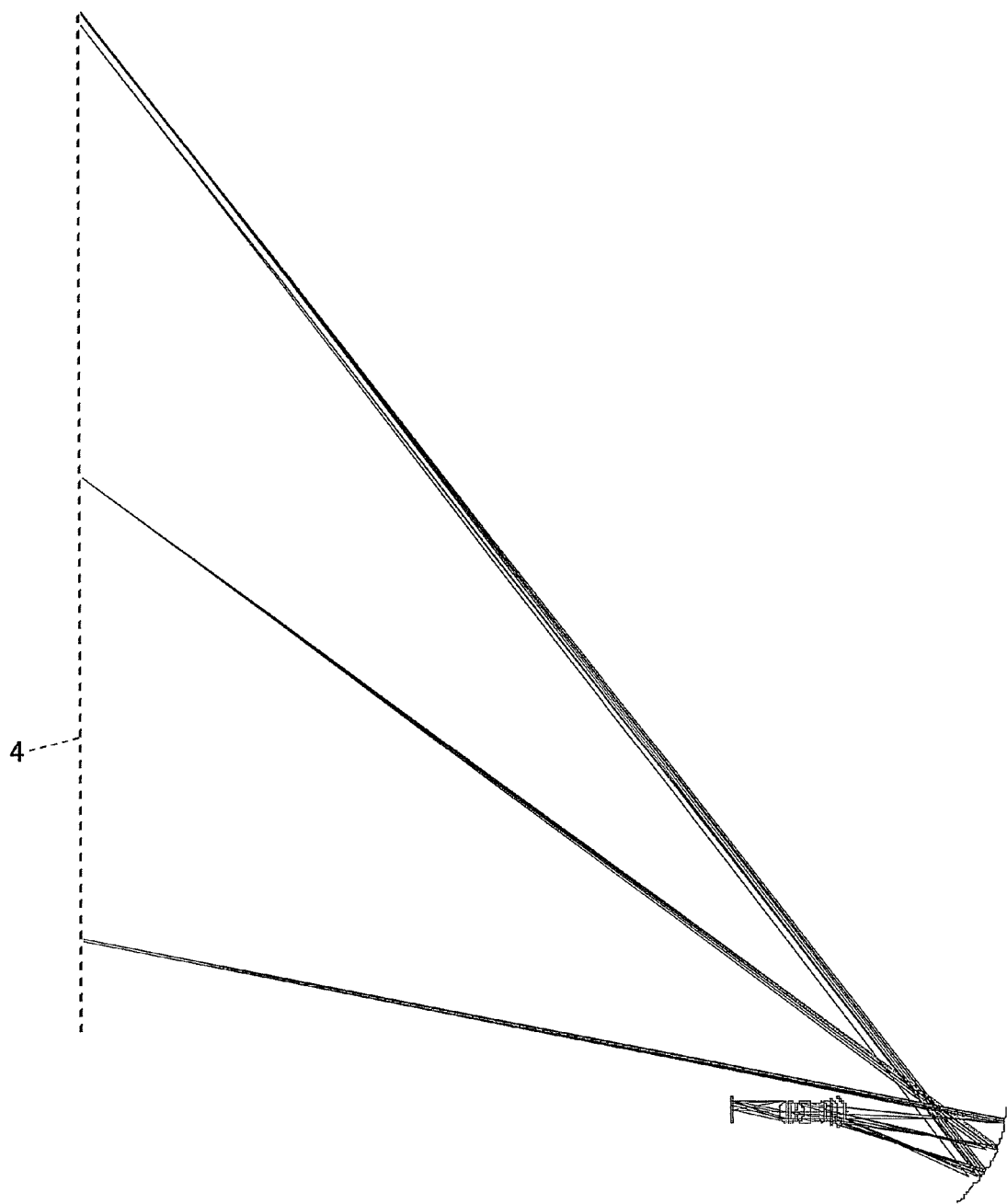
FIG. 31 is a diagram illustrating a projection optical system and an image projecting apparatus in practical example 7 according to an embodiment of the present invention.
Figure 32:
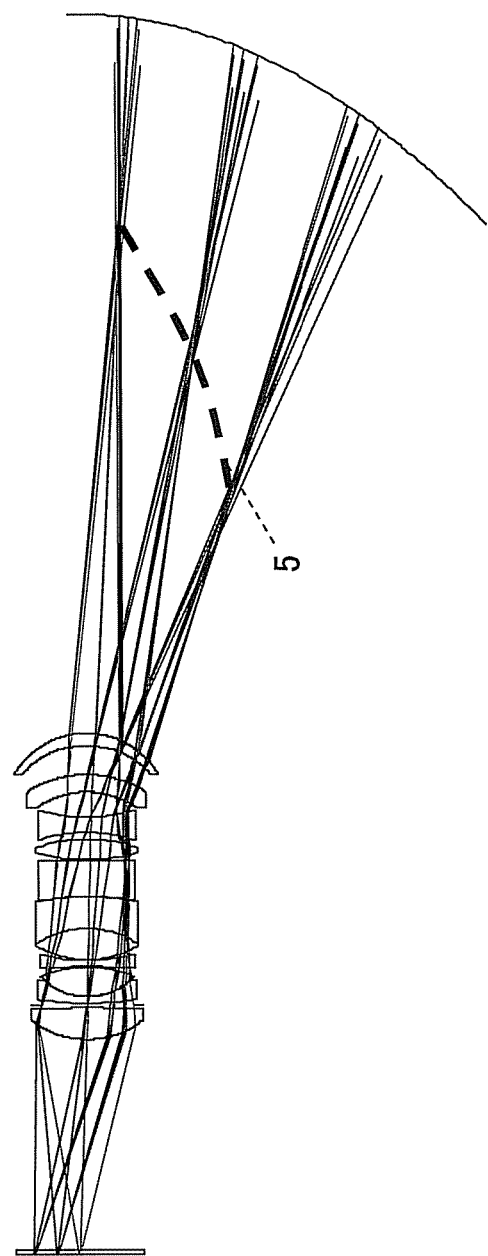
FIG. 32 is a diagram illustrating a first optical system and a second optical system for a projection optical system in practical example 7 according to an embodiment of the present invention.

FIG. 31 is a diagram illustrating a projection optical system and an image projecting apparatus in practical example 7 according to an embodiment of the present invention. FIG. 31 illustrates an optical path for a projection optical system in practical example 7. FIG. 32 is a diagram illustrating a first optical system and a second optical system for a projection optical system in practical example 7 according to an embodiment of the present invention. FIG. 32 is an enlarged view of a first optical system and a second optical system.

Figure 33:
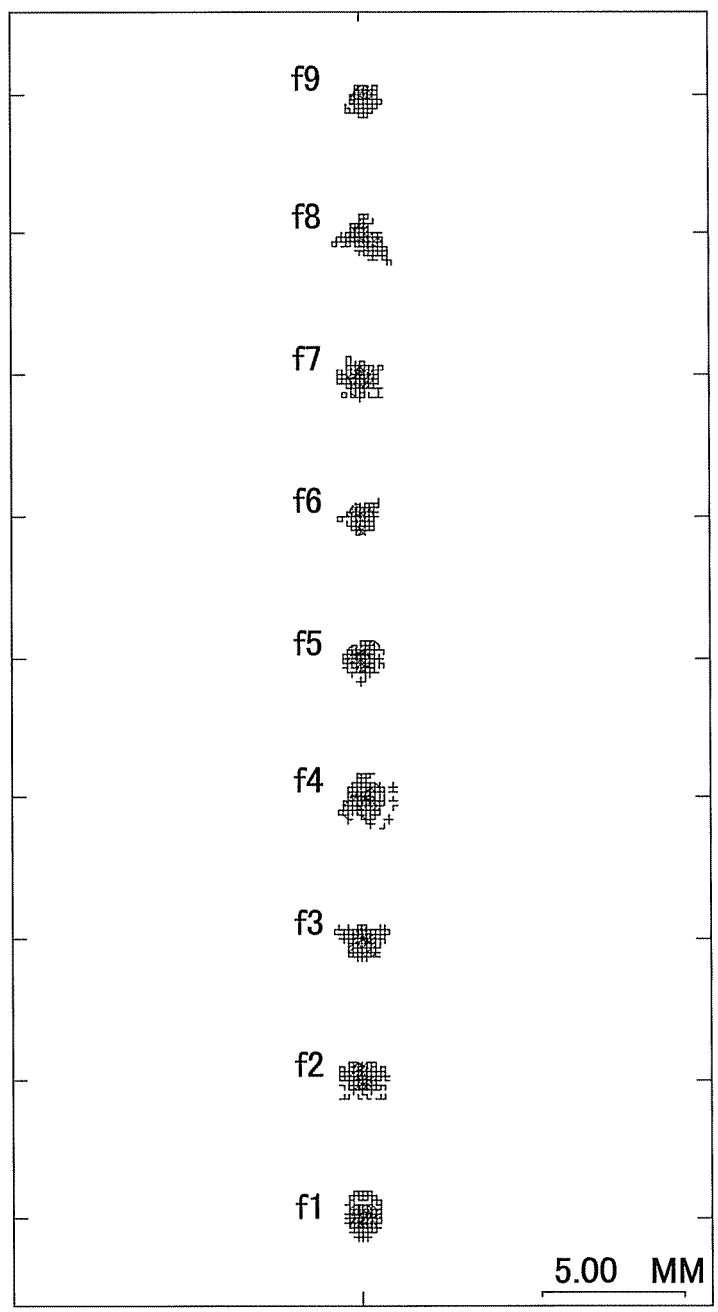
FIG. 33 is a diagram illustrating a spot on a surface to be projected on for a projection optical system in practical example 7 according to an embodiment of the present invention.

FIG. 33 is a diagram illustrating a spot on a surface to be projected on for a projection optical system in practical example 7 according to an embodiment of the present invention. FIG. 33 illustrates a spot diagram corresponding to lattice points f1-f9 on an image forming part included in an image projecting apparatus in practical example 7. As illustrated in FIG. 33, a spot on a screen in practical example 7 is focused well.

Figure 34:
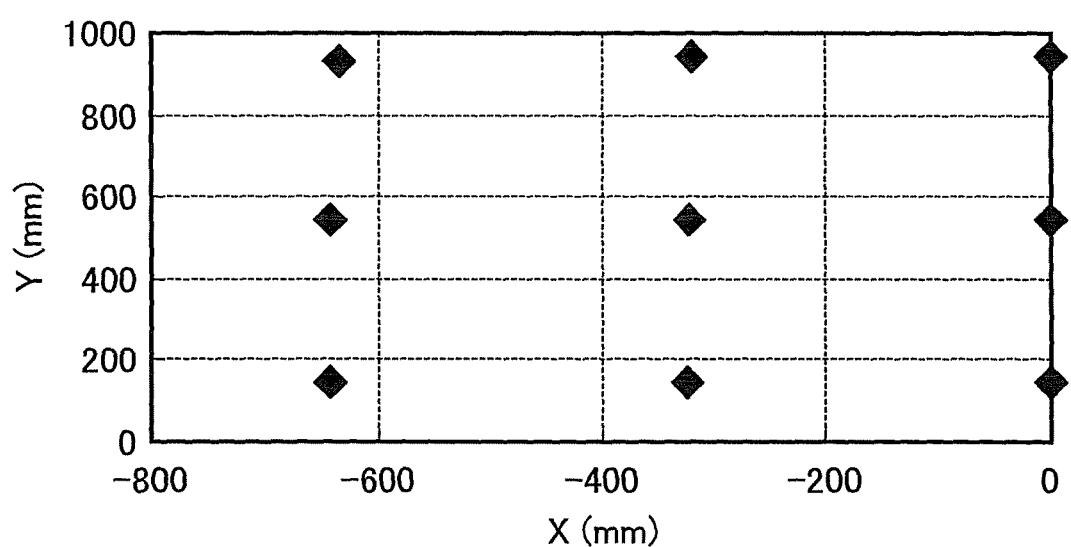
FIG. 34 is a diagram illustrating a TV distortion characteristic for a projection optical system in practical example 7 according to an embodiment of the present invention.

FIG. 34 is a diagram illustrating a TV distortion characteristic for a projection optical system in practical example 7 according to an embodiment of the present invention. A TV distortion for a projection optical system in practical example 7 is less than or equal to 2%. A distortion for a projection optical system in practical example 7 is corrected well.

Practical Example 8

Table 29 illustrates the data of a projection optical system in practical example 8. In practical example 8, a projection distance of a projection optical system and a size of an image projected on a screen are 200 mm and 60 inches, respectively, and hence, a throw ratio for a projection optical system in practical example 8 is 0.15.

TABLE 29

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 28.00 | | | | |

TABLE 29-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 3 | ASPHERIC SURFACE | 11.61 | 1.59 | 1.51 | 63.90 | −1.31 | |
| 4 | ASPHERIC SURFACE | 39.19 | 0.27 | | | | |
| STOP | SPHERE | ∞ | 0.35 | | | | |
| 6 | SPHERE | 77.67 | 0.50 | 1.82 | 38.59 | | |
| 7 | SPHERE | 8.81 | 6.00 | 1.49 | 70.34 | | |
| 8 | SPHERE | −24.35 | 10.92 | | | | |
| 9 | SPHERE | 29.06 | 3.68 | 1.55 | 64.33 | | |
| 10 | SPHERE | −20.45 | 1.00 | 1.81 | 34.60 | | |
| 11 | SPHERE | −110.04 | 0.10 | | | | |
| 12 | SPHERE | 22.07 | 3.81 | 1.85 | 23.78 | | |
| 13 | SPHERE | −51.49 | 3.56 | | | | |
| 14 | SPHERE | −23.53 | 6.95 | 1.85 | 24.08 | | |
| 15 | SPHERE | 15.40 | 3.43 | | | | |
| 16 | ASPHERIC SURFACE | −19.74 | 1.00 | 1.53 | 55.80 | | |
| 17 | ASPHERIC SURFACE | −173.57 | 6.51 | | | | |
| 18 | ASPHERIC SURFACE | −21.97 | 4.98 | 1.53 | 55.80 | | |
| 19 | ASPHERIC SURFACE | −13.67 | 0.10 | | | | |
| 20 | SPHERE | ∞ | 90.00 | | | | |
| 21 | xy-POLYNOMIAL SURFACE | −83.76 | −150.43 | REFLECTION | | −62.93 | −54.93 |
| 22 | SPHERE | ∞ | 0.00 | | | | |

Table 30 illustrates coefficients of an aspheric surface for a projection optical system in practical example 8.

TABLE 30

| | SURFACE NUMBER | | | | | |
|---|---|---|---|---|---|---|
| | 3 | 4 | 16 | 17 | 18 | 19 |
| 4th ORDER COEFFICIENT (A) | 2.75E−04 | 2.76E−04 | 1.83E−04 | 6.41E−05 | −1.48E−04 | −5.30E−05 |
| 6th ORDER COEFFICIENT (B) | 6.38E−06 | 7.00E−06 | 3.48E−06 | 1.53E−06 | −7.50E−07 | −5.39E−07 |
| 8th ORDER COEFFICIENT (C) | 1.13E−07 | 1.88E−07 | −1.12E−07 | −1.78E−08 | 1.00E−08 | 7.45E−09 |
| 10th ORDER COEFFICIENT (D) | 6.23E−09 | 5.71E−09 | 2.41E−09 | 1.74E−10 | 1.83E−11 | −1.11E−10 |
| 12th ORDER COEFFICIENT (E) | 1.12E−10 | 1.20E−10 | −2.82E−11 | −1.20E−12 | −7.28E−15 | 1.08E−12 |
| 14th ORDER COEFFICIENT (F) | −5.82E−12 | −1.27E−12 | 1.53E−13 | −2.03E−15 | −7.72E−16 | −5.62E−15 |
| 16th ORDER COEFFICIENT (G) | 5.19E−13 | 6.93E−13 | −2.46E−16 | 3.96E−17 | −6.96E−19 | 1.41E−17 |

Table 31 illustrates coefficients of a polynomial free-form surface for a projection optical system in practical example 8.

TABLE 31

| COEFFICIENT | VALUE |
|---|---|
| X2 | −5.33E−04 |
| Y2 | 3.64E−03 |
| X2Y | −3.83E−05 |

TABLE 31-continued

| COEFFICIENT | VALUE |
|---|---|
| Y3 | −2.35E−06 |
| X4 | −3.42E−10 |
| X2Y2 | −1.87E−07 |
| Y4 | 3.66E−07 |
| X4Y | −2.30E−09 |
| X2Y3 | 1.43E−10 |
| Y5 | −4.55E−09 |
| X6 | 5.36E−11 |

TABLE 31-continued

| COEFFICIENT | VALUE |
|---|---|
| X4Y2 | 1.29E-10 |
| X2Y4 | -3.86E-10 |
| Y6 | -5.01E-10 |
| X6Y | -1.05E-14 |
| X4Y3 | -4.97E-12 |
| X2Y5 | 1.27E-11 |
| Y7 | 3.93E-11 |
| X8 | -3.93E-14 |
| X6Y2 | -1.10E-13 |
| X4Y4 | 2.57E-13 |
| X2Y6 | 1.21E-13 |
| Y8 | -1.20E-12 |
| X8Y | -2.91E-16 |
| X6Y3 | 1.10E-15 |
| X4Y5 | -1.37E-14 |
| X2Y7 | -2.04E-14 |
| Y9 | 1.87E-14 |
| X10 | 1.44E-17 |
| X8Y2 | 4.27E-17 |
| X6Y4 | -4.42E-17 |
| X4Y6 | 2.33E-16 |
| X2Y8 | 5.07E-16 |
| Y10 | -1.44E-16 |
| X10Y | 5.46E-20 |
| X8Y3 | -4.12E-20 |
| X6Y5 | 3.49E-18 |
| X4Y7 | -2.89E-19 |
| X2Y9 | -5.11E-18 |
| Y11 | 3.86E-19 |
| X12 | -2.01E-21 |
| X10Y2 | -6.10E-21 |
| X8Y4 | -1.30E-20 |
| X6Y6 | -5.13E-20 |
| X4Y8 | -1.52E-20 |
| X2Y10 | 1.73E-20 |
| Y12 | 4.40E-22 |

A value of Im×Tr for a projection optical system in practical example 8 will be obtained.

Table 32 illustrates xfo and yfo for a projection optical system in practical example 8.

TABLE 32

| POSITION OF LIGHT RAY | xfo | yfo |
|---|---|---|
| f1 | 123.9 | 120.4 |
| f2 | 93.4 | 55.4 |
| f3 | 58.1 | 3.9 |
| f4 | 86.2 | 109.2 |
| f5 | 85.7 | 39.9 |
| f6 | 54.4 | 0.3 |
| f7 | 33.6 | 81.8 |
| f8 | 12.1 | 64.9 |
| f9 | 47.4 | -6.9 |

In practical example 8, a projection distance for a projection optical system and a size of an image projected on a screen are 200 mm and 60 inches, respectively, and hence, a throw ratio Tr for a projection optical system in practical example 8 is 0.15. Furthermore, from Table 32, a length of an intermediate image in a direction of an optical axis of a first optical system for a projection optical system in practical example 8 is |xfo of f1−yfo of f9|=123.9 mm−(−6.9 mm)=130.8 mm. A focal length of a first optical system included in a projection optical system in practical example 8 is 25.09 mm. A normalized length Im of an intermediate image in a direction of an optical axis of a first optical system for a projection optical system in practical example 8 is 130.8 mm/25.09 mm=5.21. A value of Im×Tr for a projection optical system in practical example 8 is 5.21×0.15=0.78.

Figure 35:
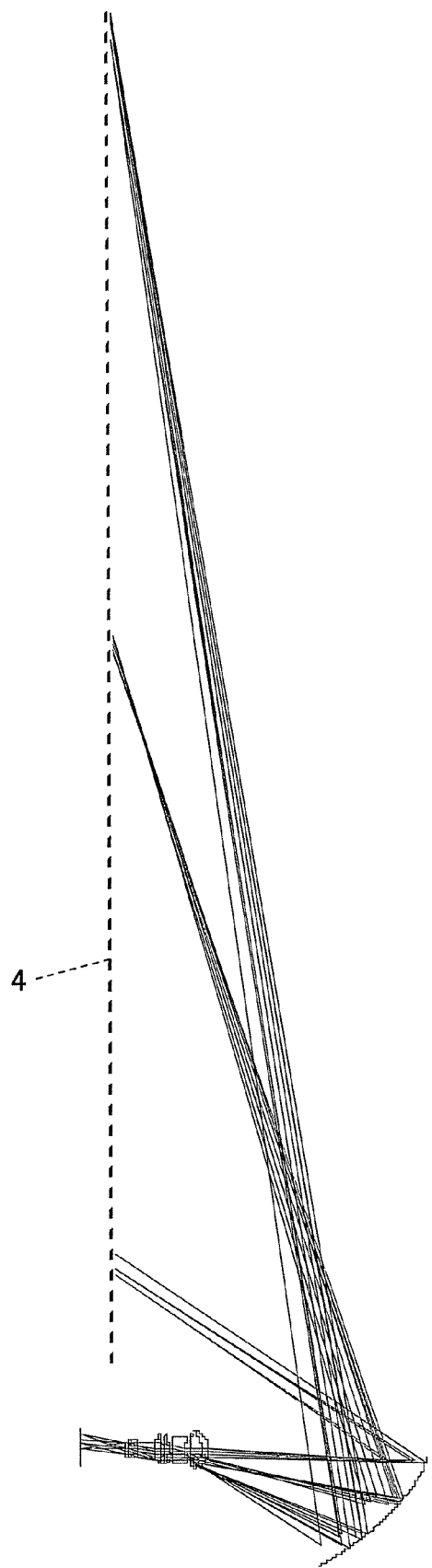
FIG. 35 is a diagram illustrating a projection optical system and an image projecting apparatus in practical example 8 according to an embodiment of the present invention.
Figure 36:
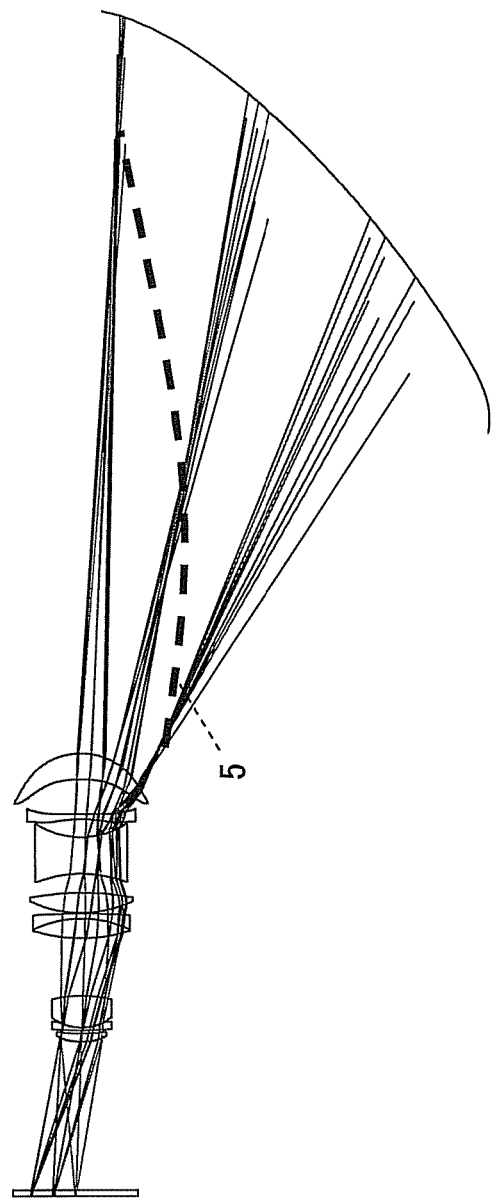
FIG. 36 is a diagram illustrating a first optical system and a second optical system for a projection optical system in practical example 8 according to an embodiment of the present invention.

FIG. 35 is a diagram illustrating a projection optical system and an image projecting apparatus in practical example 8 according to an embodiment of the present invention. FIG. 35 illustrates an optical path for a projection optical system in practical example 8. FIG. 36 is a diagram illustrating a first optical system and a second optical system for a projection optical system in practical example 8 according to an embodiment of the present invention. FIG. 36 is an enlarged view of a first optical system and a second optical system.

In any of practical examples 8 and 9, a first optical system included in a projection optical system is composed of nine lenses and a stop but the number of a lens(es) composing a lens element in a first optical system included in a projection optical system is not necessarily needed to be nine. Also, a position of a stop in a first optical system included in a projection optical system is not necessarily needed to be a position illustrated in FIG. 36.

Figure 37:
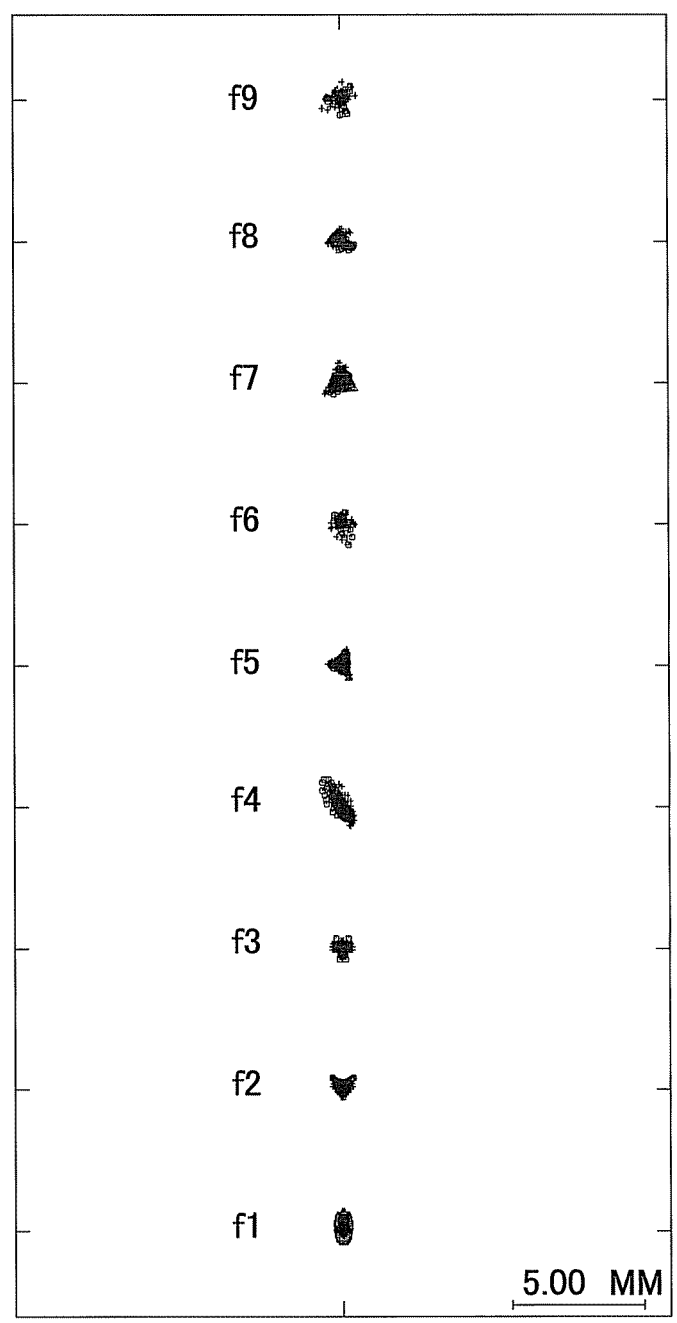
FIG. 37 is a diagram illustrating a spot on a surface to be projected on for a projection optical system in practical example 8 according to an embodiment of the present invention.

FIG. 37 is a diagram illustrating a spot on a surface to be projected on for a projection optical system in practical example 8 according to an embodiment of the present invention. FIG. 37 illustrates a spot diagram corresponding to lattice points f1-f9 on an image forming part included in an image projecting apparatus in practical example 8. As illustrated in FIG. 37, a spot on a screen in practical example 8 is focused well.

Figure 38:
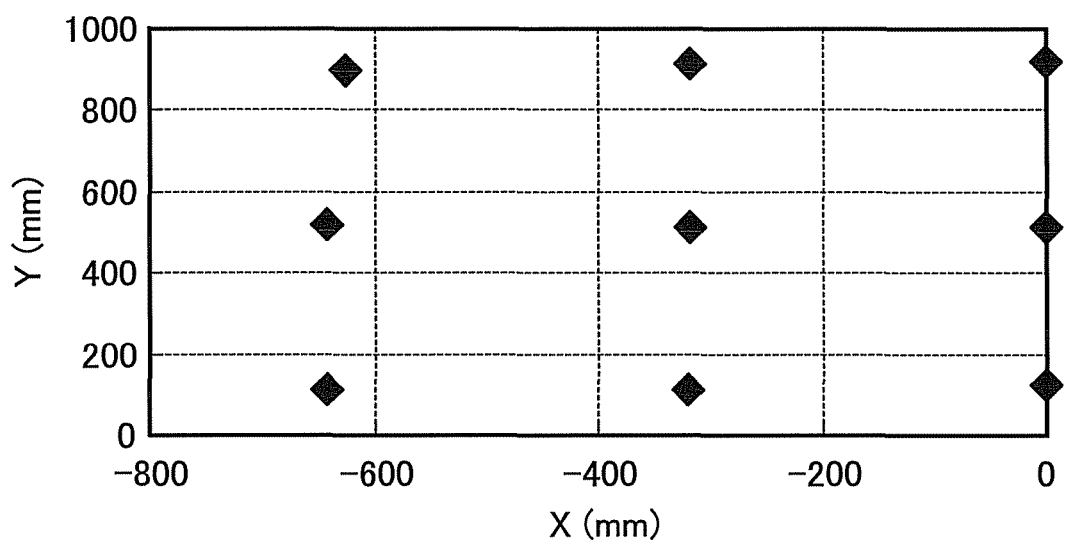
FIG. 38 is a diagram illustrating a TV distortion characteristic for a projection optical system in practical example 8 according to an embodiment of the present invention.

FIG. 38 is a diagram illustrating a TV distortion characteristic for a projection optical system in practical example 8 according to an embodiment of the present invention. A TV distortion for a projection optical system in practical example 8 is less than or equal to 3%. A distortion for a projection optical system in practical example 8 is corrected well.

Practical Example 9

Table 33 illustrates the data of a projection optical system in practical example 9. In practical example 9, a projection distance of a projection optical system and a size of an image projected on a screen are 226.5 mm and 60 inches, respectively, and hence, a throw ratio for a projection optical system in practical example 9 is 0.18.

TABLE 33

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 0 | SPHERE | ∞ | 1.11 | | | | |
| 1 | SPHERE | ∞ | 1.05 | 1.51 | 63.35 | | |
| 2 | SPHERE | ∞ | 28.00 | | | | |
| 3 | ASPHERIC SURFACE | 17.54 | 1.55 | 1.51 | 63.90 | | -1.30 |
| 4 | ASPHERIC SURFACE | -222.17 | 0.10 | | | | |
| STOP | SPHERE | ∞ | 0.10 | | | | |

TABLE 33-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| 6 | SPHERE | 29.48 | 0.48 | 1.83 | 37.35 | | |
| 7 | SPHERE | 7.98 | 2.16 | 1.49 | 70.10 | | |
| 8 | SPHERE | −54.88 | 10.14 | | | | |
| 9 | SPHERE | 33.62 | 2.89 | 1.55 | 64.40 | | |
| 10 | SPHERE | −19.77 | 1.00 | 1.81 | 33.16 | | |
| 11 | SPHERE | −106.64 | 0.19 | | | | |
| 12 | SPHERE | 20.93 | 3.51 | 1.85 | 23.78 | | |
| 13 | SPHERE | −39.86 | 3.55 | | | | |
| 14 | SPHERE | −19.30 | 3.55 | 1.82 | 24.64 | | |
| 15 | SPHERE | 15.76 | 2.21 | | | | |
| 16 | ASPHERIC SURFACE | −34.26 | 1.00 | 1.53 | 55.80 | | |
| 17 | ASPHERIC SURFACE | 113.40 | 5.49 | | | | |
| 18 | ASPHERIC SURFACE | −22.77 | 3.98 | 1.53 | 55.80 | | |
| 19 | ASPHERIC SURFACE | −12.65 | 0.10 | | | | |
| 20 | SPHERE | ∞ | 90.00 | | | | |
| 21 | xy-POLYNOMIAL SURFACE | −83.29 | −187.65 | REFLECTION | | −53.50 | −52.22 |
| 22 | SPHERE | ∞ | 0.00 | | | | |

Table 34 illustrates coefficients of an aspheric surface for a projection optical system in practical example 9.

TABLE 34

| | SURFACE NUMBER | | | | | |
|---|---|---|---|---|---|---|
| | 3 | 4 | 16 | 17 | 18 | 19 |
| 4th ORDER COEFFICIENT (A) | 3.07E−04 | 2.35E−04 | 1.65E−04 | 7.84E−05 | −1.07E−04 | −4.82E−05 |
| 6th ORDER COEFFICIENT (B) | 3.30E−06 | 3.20E−06 | 3.88E−06 | 1.43E−06 | −4.76E−07 | −4.68E−07 |
| 8th ORDER COEFFICIENT (C) | 5.82E−08 | 1.16E−07 | −1.11E−07 | −1.70E−08 | 1.05E−08 | 7.09E−09 |
| 10th ORDER COEFFICIENT (D) | 5.85E−09 | 3.09E−09 | 2.40E−09 | 1.74E−10 | 1.65E−11 | −1.09E−10 |
| 12th ORDER COEFFICIENT (E) | 2.00E−11 | −2.15E−12 | −2.85E−11 | −1.24E−12 | −4.02E−14 | 1.11E−12 |
| 14th ORDER COEFFICIENT (F) | −1.47E−11 | −3.01E−12 | 1.49E−13 | −2.29E−15 | −9.74E−16 | −5.29E−15 |
| 16th ORDER COEFFICIENT (G) | 6.99E−13 | 4.15E−13 | −2.07E−16 | 2.65E−17 | −1.21E−18 | 1.60E−17 |

Table 35 illustrates coefficients of a polynomial free-form surface for a projection optical system in practical example 9.

TABLE 35

| COEFFICIENT | VALUE |
|---|---|
| X2 | −1.37E−03 |
| Y2 | 3.46E−03 |
| X2Y | −5.53E−05 |
| Y3 | −5.02E−06 |
| X4 | −5.30E−08 |
| X2Y2 | −5.16E−07 |
| Y4 | 3.09E−07 |
| X4Y | −3.79E−09 |
| X2Y3 | −4.29E−09 |
| Y5 | −4.03E−09 |
| X6 | 4.22E−11 |
| X4Y2 | 8.50E−11 |
| X2Y4 | −3.81E−10 |
| Y6 | −5.01E−10 |
| X6Y | −7.98E−13 |
| X4Y3 | −6.30E−12 |
| X2Y5 | 8.90E−12 |
| Y7 | 3.82E−11 |
| X8 | −4.60E−14 |
| X6Y2 | −1.16E−13 |
| X4Y4 | 2.21E−13 |

TABLE 35-continued

| COEFFICIENT | VALUE |
| --- | --- |
| X2Y6 | 1.26E-13 |
| Y8 | -1.21E-12 |
| X8Y | 1.09E-16 |
| X6Y3 | 1.83E-15 |
| X4Y5 | -1.78E-14 |
| X2Y7 | -2.37E-14 |
| Y9 | 1.92E-14 |
| X10 | 2.02E-17 |
| X8Y2 | 5.53E-17 |
| X6Y4 | -6.96E-17 |
| X4Y6 | 4.37E-16 |
| X2Y8 | 6.00E-16 |
| Y10 | -1.43E-16 |
| X10Y | -4.73E-20 |
| X8Y3 | -4.03E-19 |
| X6Y5 | 6.29E-18 |
| X4Y7 | -1.47E-18 |
| X2Y9 | -5.10E-18 |
| Y11 | 3.61E-19 |
| X12 | -3.19E-21 |
| X10Y2 | -1.22E-20 |
| X8Y4 | -2.31E-20 |
| X6Y6 | -1.31E-19 |
| X4Y8 | -4.06E-20 |
| X2Y10 | -8.80E-22 |
| Y12 | -4.20E-22 |

A value of Im×Tr for a projection optical system in practical example 9 will be obtained.

Table 36 illustrates xfo and yfo for a projection optical system in practical example 6.

TABLE 32

| POSITION OF LIGHT RAY | xfo | yfo |
| --- | --- | --- |
| f1 | 113.8 | 111.2 |
| f2 | 89.7 | 60.0 |
| f3 | 59.5 | 10.3 |
| f4 | 85.3 | 102.5 |
| f5 | 83.0 | 46.7 |
| f6 | 56.1 | 6.0 |
| f7 | 40.9 | 79.6 |
| f8 | 19.5 | 65.7 |
| f9 | 48.5 | -2.6 |

In practical example 9, a projection distance for a projection optical system and a size of an image projected on a screen are 226.5 mm and 60 inches, respectively, and hence, a throw ratio Tr for a projection optical system in practical example 9 is 0.18. Furthermore, from Table 36, a length of an intermediate image in a direction of an optical axis of a first optical system for a projection optical system in practical example 9 is |xfo of f1−yfo of f9|=113.8 mm−(−2.6 mm)=116.4 mm. A focal length of a first optical system included in a projection optical system in practical example 9 is 25.57 mm. A normalized length Im of an intermediate image in a direction of an optical axis of a first optical system for a projection optical system in practical example 9 is 116.4 mm/25.57 mm=4.55. A value of Im×Tr for a projection optical system in practical example 9 is 4.55×0.18=0.82.

Figure 39:
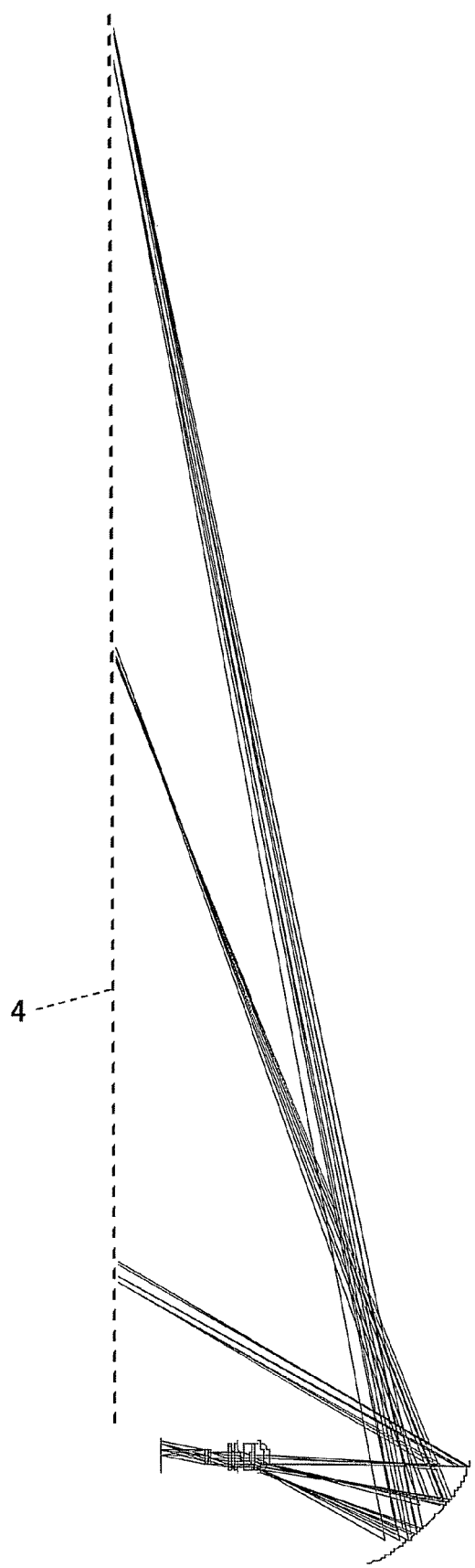
FIG. 39 is a diagram illustrating a projection optical system and an image projecting apparatus in practical example 9 according to an embodiment of the present invention.
Figure 40:
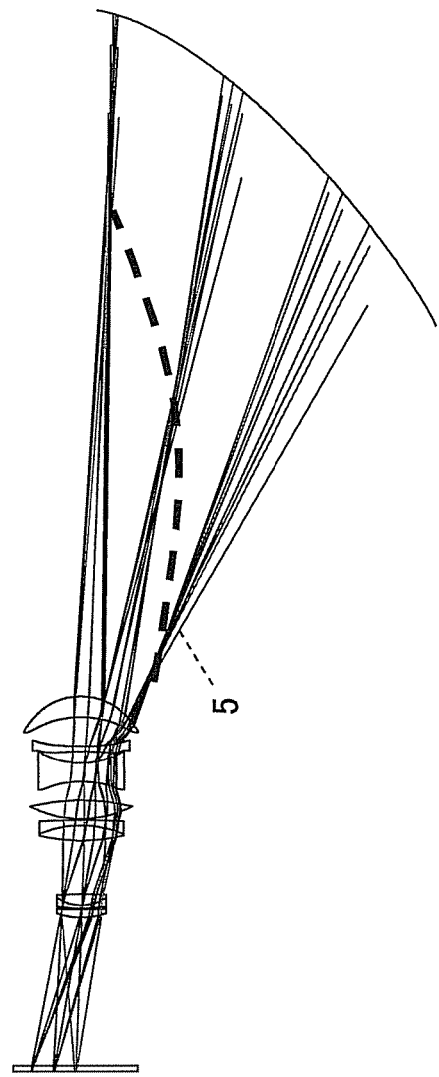
FIG. 40 is a diagram illustrating a first optical system and a second optical system for a projection optical system in practical example 9 according to an embodiment of the present invention.

FIG. 39 is a diagram illustrating a projection optical system and an image projecting apparatus in practical example 9 according to an embodiment of the present invention. FIG. 39 illustrates an optical path for a projection optical system in practical example 9. FIG. 40 is a diagram illustrating a first optical system and a second optical system for a projection optical system in practical example 9 according to an embodiment of the present invention. FIG. 40 is an enlarged view of a first optical system and a second optical system.

Figure 41:
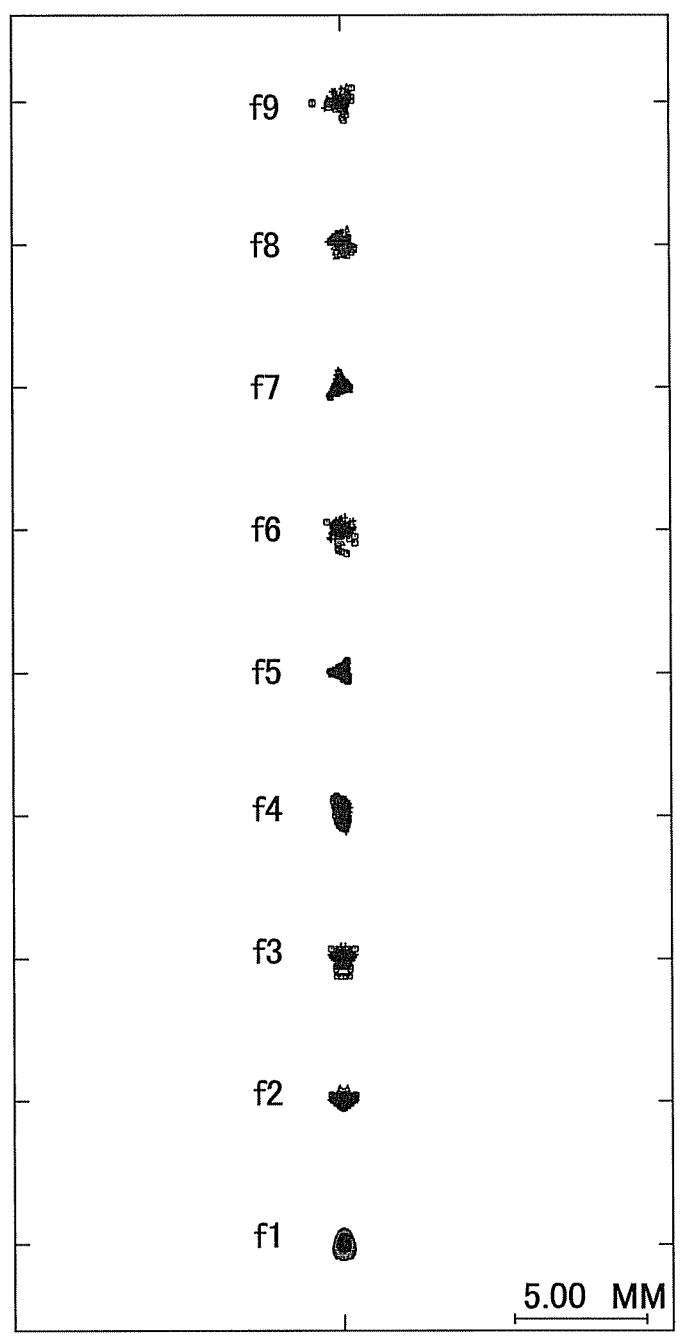
FIG. 41 is a diagram illustrating a spot on a surface to be projected on for a projection optical system in practical example 9 according to an embodiment of the present invention.

FIG. 41 is a diagram illustrating a spot on a surface to be projected on for a projection optical system in practical example 9 according to an embodiment of the present invention. FIG. 41 illustrates a spot diagram corresponding to lattice points f1-f9 on an image forming part included in an image projecting apparatus in practical example 9. As illustrated in FIG. 41, a spot on a screen in practical example 9 is focused well.

Figure 42:
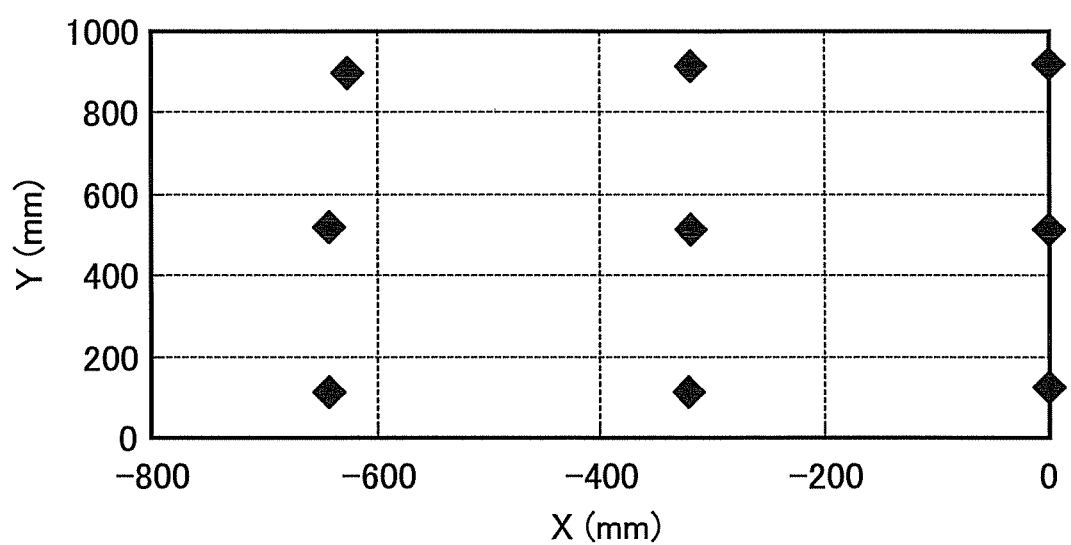
FIG. 42 is a diagram illustrating a TV distortion characteristic for a projection optical system in practical example 9 according to an embodiment of the present invention.

FIG. 42 is a diagram illustrating a TV distortion characteristic for a projection optical system in practical example 9 according to an embodiment of the present invention. A TV distortion for a projection optical system in practical example 9 is less than or equal to 3%. A distortion for a projection optical system in practical example 9 is corrected well.

Practical Example 10

Table 37 illustrates the data of a projection optical system in practical example 10. In practical example 10, a projection distance of a projection optical system and a size of an image projected on a screen are 795 mm and 60 inches, respectively, and hence, a throw ratio for a projection optical system in practical example 10 is 0.62.

TABLE 37

| SURFACE NUMBER | SURFACE SHAPE | RADIUS OF CURVATURE | SURFACE DISTANCE | REFRACTIVE INDEX | DISPERSION | SHIFT | TILT |
| --- | --- | --- | --- | --- | --- | --- | --- |
|  | SPHERE | ∞ | 1.11 |  |  |  |  |
| CG | SPHERE | ∞ | 1.05 | 1.51 | 63.35 |  |  |
| P | SPHERE | ∞ | 40.69 |  |  |  |  |
| t | ASPHERIC SURFACE | 19.33 | 4.50 | 1.51 | 63.90 |  | -1.49 |
|  | ASPHERIC SURFACE | -39.44 | 0.10 |  |  |  |  |
|  | SPHERE | ∞ | 0.10 |  |  |  |  |
| L2 | SPHERE | 132.88 | 1.00 | 1.84 | 42.98 |  |  |
| L3 | SPHERE | 12.74 | 5.81 | 1.49 | 70.44 |  |  |
|  | SPHERE | -21.45 | 0.24 |  |  |  |  |
| L4 | SPHERE | -78.03 | 1.28 | 1.77 | 47.91 |  |  |
|  | SPHERE | 36.93 | 1.21 |  |  |  |  |
| L5 | SPHERE | 19.07 | 5.44 | 1.58 | 41.19 |  |  |
| L6 | SPHERE | -15.21 | 1.00 | 1.84 | 33.99 |  |  |
|  | SPHERE | -42.22 | 0.40 |  |  |  |  |
| L7 | SPHERE | -28.24 | 1.00 | 1.59 | 39.71 |  |  |
|  | SPHERE | -100.59 | 0.10 |  |  |  |  |

TABLE 37-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| L8 | SPHERE | 22.58 | 3.57 | 1.72 | 28.32 | | |
|  | SPHERE | −34.92 | 1.46 | | | | |
| L9 | SPHERE | −27.67 | 1.92 | 1.84 | 30.11 | | |
|  | SPHERE | 19.86 | 5.58 | | | | |
| L10 | ASPHERIC SURFACE | −11.66 | 5.67 | 1.53 | 55.80 | | |
|  | ASPHERIC SURFACE | −14.14 | 2.90 | | | | |
| L11 | ASPHERIC SURFACE | −23.15 | 2.60 | 1.53 | 55.80 | | |
|  | ASPHERIC SURFACE | −18.08 | 133.84 | | | | |
|  | SPHERE | ∞ | 90.00 | | | | |
| M1 | xy-POLYNOMIAL SURFACE | −97.48 | −768.84 | REFLECTION | | −71.17 | −35.45 |
|  | SPHERE | ∞ | 0.00 | | | | |

Table 38 illustrates coefficients of an aspheric surface for a projection optical system in practical example 10.

TABLE 38

| | SURFACE NUMBER | | | | | |
|---|---|---|---|---|---|---|
| | 3 | 4 | 20 | 21 | 22 | 23 |
| 4th ORDER COEFFICIENT (A) | 2.16E−05 | 4.65E−05 | 6.97E−05 | 1.25E−05 | −9.26E−05 | −5.16E−05 |
| 6th ORDER COEFFICIENT (B) | 3.56E−08 | −2.25E−08 | 3.19E−06 | 7.98E−07 | −4.84E−07 | −6.53E−07 |
| 8th ORDER COEFFICIENT (C) | 4.45E−10 | −5.12E−11 | −1.17E−07 | −1.48E−08 | 6.53E−09 | 1.16E−08 |
| 10th ORDER COEFFICIENT (D) | −1.87E−12 | 2.77E−11 | 2.42E−09 | 1.89E−10 | 5.28E−13 | −1.33E−10 |
| 12th ORDER COEFFICIENT (E) | 3.94E−14 | −6.16E−13 | −2.81E−11 | −1.08E−12 | −4.99E−14 | 1.11E−12 |
| 14th ORDER COEFFICIENT (F) | −9.43E−16 | 5.30E−15 | 1.50E−13 | −7.26E−16 | −7.47E−16 | −4.67E−15 |
| 16th ORDER COEFFICIENT (G) | 7.26E−18 | −1.51E−17 | −2.68E−16 | 1.24E−17 | −1.32E−18 | 5.83E−18 |

Table 39 illustrates coefficients of a polynomial free-form surface for a projection optical system in practical example 10.

TABLE 39

| COEFFICIENT | VALUE |
|---|---|
| X2 | 9.83E−04 |
| Y2 | 2.89E−03 |
| X2Y | −2.14E−05 |
| Y3 | −1.36E−05 |
| X4 | 1.13E−07 |
| X2Y2 | 2.58E−07 |
| Y4 | 4.78E−07 |
| X4Y | −1.78E−09 |
| X2Y3 | 1.53E−09 |
| Y5 | −1.15E−08 |
| X6 | 1.02E−10 |
| X4Y2 | −3.05E−11 |
| X2Y4 | −8.05E−10 |
| Y6 | −5.17E−10 |

TABLE 39-continued

| COEFFICIENT | VALUE |
|---|---|
| X6Y | 1.93E−12 |
| X4Y3 | 3.85E−12 |
| X2Y5 | 3.18E−11 |
| Y7 | 4.33E−11 |
| X8 | −9.10E−14 |
| X6Y2 | −5.34E−14 |
| X4Y4 | 2.01E−13 |
| X2Y6 | −2.51E−13 |
| Y8 | −1.27E−12 |
| X8Y | −7.07E−16 |
| X6Y3 | −1.99E−15 |
| X4Y5 | −1.64E−14 |
| X2Y7 | −9.17E−15 |
| Y9 | 1.90E−14 |
| X10 | 3.58E−17 |
| X8Y2 | 3.46E−17 |
| X6Y4 | 1.30E−16 |
| X4Y6 | 3.79E−16 |
| X2Y8 | 2.27E−16 |

TABLE 39-continued

| COEFFICIENT | VALUE |
|---|---|
| Y10 | −1.44E−16 |
| X10Y | 7.08E−20 |
| X8Y3 | −6.30E−19 |
| X6Y5 | −2.30E−18 |
| X4Y7 | −3.55E−18 |
| X2Y9 | −1.90E−18 |
| Y11 | 4.10E−19 |
| X12 | −5.09E−21 |
| X10Y2 | −2.38E−21 |
| X8Y4 | 6.09E−21 |
| X6Y6 | 1.26E−20 |
| X4Y8 | 1.17E−20 |
| X2Y10 | 5.65E−21 |
| Y12 | 2.93E−22 |

A value of Im×Tr for a projection optical system in practical example 10 will be obtained.

Table 40 illustrates xfo and yfo for a projection optical system in practical example 10.

TABLE 40

| POSITION OF LIGHT RAY | xfo | yfo |
|---|---|---|
| f1 | 200.7 | 201.3 |
| f2 | 190.0 | 181.8 |
| f3 | 166.8 | 134.4 |
| f4 | 195.0 | 197.3 |
| f5 | 185.7 | 174.4 |
| f6 | 163.2 | 126.2 |
| f7 | 171.6 | 184.2 |
| f8 | 149.1 | 173.4 |
| f9 | 152.8 | 101.2 |

In practical example 10, a projection distance for a projection optical system and a size of an image projected on a screen are 795 mm and 60 inches, respectively, and hence, a throw ratio Tr for a projection optical system in practical example 10 is 0.62. Furthermore, from Table 40, a length of an intermediate image in a direction of an optical axis of a first optical system for a projection optical system in practical example 10 is |yfo of f1−yfo of f9|=201.3 mm−101.2 mm=100.1 mm. A focal length of a first optical system included in a projection optical system in practical example 10 is 39.30 mm. A normalized length Im of an intermediate image in a direction of an optical axis of a first optical system for a projection optical system in practical example 10 is 100.1 mm/39.30 mm=2.55. A value of Im×Tr for a projection optical system in practical example 10 is 2.55× 0.62=1.58.

Figure 43:
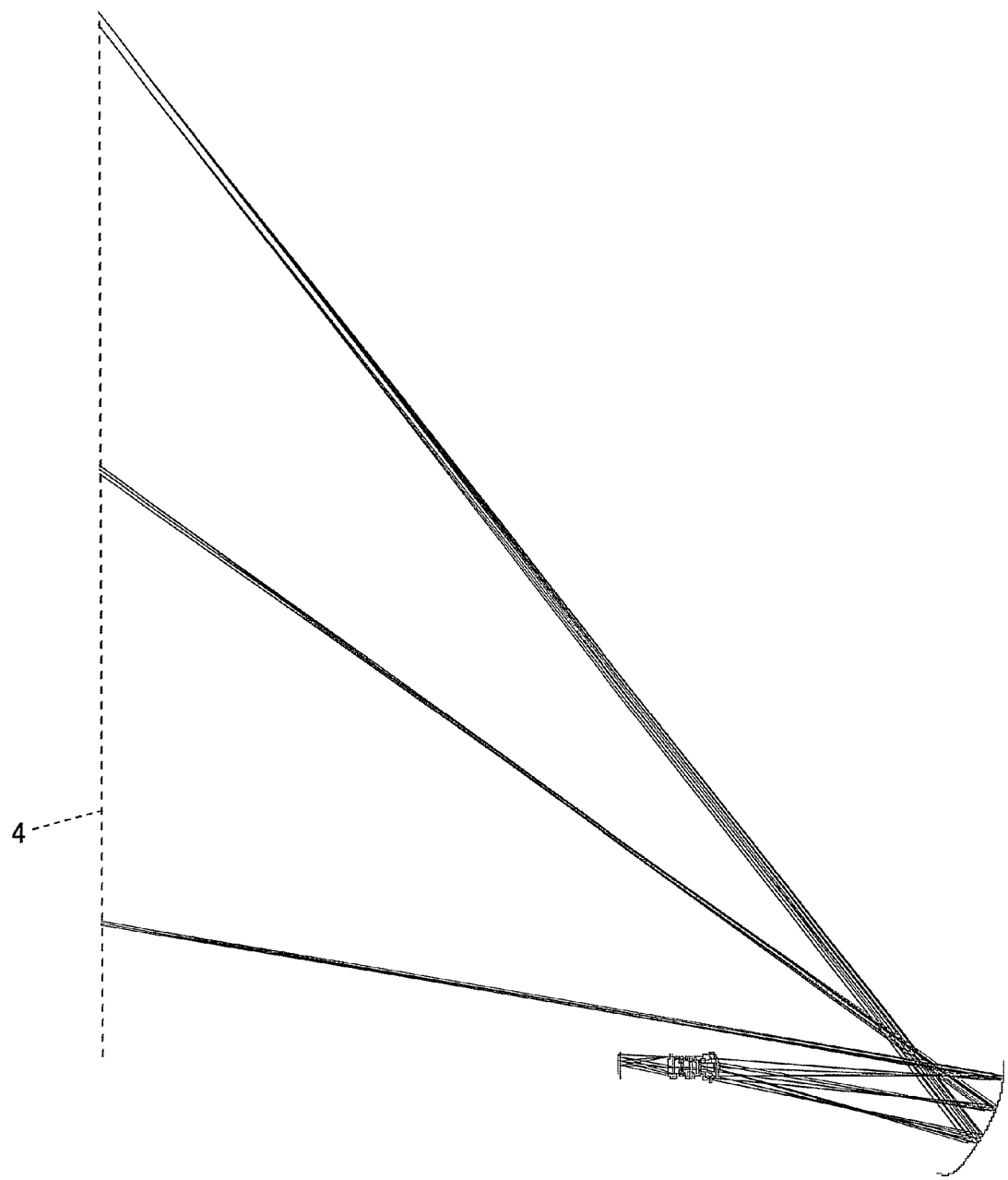
FIG. 43 is a diagram illustrating a projection optical system and an image projecting apparatus in practical example 10 according to an embodiment of the present invention.
Figure 44:
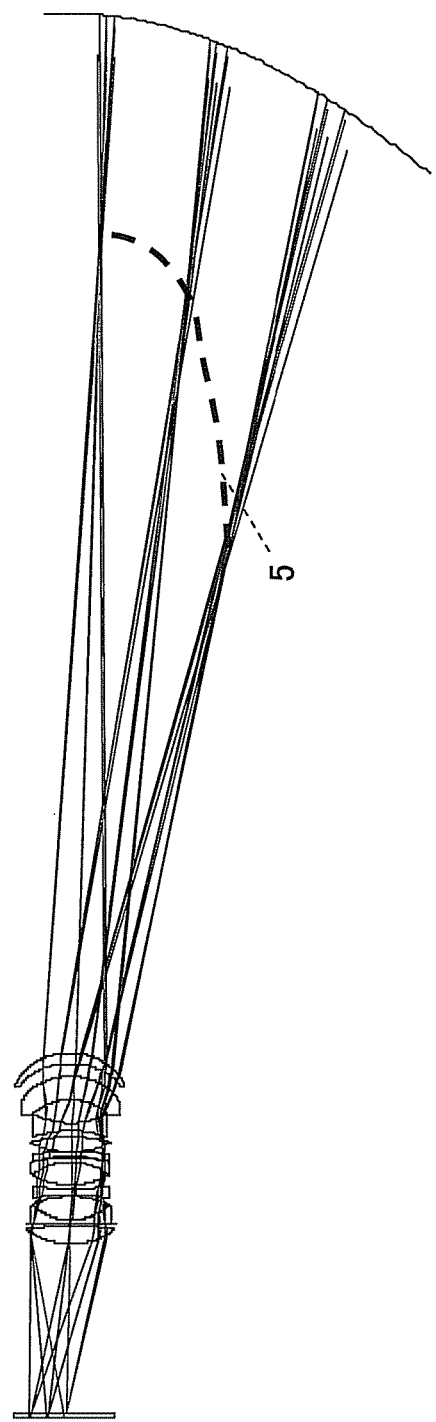
FIG. 44 is a diagram illustrating a first optical system and a second optical system for a projection optical system in practical example 10 according to an embodiment of the present invention.

FIG. 43 is a diagram illustrating a projection optical system and an image projecting apparatus in practical example 10 according to an embodiment of the present invention. FIG. 43 illustrates an optical path for a projection optical system in practical example 10. FIG. 44 is a diagram illustrating a first optical system and a second optical system for a projection optical system in practical example 10 according to an embodiment of the present invention. FIG. 44 is an enlarged view of a first optical system and a second optical system.

Figure 45:
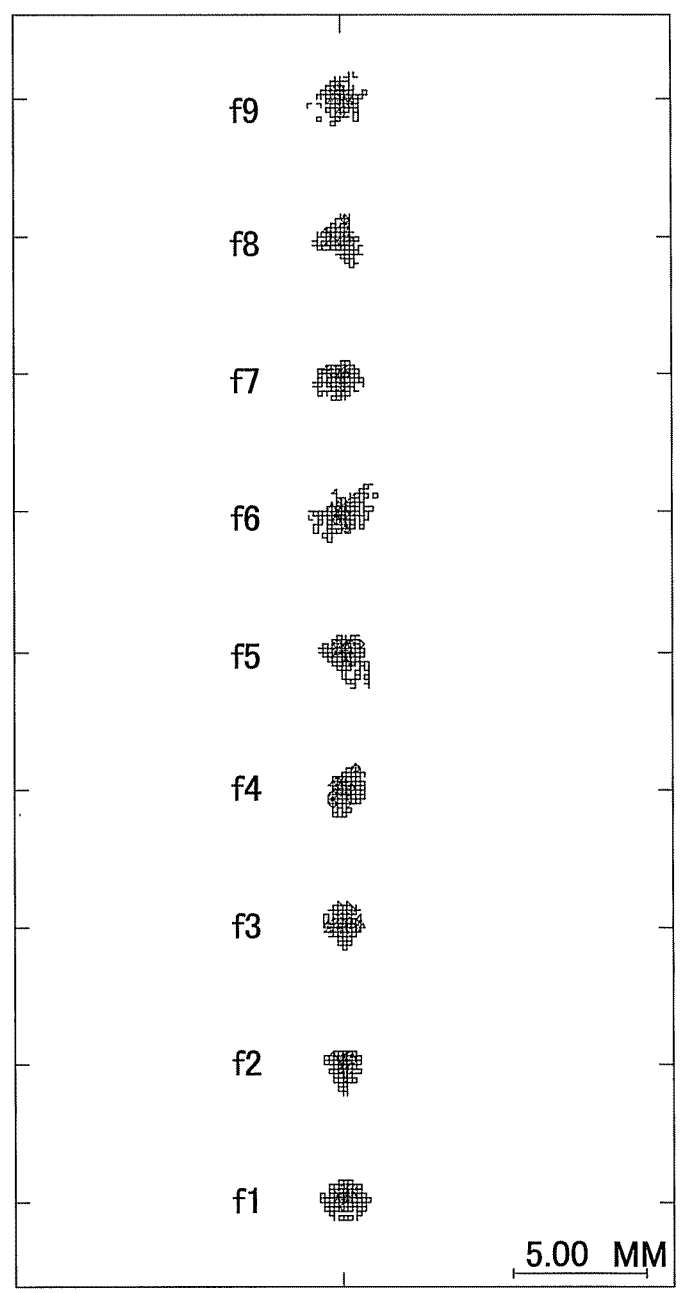
FIG. 45 is a diagram illustrating a spot on a surface to be projected on for a projection optical system in practical example 10 according to an embodiment of the present invention.

FIG. 45 is a diagram illustrating a spot on a surface to be projected on for a projection optical system in practical example 10 according to an embodiment of the present invention. FIG. 45 illustrates a spot diagram corresponding to lattice points f1-f9 on an image forming part included in an image projecting apparatus in practical example 10. As illustrated in FIG. 45, a spot on a screen in practical example 10 is focused well.

Figure 46:
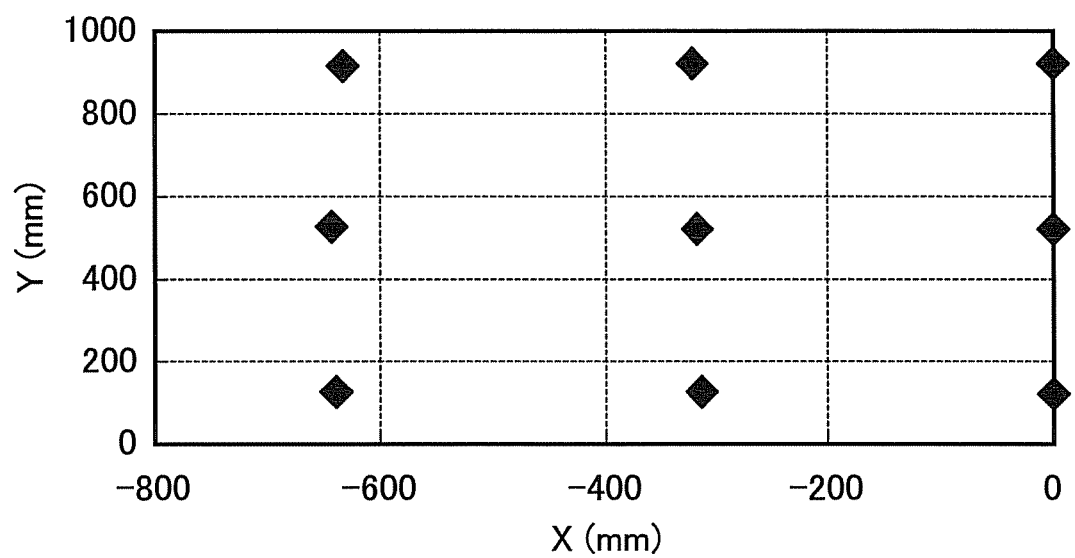
FIG. 46 is a diagram illustrating a TV distortion characteristic for a projection optical system in practical example 10 according to an embodiment of the present invention.

FIG. 46 is a diagram illustrating a TV distortion characteristic for a projection optical system in practical example 10 according to an embodiment of the present invention. A TV distortion for a projection optical system in practical example 10 is less than or equal to 3%. A distortion for a projection optical system in practical example 10 is corrected well.

Practical Example 11

Table 41 illustrates the data of a projection optical system in practical example 11. In practical example 11, a projection distance of a projection optical system and a size of an image projected on a screen are 775 mm and 60 inches, respectively, and hence, a throw ratio for a projection optical system in practical example 11 is 0.60.

TABLE 41

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
|  | SPHERE | ∞ | 1.11 |  |  |  |  |
| CG | SPHERE | ∞ | 1.05 | 1.51 | 63.35 |  |  |
| P | SPHERE | ∞ | 40.22 |  |  |  |  |
| t | ASPHERIC SURFACE | 17.87 | 11.02 | 1.51 | 63.90 |  | −1.92 |
|  | ASPHERIC SURFACE | −82.56 | 2.10 |  |  |  |  |
|  | SPHERE | ∞ | 0.10 |  |  |  |  |
| L2 | SPHERE | 90.91 | 0.90 | 1.84 | 34.26 |  |  |
| L3 | SPHERE | 14.18 | 4.84 | 1.50 | 69.06 |  |  |
|  | SPHERE | −24.35 | 0.10 |  |  |  |  |
| L4 | SPHERE | 200.44 | 1.00 | 1.83 | 43.13 |  |  |
|  | SPHERE | 30.99 | 0.10 |  |  |  |  |
| L5 | SPHERE | 18.65 | 5.29 | 1.58 | 41.08 |  |  |
| L6 | SPHERE | −14.10 | 0.80 | 1.84 | 41.33 |  |  |
|  | SPHERE | −41.13 | 2.14 |  |  |  |  |
| L7 | SPHERE | −42.90 | 0.90 | 1.80 | 45.66 |  |  |
|  | SPHERE | 42.02 | 0.10 |  |  |  |  |
| L8 | SPHERE | 23.47 | 7.47 | 1.68 | 30.43 |  |  |
|  | SPHERE | −16.32 | 0.10 |  |  |  |  |
| L9 | SPHERE | −16.07 | 1.74 | 1.84 | 32.42 |  |  |
|  | SPHERE | 33.05 | 2.63 |  |  |  |  |

TABLE 41-continued

| SURFACE NUMBER | SURFACE SHAPE | RADIUS OF CURVATURE | SURFACE DISTANCE | REFRACTIVE INDEX | DISPERSION | SHIFT | TILT |
|---|---|---|---|---|---|---|---|
| L10 | ASPHERIC SURFACE | −33.09 | 7.39 | 1.53 | 55.80 | | |
| | ASPHERIC SURFACE | −25.63 | 1.00 | | | | |
| L11 | ASPHERIC SURFACE | 100.26 | 3.89 | 1.53 | 55.80 | | |
| | ASPHERIC SURFACE | −61.42 | 0.10 | | | | |
| | SPHERE | ∞ | 90.00 | | | | |
| M1 | xy-POLYNOMIAL SURFACE | −59.65 | −774.60 | REFLECTION | | −7.39 | −11.41 |
| | SPHERE | ∞ | 0.00 | | | | |

Table 42 illustrates coefficients of an aspheric surface for a projection optical system in practical example 11.

TABLE 42

| | SURFACE NUMBER | | | | | |
|---|---|---|---|---|---|---|
| | 3 | 4 | 20 | 21 | 22 | 23 |
| 4th ORDER COEFFICIENT (A) | 1.10E−05 | 4.83E−05 | 4.80E−05 | −6.60E−07 | −1.10E−04 | −8.75E−05 |
| 6th ORDER COEFFICIENT (B) | −8.76E−10 | −1.13E−08 | 2.48E−06 | 5.23E−07 | −4.85E−07 | −5.94E−07 |
| 8th ORDER COEFFICIENT (C) | 2.62E−11 | 2.04E−11 | −1.13E−07 | −1.43E−08 | 6.05E−09 | 1.12E−08 |
| 10th ORDER COEFFICIENT (D) | −1.29E−12 | 3.02E−11 | 2.37E−09 | 2.01E−10 | −3.82E−12 | −1.37E−10 |
| 12th ORDER COEFFICIENT (E) | 7.76E−14 | −5.84E−13 | −2.77E−11 | −1.06E−12 | −3.57E−14 | 1.10E−12 |
| 14th ORDER COEFFICIENT (F) | −7.70E−16 | 5.50E−15 | 1.65E−13 | −9.57E−16 | −5.45E−16 | −4.64E−15 |
| 16th ORDER COEFFICIENT (G) | 2.55E−18 | −2.01E−17 | −4.14E−16 | 1.22E−17 | −9.05E−19 | 6.95E−18 |

Table 43 illustrates coefficients of a polynomial free-form surface for a projection optical system in practical example 11.

TABLE 43

| COEFFICIENT | VALUE |
|---|---|
| X2 | −5.03E−03 |
| Y2 | −3.81E−03 |
| X2Y | −1.43E−04 |
| Y3 | −1.13E−04 |
| X4 | 2.73E−06 |
| X2Y2 | 1.69E−06 |
| Y4 | −1.54E−07 |
| X4Y | 1.24E−07 |
| X2Y3 | 1.40E−07 |
| Y5 | −7.14E−08 |
| X6 | −2.36E−09 |
| X4Y2 | 5.55E−10 |
| X2Y4 | −7.70E−10 |
| Y6 | −7.54E−09 |
| X6Y | −1.09E−10 |
| X4Y3 | −7.54E−11 |
| X2Y5 | −3.46E−10 |
| Y7 | −5.73E−11 |

TABLE 43-continued

| COEFFICIENT | VALUE |
|---|---|
| X8 | 4.14E−12 |
| X6Y2 | −7.69E−13 |
| X4Y4 | −4.38E−12 |
| X2Y6 | 8.66E−12 |
| Y8 | −6.13E−12 |
| X8Y | 7.99E−14 |
| X6Y3 | 1.01E−13 |
| X4Y5 | −2.04E−13 |
| X2Y7 | 1.30E−12 |
| Y9 | −8.22E−13 |
| X10 | −7.52E−15 |
| X8Y2 | 1.32E−16 |
| X6Y4 | 1.29E−14 |
| X4Y6 | 2.80E−16 |
| X2Y8 | −4.90E−14 |
| Y10 | 5.51E−14 |
| X10Y | −3.90E−17 |
| X8Y3 | 2.20E−16 |
| X6Y5 | 5.14E−17 |
| X4Y7 | 3.94E−16 |
| X2Y9 | −5.71E−15 |
| Y11 | 5.46E−15 |
| X12 | 5.92E−18 |

TABLE 43-continued

| COEFFICIENT | VALUE |
|---|---|
| X10Y2 | 6.89E−18 |
| X8Y4 | −6.28E−18 |
| X6Y6 | −1.12E−18 |
| X4Y8 | 7.19E−18 |
| X2Y10 | −1.11E−16 |
| Y12 | 1.05E−16 |

A value of Im×Tr for a projection optical system in practical example 11 will be obtained.

Table 44 illustrates xfo and yfo for a projection optical system in practical example 11.

TABLE 44

| POSITION OF LIGHT RAY | xfo | yfo |
|---|---|---|
| f1 | 71.2 | 70.7 |
| f2 | 65.6 | 60.7 |
| f3 | 56.5 | 48.4 |
| f4 | 66.9 | 69.2 |
| f5 | 63.9 | 58.0 |
| f6 | 55.3 | 47.0 |
| f7 | 57.9 | 63.8 |
| f8 | 51.6 | 59.2 |
| f9 | 52.0 | 42.3 |

In practical example 11, a projection distance for a projection optical system and a size of an image projected on a screen are 775 mm and 60 inches, respectively, and hence, a throw ratio Tr for a projection optical system in practical example 11 is 0.60. Furthermore, from Table 44, a length of an intermediate image in a direction of an optical axis of a first optical system for a projection optical system in practical example 11 is |xfo of f1−yfo of f9|=71.2 mm−42.3 mm=28.9 mm. A focal length of a first optical system included in a projection optical system in practical example 11 is 35.59 mm. A normalized length Im of an intermediate image in a direction of an optical axis of a first optical system for a projection optical system in practical example 11 is 28.9 mm/35.59 mm=0.81. A value of Im×Tr for a projection optical system in practical example 11 is 0.81× 0.60=0.49.

Figure 47:
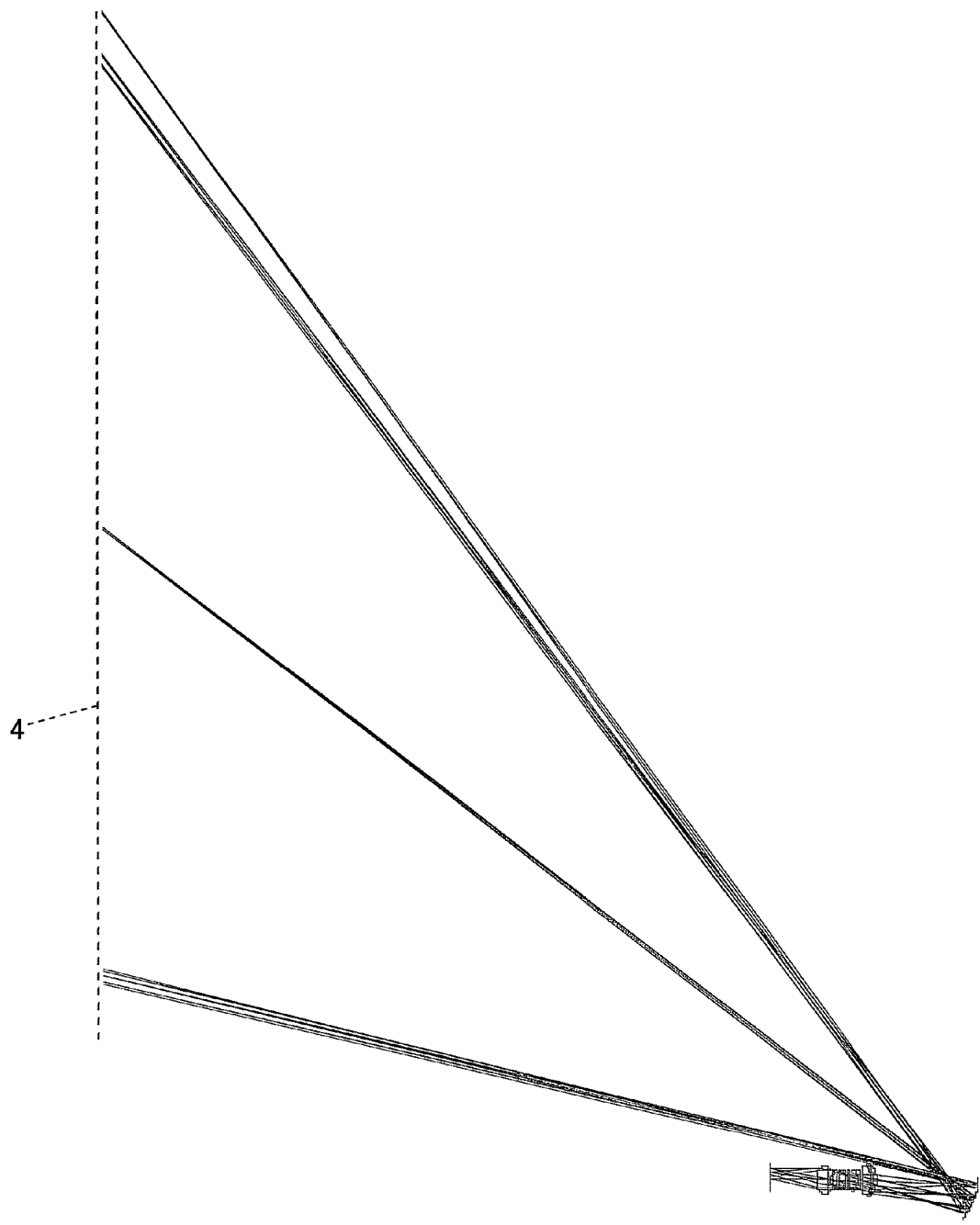
FIG. 47 is a diagram illustrating a projection optical system and an image projecting apparatus in practical example 11 according to an embodiment of the present invention.
Figure 48:
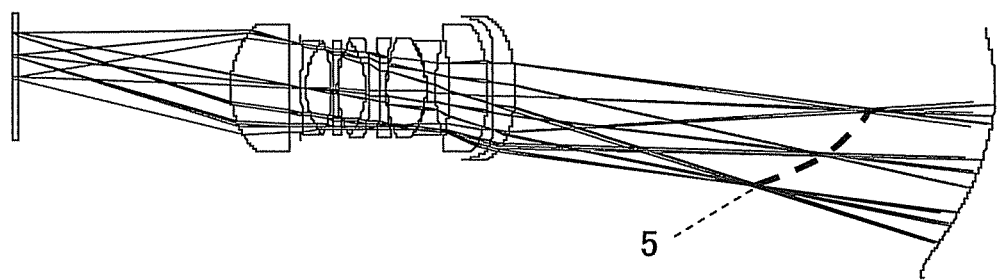
FIG. 48 is a diagram illustrating a first optical system and a second optical system for a projection optical system in practical example 11 according to an embodiment of the present invention.

FIG. 47 is a diagram illustrating a projection optical system and an image projecting apparatus in practical example 11 according to an embodiment of the present invention. FIG. 47 illustrates an optical path for a projection optical system in practical example 11. FIG. 48 is a diagram illustrating a first optical system and a second optical system for a projection optical system in practical example 11 according to an embodiment of the present invention. FIG. 48 is an enlarged view of a first optical system and a second optical system.

Figure 49:
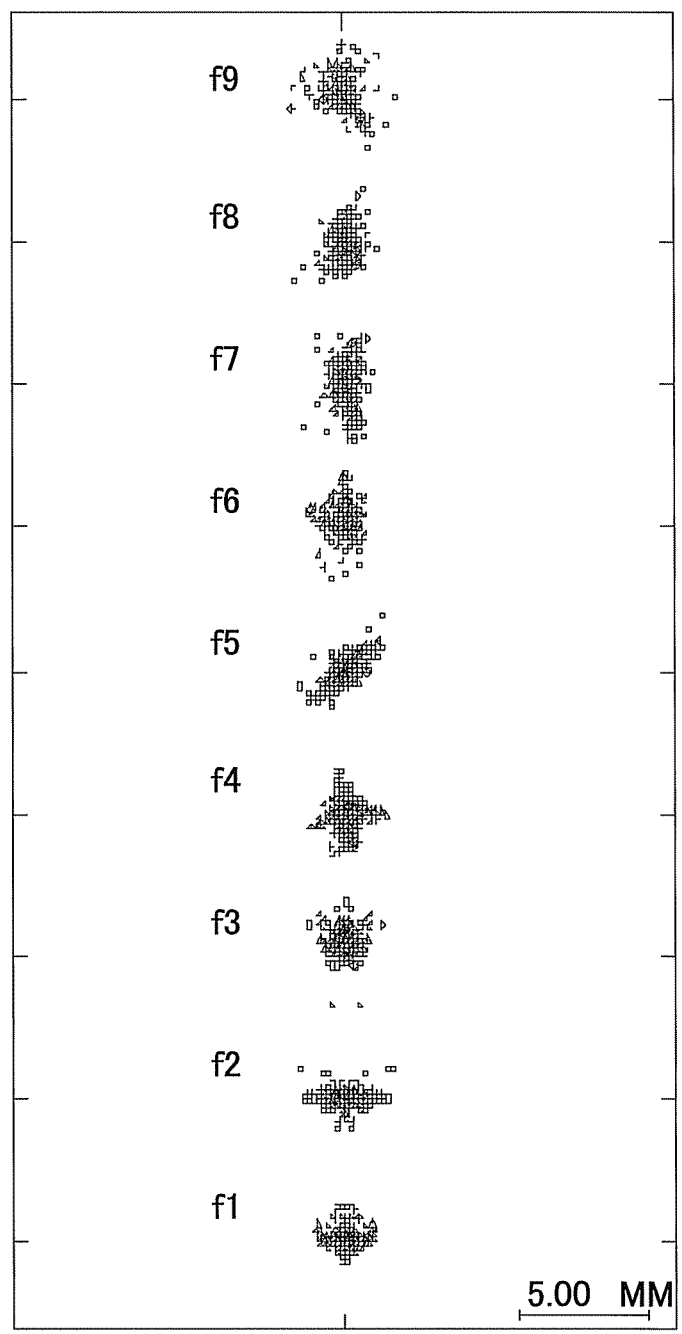
FIG. 49 is a diagram illustrating a spot on a surface to be projected on for a projection optical system in practical example 11 according to an embodiment of the present invention.

FIG. 49 is a diagram illustrating a spot on a surface to be projected on for a projection optical system in practical example 11 according to an embodiment of the present invention. FIG. 49 illustrates a spot diagram corresponding to lattice points f1-f9 on an image forming part included in an image projecting apparatus in practical example 11. As illustrated in FIG. 49, a spot on a screen in practical example 11 is generally well focused. A value of a white Modulation Transfer Function (MTF) with respect to a frequency in a WXGA resolution is greater than or equal to 35% over an entire area of an image projected on a screen.

Additionally, a spot on a screen in any of practical examples 1-10 is focused better than a spot on a screen in practical example 11. Furthermore, a value of a white MTF with respect to a frequency in a WXGA resolution in any of practical examples 1-10 is higher than a value of a white MTF with respect to a frequency in a WXGA resolution in practical example 11.

Figure 50:
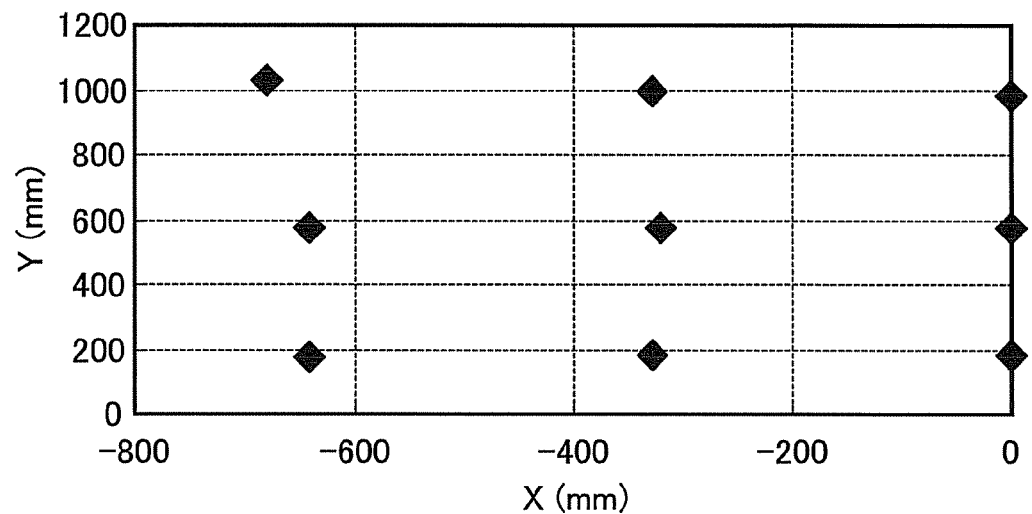
FIG. 50 is a diagram illustrating a TV distortion characteristic for a projection optical system in practical example 11 according to an embodiment of the present invention.

FIG. 50 is a diagram illustrating a TV distortion characteristic for a projection optical system in practical example 11 according to an embodiment of the present invention. A TV distortion for a projection optical system in practical example 11 is less than or equal to approximately 5%. A distortion for a projection optical system in practical example 11 is generally well corrected.

Additionally, a distortion for a projection optical system in any of practical examples 1-10 is smaller than a distortion for a projection optical system in practical example 11.

Comparative Example 1

A value of Im×Tr for a projection optical system in practical example 1 described in Japanese Patent Application Publication No. 2007-079524 as a comparative example 1 will be obtained.

Table 45 illustrates xfo and yfo for a projection optical system in comparative example 1.

TABLE 45

| POSITION OF LIGHT RAY | xfo | yfo |
|---|---|---|
| f1 | 230.6 | 189.1 |
| f2 | 187.0 | 104.0 |
| f3 | 141.2 | 38.4 |
| f4 | 222.0 | 169.5 |
| f5 | 180.5 | 92.8 |
| f6 | 137.2 | 32.8 |
| f7 | 122.3 | 196.6 |
| f8 | 163.3 | 64.6 |
| f9 | 126.9 | 18.4 |

In comparative example 1, a projection distance for a projection optical system and a size of an image projected on a screen are 416 mm and 52.7 inches, respectively, and hence, a throw ratio Tr for a projection optical system in comparative example 1 is 0.36. Furthermore, from Table 45, a length of an intermediate image in a direction of an optical axis of a first optical system for a projection optical system in comparative example 1 is |xfo of f1−yfo of f9|=230.6 mm−18.4 mm=212.2 mm. A focal length of a first optical system included in a projection optical system in comparative example 1 is 35.87 mm. A normalized length Im of an intermediate image in a direction of an optical axis of a first optical system for a projection optical system in comparative example 1 is 212.2 mm/35.87 mm=5.92. A value of Im×Tr for a projection optical system in comparative example 1 is 5.92×0.36=2.13.

Comparative Example 2

A value of Im×Tr for a projection optical system in practical example 1 described in Japanese Patent Application Publication No. 2008-116688 as a comparative example 2 will be obtained.

Table 46 illustrates xfo and yfo for a projection optical system in comparative example 2.

TABLE 46

| POSITION OF LIGHT RAY | xfo | yfo |
| --- | --- | --- |
| f1 | 227.9 | 203.2 |
| f2 | 185.4 | 119.2 |
| f3 | 138.5 | 44.2 |
| f4 | 217.5 | 180.3 |
| f5 | 177.5 | 104.8 |
| f6 | 133.9 | 36.6 |
| f7 | 125.3 | 188.3 |
| f8 | 157.3 | 69.2 |
| f9 | 122.0 | 16.2 |

In comparative example 2, a projection distance for a projection optical system and a size of an image projected on a screen are 501 mm and 63.4 inches, respectively, and hence, a throw ratio Tr for a projection optical system in comparative example 2 is 0.36. Furthermore, from Table 46, a length of an intermediate image in a direction of an optical axis of a first optical system for a projection optical system in comparative example 2 is |xfo of f1−yfo of f9|=227.9 mm−16.2 mm=211.7 mm. A focal length of a first optical system included in a projection optical system in comparative example 2 is 32.91 mm. A normalized length Im of an intermediate image in a direction of an optical axis of a first optical system for a projection optical system in comparative example 2 is 211.7 mm/32.91 mm=6.43. A value of Im×Tr for a projection optical system in comparative example 2 is 6.43×0.36=2.32.

Comparative Example 3

A value of Im×Tr for a projection optical system in practical example 1 described in Japanese Patent Application Publication No. 2008-165187 as a comparative example 3 will be obtained.

Table 47 illustrates xfo and yfo for a projection optical system in comparative example 3.

TABLE 47

| POSITION OF LIGHT RAY | xfo | yfo |
| --- | --- | --- |
| f1 | 108.3 | 105.0 |
| f2 | 78.7 | 49.2 |
| f3 | 35.9 | −7.3 |
| f4 | 88.5 | 100.0 |
| f5 | 72.4 | 38.5 |
| f6 | 32.4 | −10.6 |
| f7 | 47.4 | 77.6 |
| f8 | 14.5 | 54.5 |
| f9 | 23.4 | −17.9 |

In comparative example 3, a projection distance for a projection optical system and a size of an image projected on a screen are 440 mm and 60 inches, respectively, and hence, a throw ratio Tr for a projection optical system in comparative example 3 is 0.36. Furthermore, from Table 47, a length of an intermediate image in a direction of an optical axis of a first optical system for a projection optical system in comparative example 3 is |xfo of f1−yfo of f9|=108.3 mm−(−17.9 mm)=126.2 mm. A focal length of a first optical system included in a projection optical system in comparative example 3 is 26.4 mm. A normalized length Im of an intermediate image in a direction of an optical axis of a first optical system for a projection optical system in comparative example 3 is 126.2 mm/26.4 mm=4.78. A value of Im×Tr for a projection optical system in comparative example 3 is 4.78×0.36=1.72.

(Result)

Table 48 illustrates throw ratios Tr, total lengths, and values of Im×Tr for projection optical systems in practical examples 1-11 and projection optical systems in comparative examples 1-3.

TABLE 48

| | Tr | TOTAL LENGTH | Im × Tr |
| --- | --- | --- | --- |
| PRACTICAL EXAMPLE 1 | 0.18 | 256 | 0.90 |
| PRACTICAL EXAMPLE 2 | 0.23 | 236 | 0.92 |
| PRACTICAL EXAMPLE 3 | 0.30 | 200 | 0.75 |
| PRACTICAL EXAMPLE 4 | 0.40 | 207 | 0.77 |
| PRACTICAL EXAMPLE 5 | 0.52 | 192 | 0.69 |
| PRACTICAL EXAMPLE 6 | 0.60 | 190 | 0.65 |
| PRACTICAL EXAMPLE 7 | 0.62 | 237 | 1.47 |
| PRACTICAL EXAMPLE 8 | 0.15 | 224 | 0.83 |
| PRACTICAL EXAMPLE 9 | 0.18 | 201 | 0.82 |
| PRACTICAL EXAMPLE 10 | 0.62 | 339 | 1.58 |
| PRACTICAL EXAMPLE 11 | 0.60 | 186 | 0.49 |
| COMPARATIVE EXAMPLE 1 | 0.36 | 575 | 2.13 |
| COMPARATIVE EXAMPLE 2 | 0.36 | 526 | 2.32 |
| COMPARATIVE EXAMPLE 3 | 0.36 | 385 | 1.72 |

As illustrated in Table 48, any of projection optical systems in practical examples 1-11 and projection optical systems in comparative examples 1-3 satisfies a throw ratio Tr≤0.7. Hence, any of projection optical systems in practical examples 1-11 and projection optical systems in comparative examples 1-3 provides a more compact projection optical system capable of projecting an image onto a surface to be projected on at a shorter distance.

However, as illustrated in Table 48, values of Im×Tr for projection optical systems in practical examples 1-11 are smaller than values of Im×Tr for projection optical systems in comparative examples 1-3. Herein, Im means a normalized length of an intermediate image in a direction of an optical axis of a first optical system.

For example, when a projection optical system in practical example 4 has a value of Tr which is generally comparable to a value of Tr for a projection optical system in any of comparative examples 1-3 therewith, a value of Im×Tr (0.77) for a projection optical system in practical example 4 is smaller than any of values of Im×Tr (2.13, 2.32, and 1.72) for projection optical systems in comparative examples 1-3. A value of Im for a projection optical system in practical example 4 is generally smaller than any of values of Im for projection optical systems in comparative examples 1-3, because a value of Tr for a projection optical system in practical example 4 is generally comparable to any of values of Tr for projection optical systems in comparative examples 1-3. Furthermore, a value of total length (207) for a projection optical system in practical example 4 is smaller than any of values of total length (575, 525, and 385) for projection optical systems in comparative examples 1-3. It may be possible to reduce a distance from a last end of a first optical system included in a projection optical system in practical example 4 to a last end of a second optical system therein, compared to a distance from a last end of a first optical system included in a projection optical system in any of comparative examples 1-3 to a last end of a second optical system therein, because a value of Im for a projection optical system in practical example 4 is generally smaller than any of values of Im for projection optical systems in comparative examples 1-3. As a result, a value of total length for a projection optical system in practical example 4 is smaller than a value of total length for a projection optical system in any of comparative examples 1-3.

Furthermore, as illustrated in Table 48, when a value of throw ratio Tr for a projection optical system is reduced, for example, when a projection distance of a projection optical system is reduced, a normalized length Im of an intermediate image in a direction of an optical axis of a first optical system included in a projection optical system tends to increase. For example, when a projection distance of a projection optical system in any of comparative examples 1-3 is reduced, a normalized length Im of an intermediate image in a direction of an optical axis of a first optical system included in a projection optical system increases and a total length of a projection optical system increase. As a result, a size and weight of an image projecting apparatus including a projection optical system in any of comparative examples 1-3 increases, and hence, an image projecting apparatus including a projection optical system in any of comparative examples 1-3 provides a user with an image projecting apparatus with a relatively low usability in such a manner that an image projecting apparatus including a projection optical system in any of comparative examples 1-3 occupies more space and/or it is not easy to carry an image projecting apparatus including a projection optical system in any of comparative examples 1-3, etc.

Figure 51:
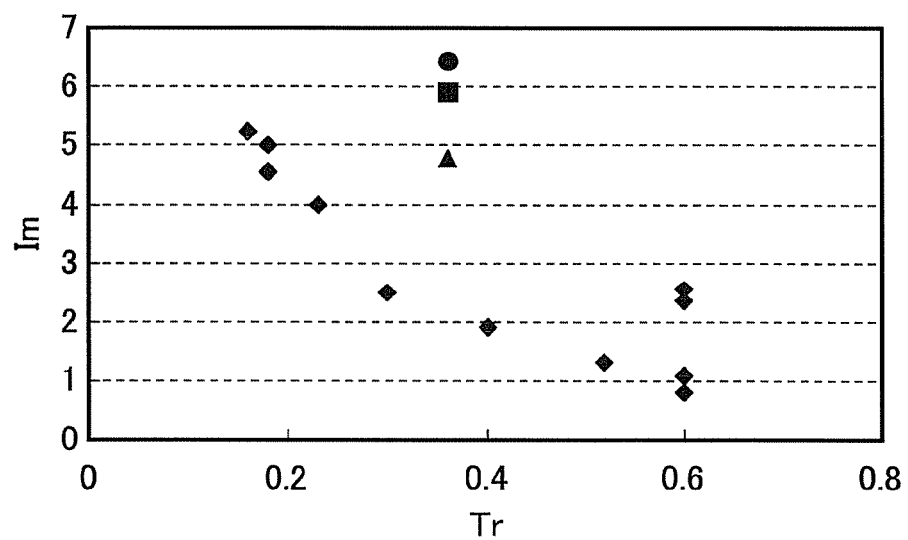
FIG. 51 is a diagram illustrating a relationship between a throw ratio and a normalized length of an intermediate image for an example of a projection optical system according to an embodiment of the present invention and an example of a projection optical system in a conventional technique.

FIG. 51 is a diagram illustrating a relationship between a throw ratio and a normalized length of an intermediate image for an example of a projection optical system according to an embodiment of the present invention and an example of a projection optical system in a conventional technique.

In FIG. 51, a symbol of diamond, a symbol of square, a symbol of circle, and a symbol of triangle denote a projection optical system in any of practical examples 1-11, a projection optical system in comparative example 1, a projection optical system in comparative example 2, and a projection optical system in comparative example 3, respectively. As illustrated in FIG. 51, when a throw ratio Tr for a projection optical system in any of practical examples 1-11 is reduced, a normalized length Im of an intermediate image in a direction of an optical axis of a first optical system included in a projection optical system in any of practical examples 1-11 tends to increase.

Figure 52:
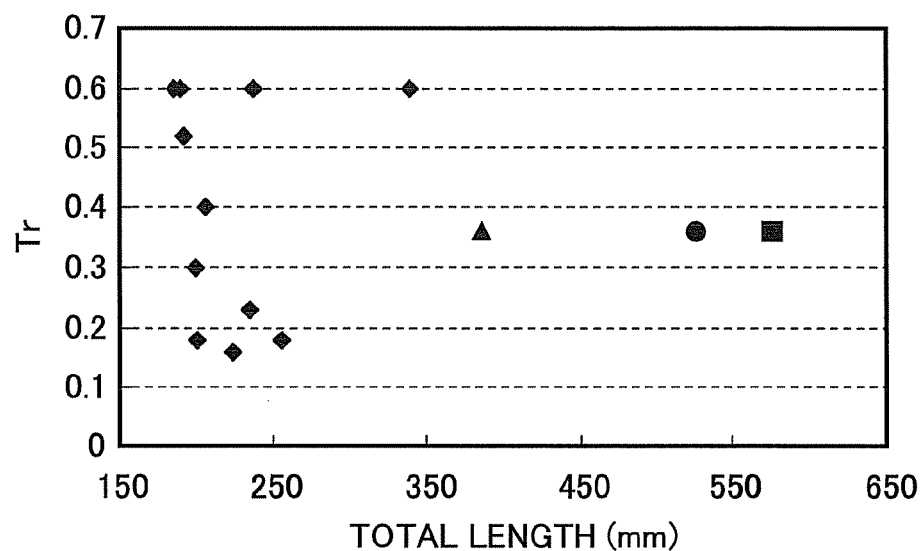
FIG. 52 is a diagram illustrating a relationship between a total length of an optical system and a throw ratio for an example of a projection optical system according to an embodiment of the present invention and an example of a projection optical system in a conventional technique.

FIG. 52 is a diagram illustrating a relationship between a total length of an optical system and a throw ratio for an example of a projection optical system according to an embodiment of the present invention and an example of a projection optical system in a conventional technique.

In FIG. 52, a symbol of diamond, a symbol of square, a symbol of circle, and a symbol of triangle denote a projection optical system in any of practical examples 1-11, a projection optical system in comparative example 1, a projection optical system in comparative example 2, and a projection optical system in comparative example 3, respectively. As illustrated in FIG. 4, a total length of a projection optical system is a distance from an object point on an object to a last end of a second optical system 3 in a direction of an optical axis of a first optical system 2 with respect to a principal light ray of a light beam nearest an optical axis of the first optical system included in a projection optical system. Although any of projection optical systems in practical examples 1-11 and projection optical systems in comparative examples 1-3 satisfies a throw ratio less than or equal to 0.7 as illustrated in FIG. 51 and FIG. 52, a normalized length of an intermediate image in a direction of an optical axis of a first optical system included in a projection optical system in any of practical examples 1-11 is smaller than a normalized length of an intermediate image in a direction of an optical axis of a first optical system included in a projection optical system in any of comparative examples 1-3, and hence, a total length (~about 200 mm) of a projection optical system in any of practical examples 1-11 is smaller than a total length of a projection optical system in any of comparative examples 1-3.

Figure 53:
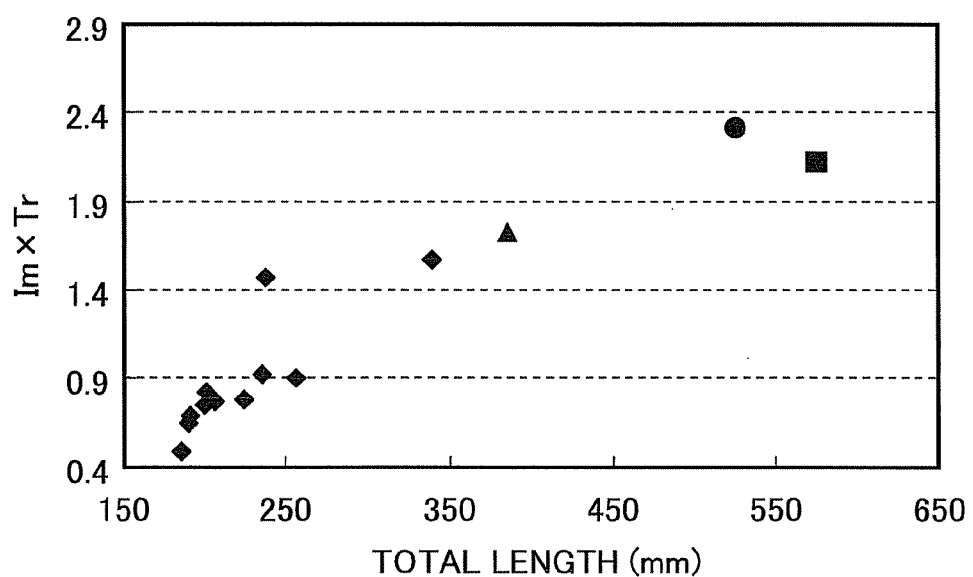
FIG. 53 is a diagram illustrating a relationship between a total length of an optical system and a value of Im×Tr for an example of a projection optical system according to an embodiment of the present invention and an example of a projection optical system in a conventional technique.

FIG. 53 is a diagram illustrating a relationship between a total length of an optical system and a value of Im×Tr for an example of a projection optical system according to an embodiment of the present invention and an example of a projection optical system in a conventional technique.

In FIG. 53, a symbol of diamond, a symbol of square, a symbol of circle, and a symbol of triangle denote a projection optical system in any of practical examples 1-11, a projection optical system in comparative example 1, a projection optical system in comparative example 2, and a projection optical system in comparative example 3, respectively.

While any of projection optical systems in practical examples 1-11 and projection optical systems in comparative examples 1-3 satisfies a throw ratio less than or equal to 0.7 as illustrated in FIG. 51 and FIG. 52, a total length of a projection optical system in any of practical examples 1-11 is smaller than a total length of a projection optical system in any of comparative examples 1-3 as illustrated in FIG. 53. That is, a projection optical system in any of practical examples 1-11 is a more compact projection optical system capable of projecting an image onto a surface to be projected on at a shorter distance, compared to a projection optical system in any of comparative examples 1-3.

As illustrated in FIG. 53, a value of Im×Tr for a projection optical system in any of practical examples 1-11 is smaller than a value of Im×Tr for a projection optical system in any of comparative examples 1-3. More specifically, a value of Im×Tr for a projection optical system in any of practical examples 1-11 is less than or equal to 1.70 and a value of Im×Tr for a projection optical system in any of comparative examples 1-3 is greater than 1.70.

Thus, a condition that a value of Im×Tr for a projection optical system is less than or equal to 1.70 is satisfied, like a projection optical system in any of practical examples 1-11, and thereby, it may be possible to provide a more compact projection optical system capable of projecting an image onto a surface to be projected on at a shorter distance.

On the other hand, when a value of Im×Tr for a projection optical system is greater than 1.70 like a projection optical system in any of comparative examples 1-3, a throw ratio Tr for a projection optical system or a normalized length Im of an intermediate image in a direction of an optical axis of a first optical system included in a projection optical system increases, and hence, it may be difficult to provide a more compact projection optical system capable of projecting an image onto a surface to be projected on at a shorter distance.

Furthermore, a value of Im×Tr for a projection optical system is preferably less than or equal to 1.50 to provide a more compact projection optical system capable of projecting an image onto a surface to be projected on at a shorter distance. When a value of Im×Tr for a projection optical system is less than or equal to 1.50, for example, it may be possible to further reduce a normalized length Im of an intermediate image in a direction of an optical axis of a first optical system included in a projection optical system and it may be possible to reduce a total length of a projection optical system. As a result, it may be possible to provide a more compact projection optical system.

For example, as illustrated in Table 48, a value of a throw ratio Tr of a projection optical system in practical example 7 is generally comparable to a value of a throw ratio Tr of a projection optical system in practical example 10. However, while a value of Im×Tr for a projection optical system in practical example 7 is less than or equal to 1.50, a value of Im×Tr for a projection optical system in practical example 10 is greater than 1.50. Hence, a value of Im for a projection optical system in practical example 7 is smaller than a value of Im for a projection optical system in practical example 10. As a result, a total length of a projection optical system in practical example 7 is smaller than a total length of a projection optical system in practical example 10.

Furthermore, a value of Im×Tr for a projection optical system is preferably greater than or equal to 0.50. When a value of Im×Tr for a projection optical system is greater than or equal to 0.50, it may be possible to increase a throw ratio Tr for a projection optical system or increase a normalized length Im of an intermediate image in a direction of an optical axis of a first optical system included in a projection optical system. When it may be possible to increase a throw ratio Tr for a projection optical system, it may be possible to reduce an angle of incidence of a light ray incident on a screen. As a result, it may be possible to reduce an aberration of a light beam incident on a screen and it may be possible to project a better image onto a screen. Furthermore, when it may be possible to increase a normalized length Im of an intermediate image in a direction of an optical axis of a first optical system included in a projection optical system, it may be possible to increase a cross-section of a light beam from an intermediate image in a second optical system included in a projection optical system. As a result, it may be possible to correct an aberration of a light beam from an intermediate image more readily by a second optical system and it may be possible to project a better image onto a screen.

For example, as illustrated in Table 48, while a value of Im×Tr for a projection optical system in any of practical examples 1-10 is greater than or equal to 0.50, a value of Im×Tr for a projection optical system in practical example 11 is less than 0.50. Furthermore, a quality of an image projected onto a screen by a projection optical system in any of practical examples 1-10 is higher than a quality of an image projected onto a screen by a projection optical system in practical example 11. A projection optical system in any of practical examples 1-10 satisfies a condition that a value of Im×Tr for a projection optical system is greater than or equal to 0.50, and thereby, it may be possible to reduce an aberration (for example, an astigmatic aberration, a distortion aberration, etc.) for a light beam to be projected by a projection optical system, compared to a projection optical system in practical example 11.

Table 49 illustrates a Petzval sum for a first optical system included in a projection optical system in any of practical examples 1-11 and comparative examples 1-3.

TABLE 49

| | |
|---|---|
| PRACTICAL EXAMPLE 1 | −0.01135 |
| PRACTICAL | −0.01849 |

TABLE 49-continued

| | |
|---|---|
| EXAMPLE 2 | |
| PRACTICAL EXAMPLE 3 | −0.02992 |
| PRACTICAL EXAMPLE 4 | −0.03027 |
| PRACTICAL EXAMPLE 5 | −0.03444 |
| PRACTICAL EXAMPLE 6 | −0.03656 |
| PRACTICAL EXAMPLE 7 | −0.02461 |
| PRACTICAL EXAMPLE 8 | −0.01206 |
| PRACTICAL EXAMPLE 9 | −0.01732 |
| PRACTICAL EXAMPLE 10 | −0.02216 |
| PRACTICAL EXAMPLE 11 | −0.03640 |
| COMPARATIVE EXAMPLE 1 | −0.00705 |
| COMPARATIVE EXAMPLE 2 | −0.00982 |
| COMPARATIVE EXAMPLE 3 | −0.01191 |

A Petzval sum PTZ for a first optical system included in a projection optical system is represented by a formula of:

$$PTZ = \sum_{s=1}^{k} \left( \frac{1}{ns} - \frac{1}{ns-1} \right) \frac{1}{rs}$$

when the first optical system is composed of refractive surfaces which are a first surface to a k-th surface. Herein, s denotes a number of a refractive surface. ns denotes a refractive index at a s-th surface and ns−1 denotes a refractive index at a s−1-th surface. rs denotes a radius of curvature of a s-th surface.

In a projection optical system according to an embodiment of the present invention, when a projection distance of a projection optical system is small and an angle of incidence of a light ray projected onto a surface to be projected on is large, an aberration such as an astigmatic aberration or a field curvature, etc., for a light beam projected onto the surface to be projected on is preferably corrected by a second optical system. In such a case, it is preferable to increase a cross-section of a light beam to be projected onto the surface to be projected on, in a second optical system. To that end, it is preferable to curve toward a first optical system an intermediate image which is imaged by the first optical system and increase a field curvature of the intermediate image which is imaged by the first optical system. That is, it is preferable that a sign of a Patzval sum of a first optical system included in a projection optical system according to an embodiment of the present invention is negative and an absolute value of a Petzval sum of a first optical system included in a projection optical system according to an embodiment of the present invention is large.

From Table 49, a Petzval sum PTZ of a first optical system included in a projection optical system in any of practical examples 1-11 is less than or equal to −0.01135. When a Petzval sum PTZ of a first optical system included in a projection optical system is less than or equal to −0.01135, it may be possible to provide a projection optical system capable of projecting a better image onto a screen, such as a projection optical system in any of practical examples 1-11.

Additionally, although a projection optical system with a fixed focal length is illustrated in any of practical examples 1-11, it may be possible to adjust a focal length of a projection optical system (or conduct adjustment of focusing for the projection optical system) due to movement of a first optical system or second optical system included in the projection optical system.

[Appendix]

<An Illustrative Embodiment(s) of a Projection Optical System and an Image Projecting apparatus>

At least one illustrative embodiment of the present invention may relate to a projection optical system and an image projecting apparatus.

One object of at least one illustrative embodiment of the present invention may be to provide a more compact projection optical system capable of projecting a better image onto a surface to be projected on at a shorter distance.

Another object of at least one illustrative embodiment of the present invention may be to provide a more compact image projecting apparatus capable of projecting a better image onto a surface to be projected on at a shorter distance.

According to one aspect of at least one illustrative embodiment of the present invention, there is provided a projection optical system including a first optical system which forms a first image conjugate to an object and has an optical axis and a second optical system which projects a second image conjugate to the first image onto a surface to be projected on, wherein the first image satisfies a condition of:

$Im \times Tr \leq 1.70$, wherein Im denotes a length of the first image in a direction of an optical axis of the first optical system which is normalized by a focal length of the first optical system and Tr denotes a throw ratio for the projection optical system.

According to another aspect of at least one illustrative embodiment of the present invention, there is provided an image projecting apparatus including an image forming part which forms an image and a projection optical system which projects the image onto a surface to be projected on, wherein the projection optical system is a projection optical system according to one aspect of at least one illustrative embodiment of the present invention.

According to one aspect of at least one illustrative embodiment of the present invention, it may be possible to provide a more compact projection optical system capable of projecting a better image onto a surface to be projected on at a shorter distance.

According to another aspect of at least one illustrative embodiment of the present invention, it may be possible to provide a more compact image projecting apparatus capable of projecting a better image onto a surface to be projected on at a shorter distance.

Illustrative embodiment (1) is a projection optical system including a first optical system which forms a first image conjugate to an object and has an optical axis and a second optical system which projects a second image conjugate to the first image onto a surface to be projected on, wherein the first image satisfies a condition of:

$Im \times Tr \leq 1.70$, wherein:

Im denotes a length of the first image in a direction of an optical axis of the first optical system which is normalized by a focal length of the first optical system; and Tr denotes a throw ratio for the projection optical system.

Illustrative embodiment (2) is the projection optical system as described in illustrative embodiment (1), wherein the first image satisfies a condition of:

$Im \times Tr \leq 1.50$.

Illustrative embodiment (3) is the projection optical system as described in illustrative embodiment (1) or (2), wherein the first image satisfies a condition of:

$0.50 \leq Im \times Tr$.

Illustrative embodiment (4) is the projection optical system as described in any of illustrative embodiments (1) to (3), wherein the projection optical system satisfies a condition of:

$Tr \leq 0.7$.

Illustrative embodiment (5) is the projection optical system as described in any of illustrative embodiments (1) to (4), wherein a Petzval sum for the first optical system is less than or equal to $-0.010$ mm$^{-1}$.

Illustrative embodiment (6) is the projection optical system as described in any of illustrative embodiments (1) to (5), wherein the second optical system includes a reflection surface with a free-form surface shape.

Illustrative embodiment (7) is an image projecting apparatus including an image forming part which forms an image and a projection optical system which projects the image onto a surface to be projected on, wherein the projection optical system is the projection optical system as described in any of illustrative embodiments (1) to (6).

Although the illustrative embodiments and specific examples of the present invention have been described with reference to the accompanying drawings, the present invention is not limited to any of the illustrative embodiments and specific examples of the present invention and the illustrative embodiments and specific examples of the present invention may be altered, modified, or combined without departing from the scope of the present invention.

The present application claims the benefit of priority based on Japanese Patent Application No. 2011-201690 filed on Sep. 15, 2011, the entire content of which is hereby incorporated by reference herein.

What is claimed is:

1. A projection optical system, comprising:

a first optical system configured to form a first image conjugate to an object and have an optical axis; and a second optical system configured to project a second image conjugate to the first image onto a surface to be projected on, the surface extending in a horizontal direction and a vertical direction perpendicular to the horizontal direction, wherein the first image satisfies a condition of:

$0.78 \leq Im \times Tr \leq 0.90$, $4.55 \leq Im$, and $Tr \leq 0.18$, wherein

Im denotes a length of the first image in a direction of an optical axis of the first optical system, normalized by a focal length of the first optical system; and Tr denotes a throw ratio for the projection optical system, wherein a TV distortion in the second image is less than or equal to 3%, wherein the second optical system includes a single mirror with a refractive power, wherein the horizontal direction and the vertical direction are normal to the first optical system, and wherein the throw ratio Tr is a ratio of a projection distance of the projection optical system to a length of the second image in the horizontal direction.

2. The projection optical system as claimed in claim 1, wherein the second optical system includes a reflection surface with a free-form surface shape.

3. An image projecting apparatus comprising:
an image forming part configured to form an image; and
a projection optical system configured to project the image onto a surface to be projected on,
wherein the projection optical system is the projection optical system as claimed in claim 1.

4. A projection optical system, comprising:
a first optical system configured to form a first image conjugate to an object and have an optical axis; and
a second optical system configured to project a second image conjugate to the first image onto a surface to be projected on, the surface extending in a horizontal direction and a vertical direction perpendicular to the horizontal direction, the second optical system including a single mirror with a reflection surface having a rotationally asymmetric aspheric surface,
wherein the first image satisfies a condition of:

$0.78 \leq Im \times Tr \leq 0.90$, $4.55 \leq Im$, and $Tr \leq 0.18$, wherein
Im denotes a length of the first image in a direction of an optical axis of the first optical system, normalized by a focal length of the first optical system; and
Tr denotes a throw ratio for the projection optical system, and
wherein a TV distortion in the second image is less than or equal to 3%,
wherein the horizontal direction and the vertical direction are normal to the first optical system, and
wherein the throw ratio Tr is a ratio of a projection distance of the projection optical system to a length of the second image in the horizontal direction.

5. The projection optical system as claimed in claim 4, wherein the reflection surface of the second optical system has a free-form surface shape.

6. The projection optical system as claimed in claim 5, wherein the reflection surface is adjusted for each light beam corresponding to an image point for the first image.

7. The projection optical system as claimed in claim 5, wherein the reflection surface is adjusted to conduct aberration correction for each light beam corresponding to an image point for the first image.

8. An image projecting apparatus comprising:
an image forming part configured to form an image; and
a projection optical system configured to project the image onto a surface to be projected on,
wherein the projection optical system is the projection optical system as claimed in claim 4.

* * * * *